(12) United States Patent
Cochran et al.

(10) Patent No.: US 10,844,166 B2
(45) Date of Patent: Nov. 24, 2020

(54) POLY(ACRYLATED POLYOL) AND METHOD FOR MAKING AND USING THEREOF AS ASPHALT RUBBER MODIFIERS, ADHESIVES, FRACKING ADDITIVES, OR FRACKING FLUIDS

(71) Applicant: Iowa State University Research Foundation, Inc., Ames, IA (US)

(72) Inventors: Eric W. Cochran, Ames, IA (US); R. Christopher Williams, Ames, IA (US); Nacu Hernandez, Ames, IA (US); Elvira Joana Ferreira Peralta, Ames, IA (US); Michael John Forrester, Ames, IA (US)

(73) Assignee: IOWA STATE UNIVERSITY RESEARCH FOUNDATION, INC., Ames, IA (US)

( * ) Notice: Subject to any disclaimer, the term of this patent is extended or adjusted under 35 U.S.C. 154(b) by 44 days.

(21) Appl. No.: 16/212,989

(22) Filed: Dec. 7, 2018

(65) Prior Publication Data
US 2019/0135971 A1    May 9, 2019

Related U.S. Application Data

(62) Division of application No. 16/049,407, filed on Jul. 30, 2018, which is a division of application No. 14/717,777, filed on May 20, 2015, now Pat. No. 10,066,051.

(60) Provisional application No. 62/001,444, filed on May 21, 2014.

(51) Int. Cl.
*C08G 63/00* (2006.01)
*C08F 222/10* (2006.01)
(Continued)

(52) U.S. Cl.
CPC ........ *C08G 63/00* (2013.01); *C08F 122/1006* (2020.02); *C08F 222/1006* (2013.01);
(Continued)

(58) Field of Classification Search
None
See application file for complete search history.

(56) References Cited

U.S. PATENT DOCUMENTS 3,285,871 A    11/1966 Carlson
5,936,015 A     8/1999 Burns
(Continued)

OTHER PUBLICATIONS

Preliminary Office Action in Brazil Application No. BR112016026839-3, based on PCT/US2015/031824, dated Mar. 13, 2020.
(Continued)

*Primary Examiner* — Jeffrey D Washville
(74) *Attorney, Agent, or Firm* — Troutman Pepper Hamilton Sanders LLP (Rochester)

(57) ABSTRACT

The present invention relates to a thermoplastic copolymer, block copolymer, and statistical copolymer comprising plural acrylated polyol monomeric units having different degrees of acrylation of hydroxyl groups. The acrylated polyol monomeric units have an average degree of acrylation greater than 1 and less than the number of the hydroxyl groups of the polyol. The present invention also relates to a method of making the thermoplastic copolymer, block copolymer, and statistical copolymer, and using them in various applications, such as asphalt rubber modifiers, adhesives, or an additive in a fracking fluid for oil fracking.

10 Claims, 47 Drawing Sheets

(51) Int. Cl.
*C08L 95/00* (2006.01)
*C09J 167/00* (2006.01)
*C09K 8/68* (2006.01)
*C08F 122/10* (2006.01)

(52) U.S. Cl.
CPC ............ *C08L 95/00* (2013.01); *C09J 167/00* (2013.01); *C09K 8/68* (2013.01); *C08F 2438/03* (2013.01); *C08L 2205/03* (2013.01); *C08L 2207/04* (2013.01); *C08L 2555/34* (2013.01); *C08L 2555/80* (2013.01)

(56) References Cited

U.S. PATENT DOCUMENTS

| | | | |
|---|---|---|---|
| 2002/0164547 A1* | 11/2002 | Ferm | G02B 6/1221 430/321 |
| 2005/0065310 A1 | 3/2005 | Wang et al. | |
| 2013/0095330 A1* | 4/2013 | Sommer | C08G 18/0828 428/425.1 |
| 2013/0184383 A1* | 7/2013 | Cochran | C08L 53/00 524/68 |
| 2014/0114034 A1 | 4/2014 | Oshikiri et al. | |
| 2019/0135972 A1 | 5/2019 | Cochran et al. | |
| 2019/0135973 A1 | 5/2019 | Cochran et al. | |

OTHER PUBLICATIONS

Election of Species Requirement in U.S. Appl. No. 16/213,054, dated Apr. 8, 2020.
Election of Species Requirement in U.S. Appl. No. 16/213,018, dated Apr. 9, 2020.
Office Action in U.S. Appl. No. 16/213,018, dated Jul. 22, 2020.
Office Action in U.S. Appl. No. 16/213,054, dated Jul. 23, 2020.

* cited by examiner

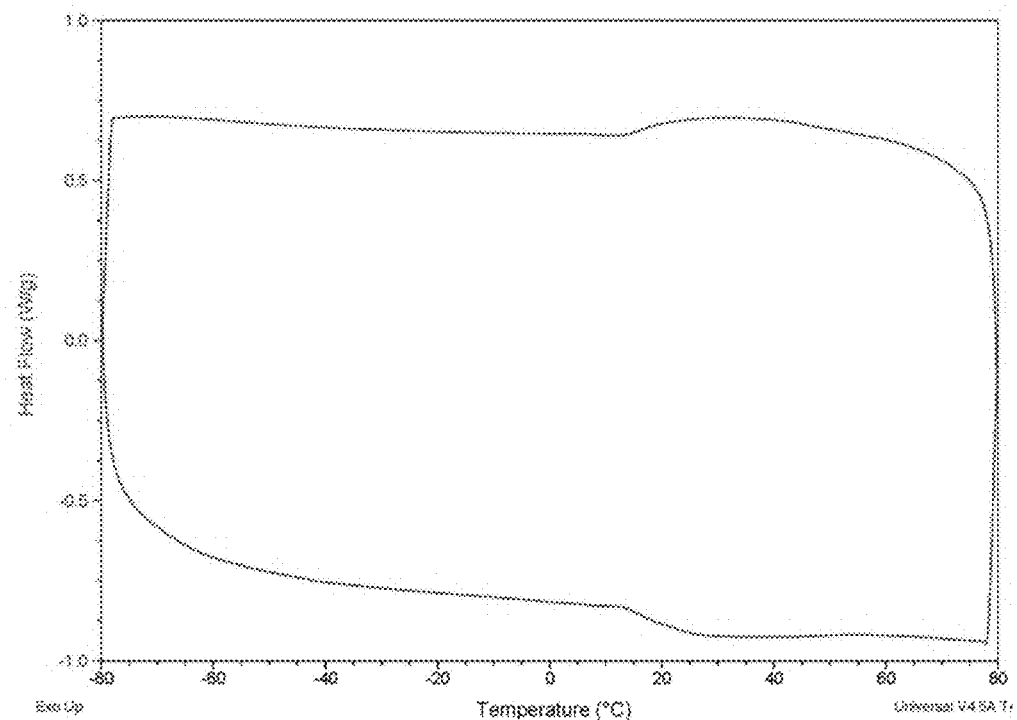
Figure 3
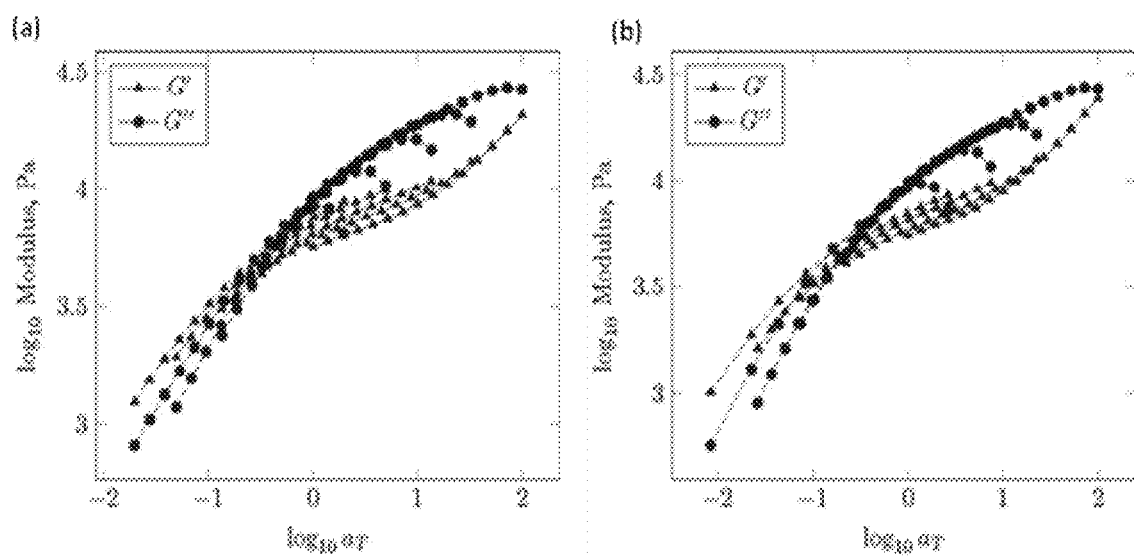
Figures 4A-B

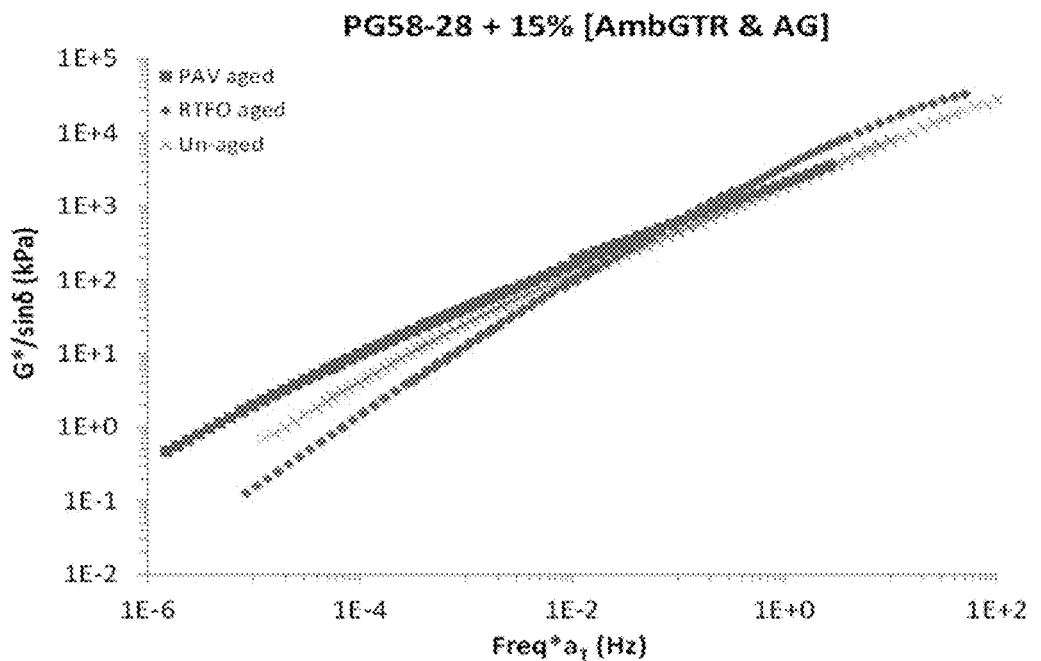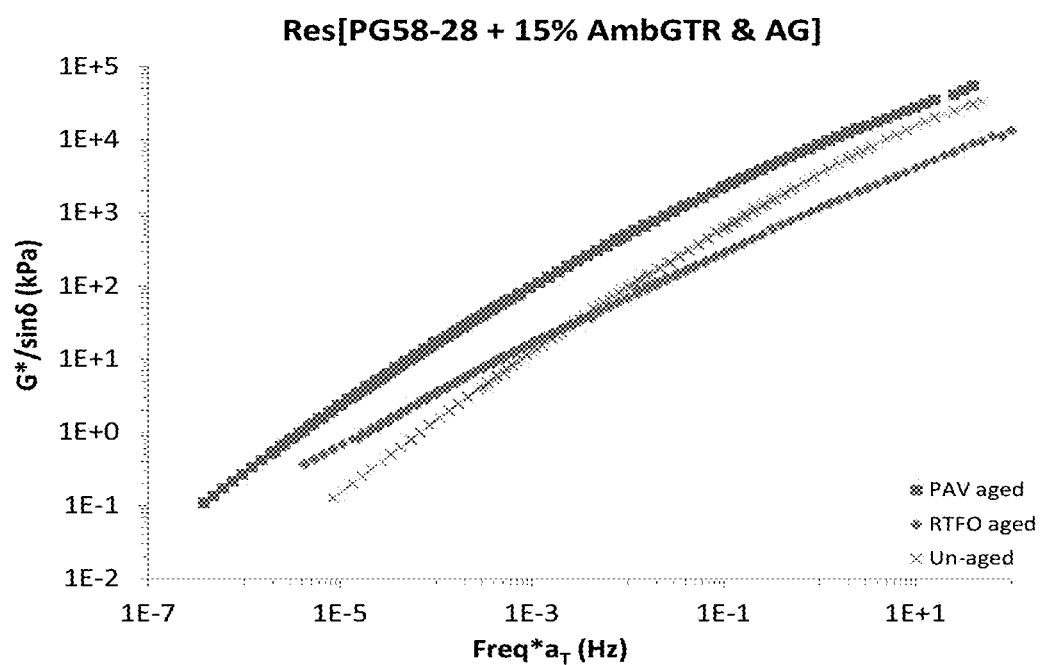
Figure 9C

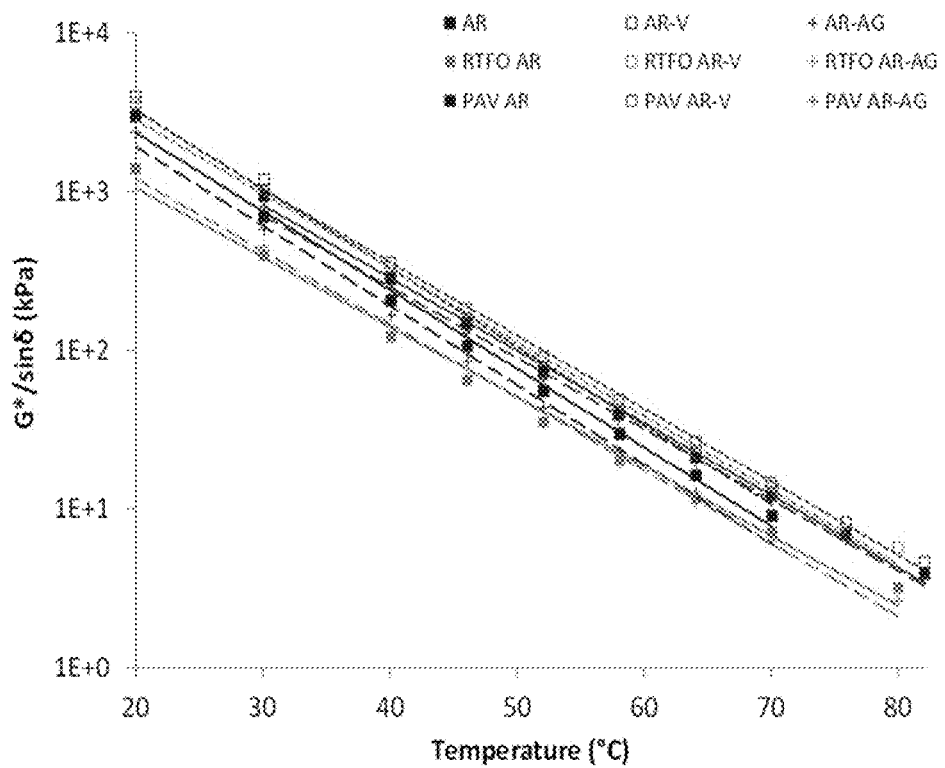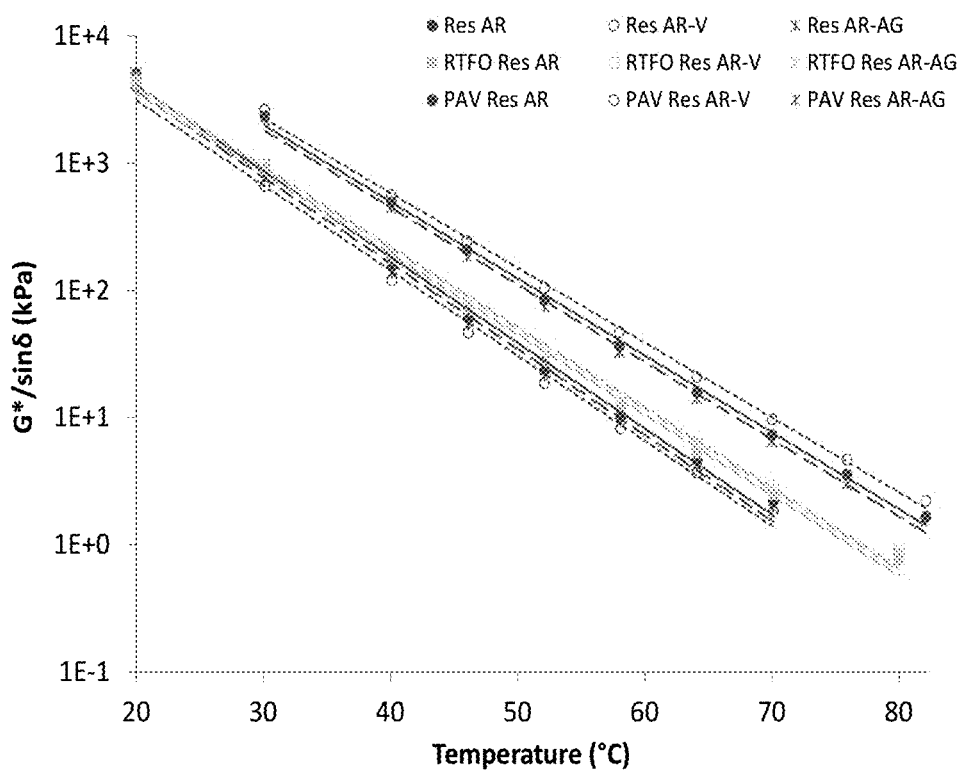
Figure 10A

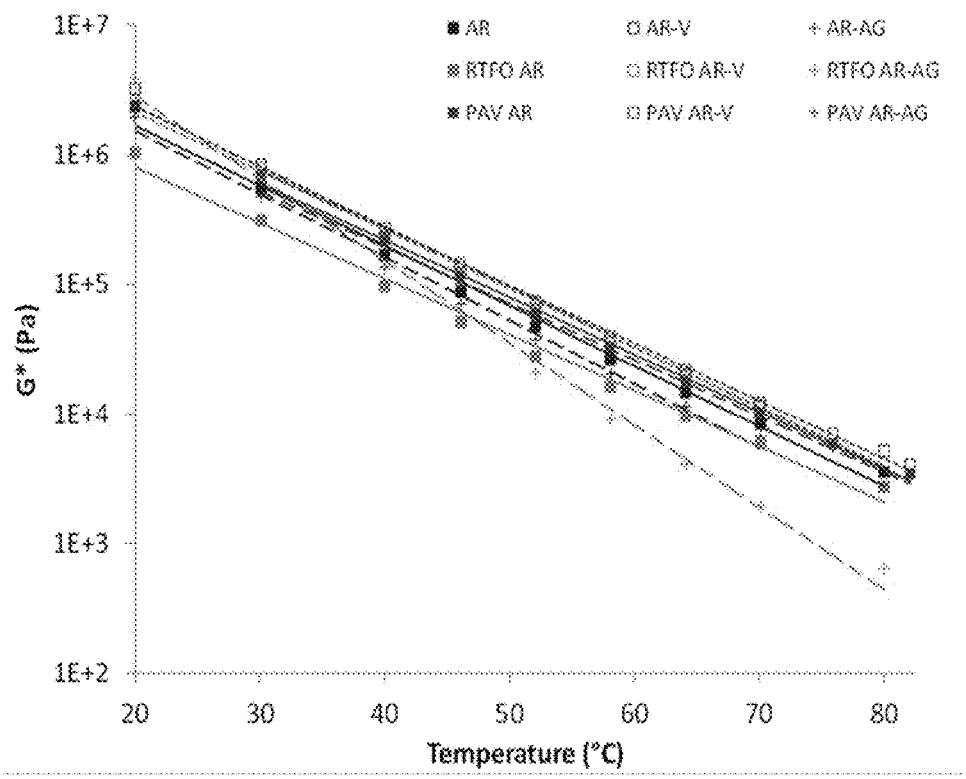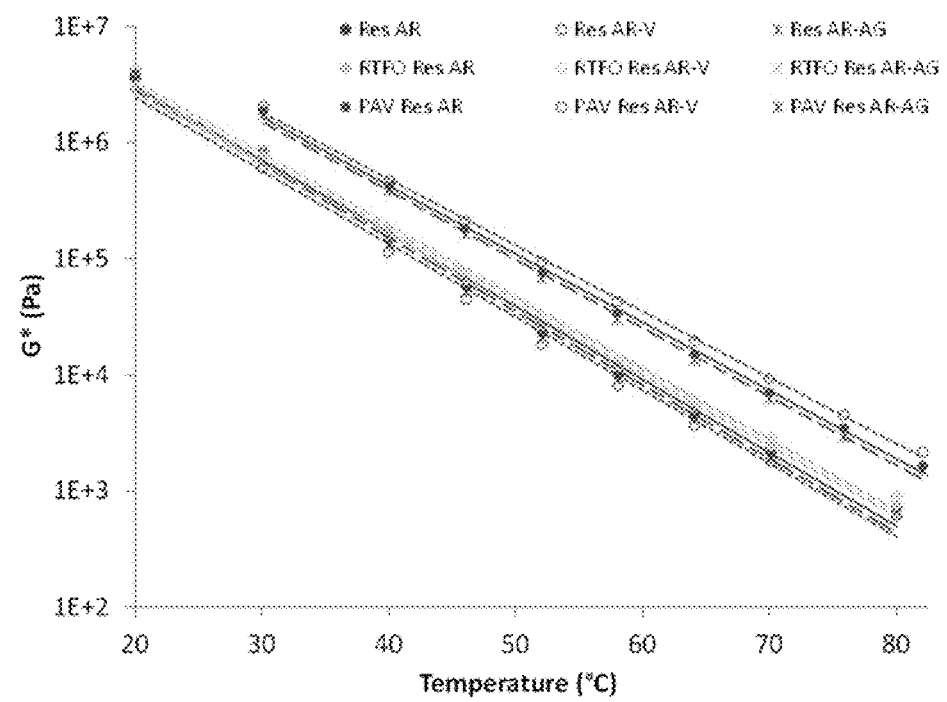
Figure 10B

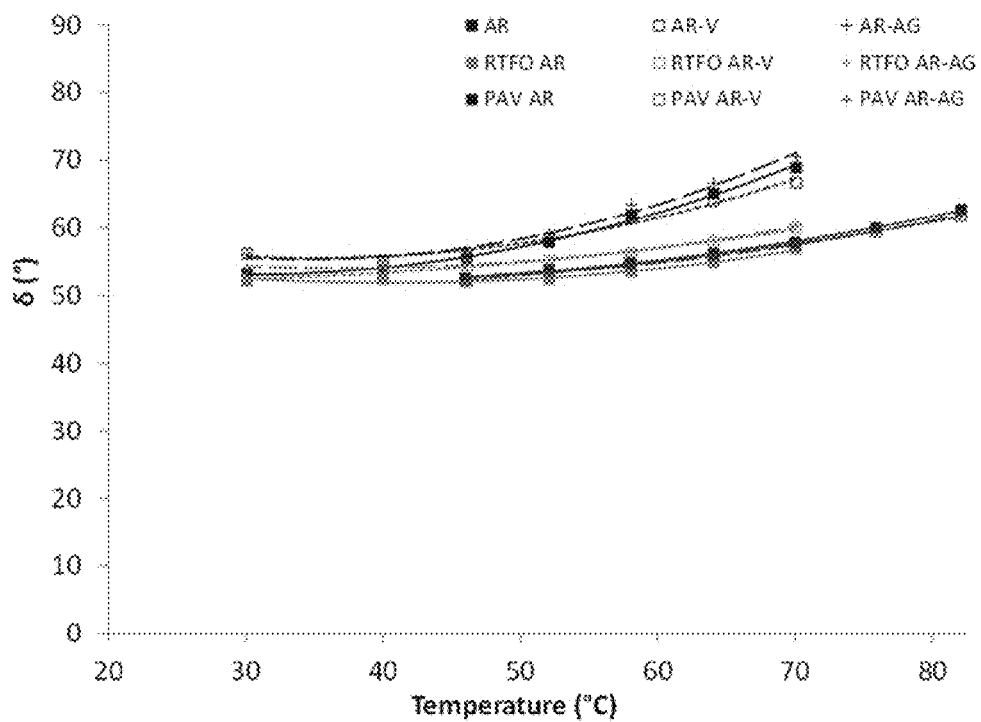
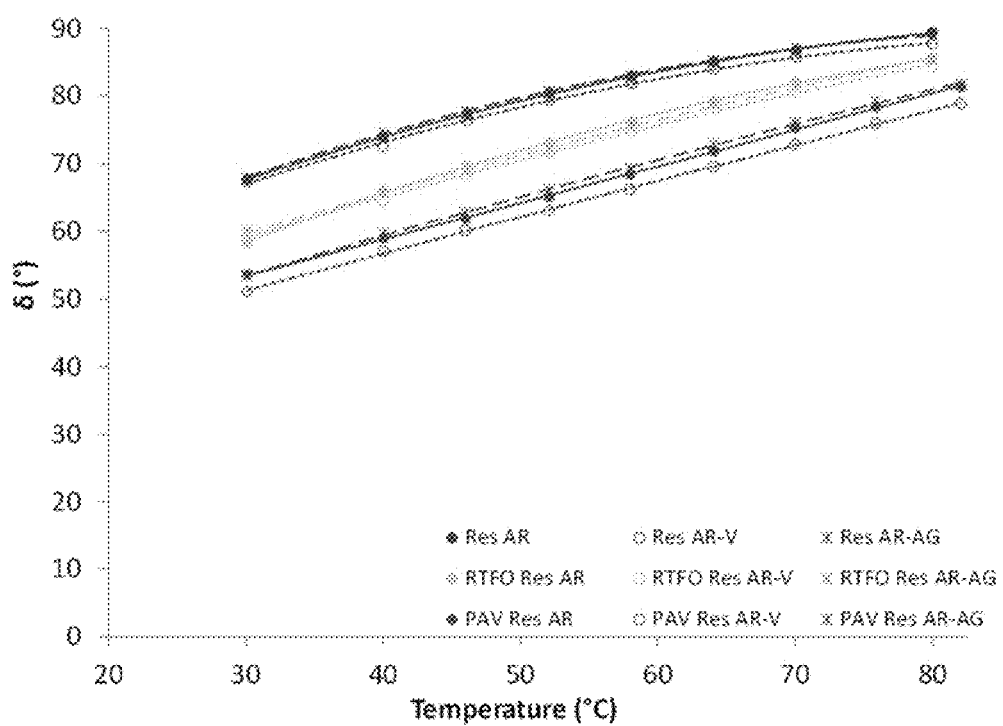
Figure 10C

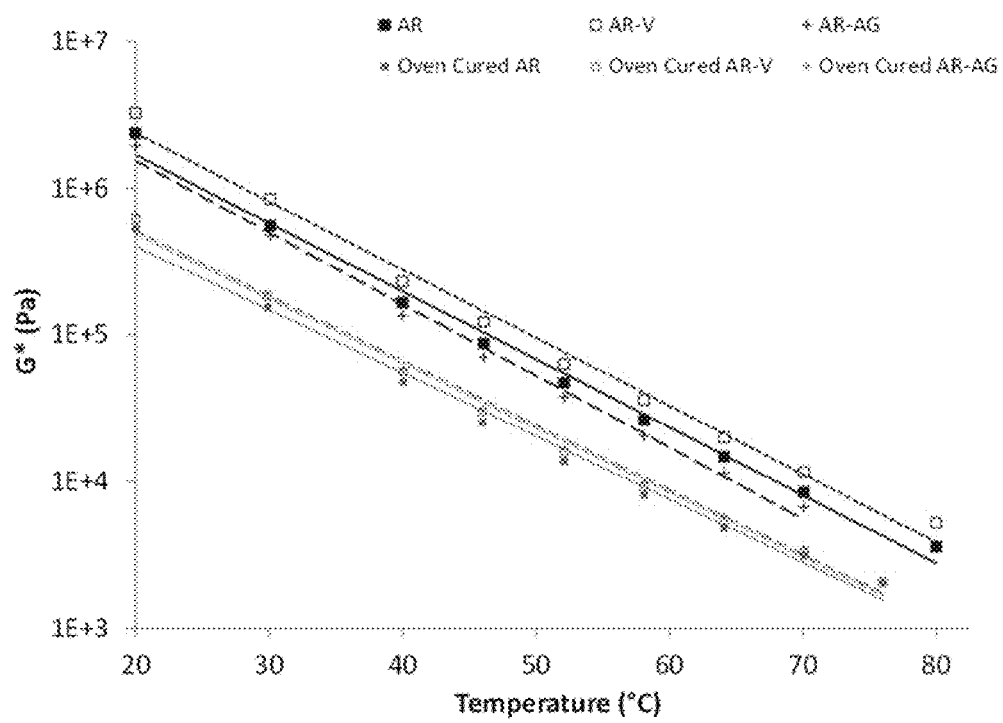
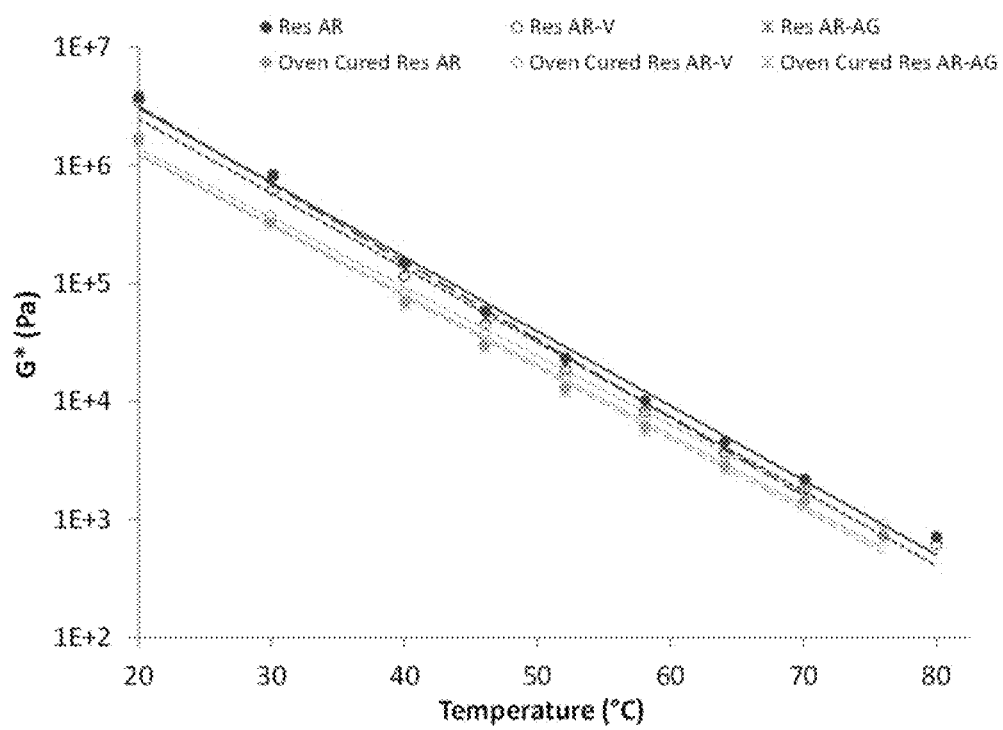
Figure 15B

|  |  |  | Molecular Weight |  |  |  |  |  |
|---|---|---|---|---|---|---|---|---|
|  |  |  | Low | | Medium | | High | |
|  |  |  | AR | Residual | AR | Residual | AR | Residual |
| Degree of Acylation | Low | 2.5% | 13.0 | 21.5 | 15.2 | 20.5 | * | * |
| | | 4.5% | 13.0 | 19.5 | 14.3 | 20.6 | * | * |
| | | 6.5% | 15.2 | 20.3 | 13.0 | 21.1 | 16.7 | 18.34 |
| | Medium | 2.5% | 9.6 | 17.0 | 14.3 | 20.4 | | |
| | | 4.5% | 12.2 | 19.6 | 13.2 | 19.8 | | |
| | | 6.5% | 16.6 | 21.8 | 14.5 | 21.2 | | |
| | High | 2.5% | * | * | | | | |
| | | 4.5% | * | * | | | | |
| | | 6.5% | 14.8 | 17.6 | | | | |

* There were no polymer samples available

| 5% D1101 Kraton® 15.8 | | Vestenamer® | | |
|---|---|---|---|---|
| | | | 2.5% | 4.5% | 6.5% |
| Control AR – 14.8    Residual – 15.4 | | AR | 11.2 | 12.5 | 9.8 |
| | | Residual | 13.3 | 19.2 | 19.9 |

Figure 19

|  |  |  | Molecular Weight | | |
|---|---|---|---|---|---|
|  |  |  | Low | Medium | High |
| Degree of Acylation | Low | 2.5% | 25.8 | 20.5 | * |
|  |  | 4.5% | 21.9 | 20.5 | * |
|  |  | 6.5% | 29.7 | 20.5 | 20.5 |
|  | Medium | 2.5% | 15.0 | 16.5 |  |
|  |  | 4.5% | 16.6 | 12.4 |  |
|  |  | 6.5% | 20.5 | 20.5 |  |
|  | High | 2.5% | * |  |  |
|  |  | 4.5% | * |  |  |
|  |  | 6.5% | 20.5 |  |  |

* There were no polymer samples available.
The black shaded cells were filled with the average of the other cells values for overall evaluation purposes.

| 5% D1101 Kraton® – 25.0 | | Vestenamer® | | |
|---|---|---|---|---|
| Control |  | 2.5% | 4.5% | 6.5% |
| AR – 28.24 | AR | 14.6 | 10.2 | 15.7 |

Figure 22

|  |  |  | Molecular Weight | | | | | |
|---|---|---|---|---|---|---|---|---|
|  |  |  | Low | | Medium | | High | |
|  |  |  | AR | Residual | AR | Residual | AR | Residual |
| Degree of Acylation | Low | 2.5% | 173.7 | 151.3 | 173.0 | 149.6 | * | * |
|  |  | 4.5% | 166.0 | 148.7 | 160.8 | 150.2 | * | * |
|  |  | 6.5% | 190.7 | 154.5 | 167.6 | 150.7 | 176.2 | 152.3 |
|  | Medium | 2.5% | 176.9 | 148.6 | 172.9 | 149.6 |  |  |
|  |  | 4.5% | 173.0 | 149.5 | 172.4 | 149.9 |  |  |
|  |  | 6.5% | 189.4 | 150.0 | 172.5 | 150.6 |  |  |
|  | High | 2.5% | * | * |  |  |  |  |
|  |  | 4.5% | * | * |  |  |  |  |
|  |  | 6.5% | 183.9 | 152.2 |  |  |  |  |

* There were no polymer samples available

| 5% D1101 Kraton® 171.4 | | Vestenamer® | | |
|---|---|---|---|---|
|  |  | 2.5% | 4.5% | 6.5% |
| Control AR – 166.8 Residual – 151.7 | | AR | 175.8 | 173.3 | 175.1 |
|  | | Residual | 151.3 | 153.1 | 156.0 |

Figure 25

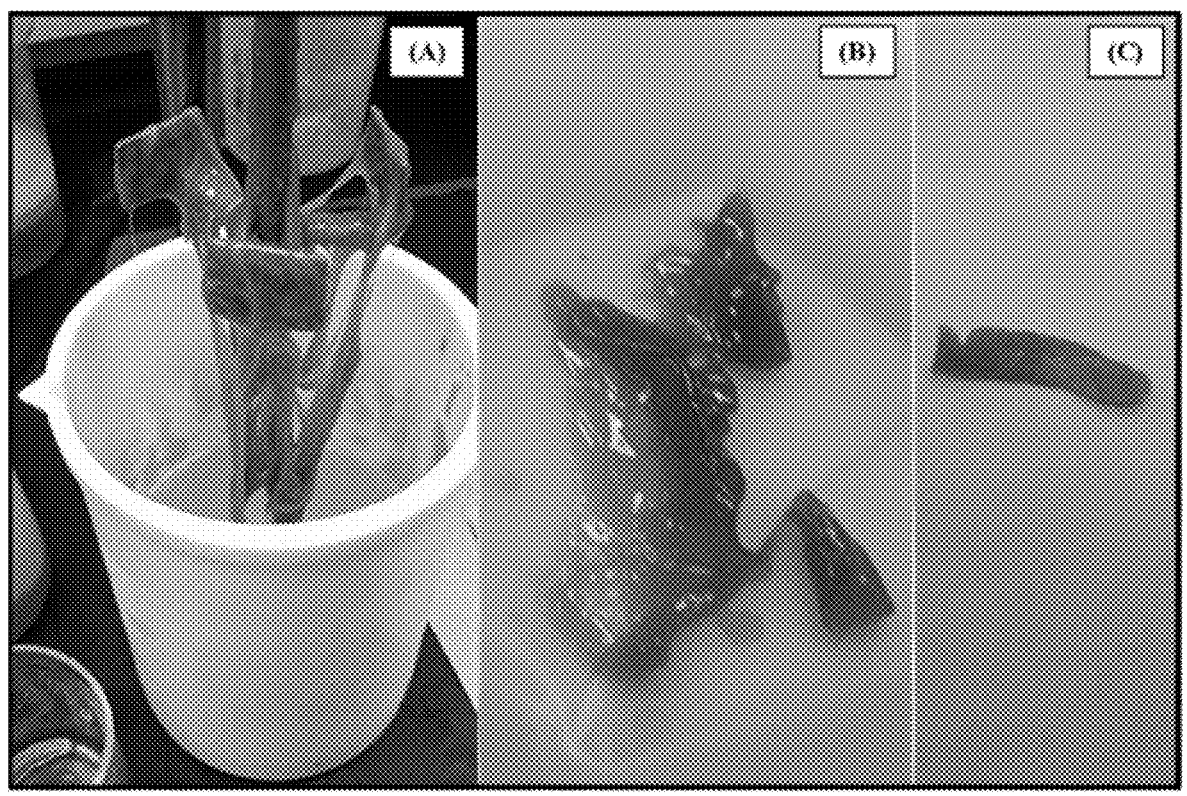
Figures 30A-C

POLY(ACRYLATED POLYOL) AND METHOD FOR MAKING AND USING THEREOF AS ASPHALT RUBBER MODIFIERS, ADHESIVES, FRACKING ADDITIVES, OR FRACKING FLUIDS

This application is a divisional of U.S. patent application Ser. No. 16/049,407, filed Jul. 30, 2018, which is a divisional of U.S. patent application Ser. No. 14/717,777, filed May 20, 2015, now U.S. Pat. No. 10,066,051, which claims the benefit of U.S. Provisional Patent Application Ser. No. 62/001,444, filed May 21, 2014, which are hereby incorporated by reference in their entirety.

FIELD OF THE INVENTION

The present invention relates to a novel thermoplastic polymer composition and methods of making and using thereof. In particular, the present invention relates to successful application of controlled free radical polymerization on an acrylated polyol composition for making novel thermoplastic copolymers, block copolymers, and statistical copolymers, and using them in various applications such as asphalt rubber modifiers, adhesives, or additives in fracking fluids for the fracking industry.

BACKGROUND OF THE INVENTION

The global asphalt market is to reach 118.4 million metric tons by 2015, according to a January 2011 report by Global Industry Analysts, Inc. The asphalt paving industry accounts for the largest end-use market segment of asphalt. With increasing growth in the developing markets of China, India, and Eastern Europe, asphalt will be increasingly needed to construct roadway infrastructure for the next decade. The increased demand for asphalt, along with the need for improved asphalt materials/pavement performance, creates the opportunity for an asphalt modifier.

The grade of the asphalt governs the performance of paving mixtures at in-service temperatures. In many cases, the characteristics of bitumen needs to be altered to improve its elastic recovery/ductility at low temperatures for sufficient cracking resistance as well as to increase its shearing resistance for sustained loads and/or at high temperatures for rutting resistance. Thus, to provide durable pavements, polymer modifiers are added to confer the desired physical properties to the asphalt. Typical polymer modifiers used include a suspended semicrystalline solid (e.g., polyethylene) or a dispersed SBS-type thermoplastic elastomer (e.g., various SBS products of the Kraton® family).

Over the past decade, there has been increased use of recycled tire rubber in asphalt binders as an alternative to polymer modifiers in the asphalt paving industry due to its good performance and competitive economic opportunity. The use of ground tire rubber (GTR) as an asphalt modifier is an environmentally sustainable mean of enhancing the pavement quality while recycling vast quantities of waste material. Asphalt rubber (AR) binders have being applied since the 1960s. However, the production and storage of the AR presents some challenges. It is important to have the rubber particles evenly distributed in the asphalt matrix for the asphalt rubber. Because the rubber in the GTR is crosslinked, it does not melt completely in asphalt at the blending and production temperatures commonly used. Thus, the AR binders require higher mix and compaction temperatures than the conventional binders. Also, the AR binders typically have some degree of separation during storage due to the immiscibility of the GTR with the asphalt and the disparity in the specific gravities. To increase the asphalt rubber's performance and maintain the storage stability of the rubber after being reacted in asphalt, stabilizers/compatibilizers have been commonly used to swell the rubber particles and form either physical or chemical linkages between the GTR filler particle and asphalt binder.

There are several stabilizers in the market for asphalt rubbers. For example, an additive widely used in the production of AR to reduce mix and compaction temperatures and to prevent separation is polyoctanamer (often referred to as Vestenamer®, Evonik Industries/Degussa). However, the conventional binders are expensive and do not provide environmental benefits. With the forecast of increasing demand of asphalt pavement and AR binders for the next decade, there remains a strong need for new types of cost-effective, environment-friendly, viable polymers that can be used as AR binders in lieu of standard asphalt-rubber binders.

Adhesives are materials that can be fluid, semi-fluid, or materials that can become fluid with external assistance such as heating (e.g., hot-melt adhesives). When applied between two objects, the solidification of the adhesives stick the objects together. The adhesive industry is divided into the packaging industry with a 37% share of the total market, the construction industry with a 20% share (e.g., carpet laying, roofing, pre-finished panels, etc.), the automobile industry with a 19% share, the laminates industry with a 12% share (e.g., labelling, veneers, laminates), the footwear industry with a 5% share, the consumer industry with a 4% share, and other markets constituting the remaining 3% share.

The global market for adhesives in 2013 was estimated by the Adhesive and Sealant Council to be $40.5 billion in sales (approximately 9000 kilo tons) and is expected to reach $58 billion in sales by 2018 (approximately 12,400 kilo tons). There thus remains a strong need in the art for new types of cost-effective, environment-friendly, viable polymers that can be used as adhesives.

"Fracking", or hydraulic fracturing, is a process for natural gas, petroleum, or uranium solution-extraction from deep formations of shale. The process involves the fracturing of shale rock deposits by a pressurized liquid. The fracking liquid is a mixture of water, sand, and other chemical additives. The typical recipe for fracking fluids consists of 90% water, 8-9% sand, and 1-2% other chemicals such as biocides, acids, inhibitors, stabilizers, crosslinkers, friction reducers, pH adjusting agents, iron control, surfactants, and gelling agents. Because fracking can consume millions of gallons of fracking fluids, 1-2% of the fracking fluids (i.e., 1-2% chemicals among the fracking fluids) can still amount to hundreds of tons. This can be very toxic for the soil and can attribute to deep water well contamination. There is thus a need in the art to develop a polymer as a substitute for the gelling agents such as guar gum, that can serve as a thickening agent for water, as a crosslinking agent, as a pH adjusting agent, as a breaking agent, and as a biocide.

Polymers based on glycerol have been used in the past decade in the fabrication of matrices for drug delivery, scaffolds in tissue engineering, plus many other applications. Similar chemistries have been applied to sorbitol to make polymers. For example, Liu et al, "Preparation and characterization of a thermoplastic poly(glycerol sebacate) elastomer by two-step method," *Journal of Applied Polymer Science* 103(3):1412-19 (2007), synthesized a thermoplastic elastomer prepared using poly(glycerol-sebacate) and sebacic acid in a two-step method. Cai et al., "Shape-memory effect of poly (glycerol-sebacate) elastomer," Materials Letters 62(14):2171-73 (2008), were able to synthesize a poly(glycerol-sebacate) elastomer with excellent shape-memory capabilities.

However, these past efforts have been focusing on acid/alcohol condensation chemistry between glycerol or sorbitol monomer and another monomer. None of them have explored the biopolymers based on polymerization of a polyol monomer or its derivatives. There is thus a need in the art to use a monomer derived from an inexpensive natural biofeedstocks or petrochemical feedstocks to develop a highly processable thermoplastic and elastomeric polymer with a wide range of applications and physical properties.

The present invention is directed to fulfilling these needs in the art.

SUMMARY OF THE INVENTION

One aspect of the present invention relates to a thermoplastic copolymer comprising plural acrylated polyol monomeric units having different degrees of acrylation of hydroxyl groups. The acrylated polyol monomeric units have an average degree of acrylation greater than 1 and less than the number of the hydroxyl groups of the polyol.

Another aspect of the invention relates to a thermoplastic block copolymer comprising at least one PA block and at least one PB block. PA represents a polymer block comprising one or more units of monomer A and PB represents a polymer block comprising one or more units of monomer B. Monomer A is an acrylated polyol monomeric unit having different degrees of acrylation of hydroxyl groups. The acrylated polyol monomeric unit has an average degree of acrylation greater than 1 and less than the number of the hydroxyl groups of the polyol. Monomer B is a radically polymerizable monomer.

Another aspect of the invention relates to a thermoplastic statistical copolymer having a general formula of: $[A_i\text{-}B_j\text{-}C_k]_q$. A represents monomer A, which is an acrylated polyol monomeric unit having different degrees of acrylation of hydroxyl groups. The acrylated polyol monomeric unit has an average degree of acrylation greater than 1 and less than the number of the hydroxyl groups of the polyol. B represents monomer B, which is a radically polymerizable monomer. C represents monomer C, which is a radically polymerizable monomer. The monomer B is different than the monomer A, and the monomer C is different than the monomer A or monomer B. i, j, and k are average number of repeating units of monomer A, monomer B, and monomer C, respectively, such that i and j are each greater than 0 and less than 1, k is 0 to less than 1, provided that i+j+k=1. q represents the number average degree of polymerization and ranges from 10 to 100,000.

These thermoplastic copolymers, block copolymers, and statistical copolymers can be partially or fully hydrophilic, and thus partially or fully water soluble, and can be partially or fully biodegradable.

One aspect of the present invention relates to a method of making a thermoplastic copolymer or block copolymer. The method comprises providing an acrylated polyol composition comprising plural acrylated polyol monomeric units having different degrees of acrylation of hydroxyl groups. The acrylated polyol composition has an average degree of acrylation greater than 1 and less than the number of the hydroxyl groups of the polyol. The method also comprises polymerizing the acrylated polyol composition through controlled radical polymerization to form the thermoplastic copolymer or block copolymer.

Another aspect of the invention relates to a method of preparing a thermoplastic statistical copolymer. The method comprises providing monomer A, which is an acrylated polyol monomeric unit having different degrees of acrylation of hydroxyl groups, wherein the acrylated polyol monomeric unit has an average degree of acrylation greater than 1 and less than the number of the hydroxyl groups of the polyol. The method also comprises providing a radically polymerizable monomer, represented by B. The method further comprises polymerizing monomer A and monomer B simultaneously, via reversible addition-fragmentation chain-transfer polymerization (RAFT), in the presence of a free radical initiator and a chain transfer agent to form the thermoplastic statistical copolymer.

Another aspect of the present invention relates to an asphalt composition. The asphalt composition comprises: i) an asphalt component; ii) a crumb rubber having a weight percentage in the range of 1% to 15%; and iii) a thermoplastic copolymer, block copolymer, or statistical copolymer as an asphalt additive, modifier, and/or filler having a weight percentage in the range of 0.01% to 1.05%.

Another aspect of the present invention relates to a method for preparing a homogeneous asphalt composition. The method comprises mixing a thermoplastic copolymer, block copolymer, or statistical copolymer as an asphalt additive, modifier, and/or filler, with a weight percentage in the range of 0.01% to 1.05%, into an asphalt composition to form a homogeneous asphalt composition. The asphalt composition comprises: i) an asphalt component, and ii) a crumb rubber having a weight percentage in the range of 1% to 15%.

Another aspect of the present invention relates to a method for preparing an adhesive or sealant composition. The method comprises mixing the thermoplastic copolymer, statistical copolymer, or block copolymer with a tackifier, and/or a plasticizer, and/or a solvent.

Another aspect of the present invention relates to a method for preparing a fracking liquid. The method comprises mixing the thermoplastic copolymer, statistical copolymer, or block copolymer as a chemical additive, with water, and sand.

For each of the above aspects of the asphalt composition, the method for preparing a homogeneous asphalt composition, and the method for preparing a fracking liquid, the thermoplastic copolymer, statistical copolymer, or block copolymer are discussed as below. The thermoplastic copolymer comprises plural acrylated polyol monomeric units having different degrees of acrylation of hydroxyl groups. The acrylated polyol monomeric units have an average degree of acrylation greater than 1 and less than the number of the hydroxyl groups of the polyol. The thermoplastic statistical copolymer has a general formula of: $[A_i\text{-}B_j\text{-}C_k]_q$. A represents monomer A, which is an acrylated polyol monomeric unit having different degrees of acrylation of hydroxyl groups. The acrylated polyol monomeric unit has an average degree of acrylation greater than 1 and less than the number of the hydroxyl groups of the polyol. B represents monomer B, which is a radically polymerizable monomer. C represents monomer C, which is a radically polymerizable monomer. The monomer B is different than the monomer A, and the monomer C is different than the monomer A or monomer B. i, j, and k are average number of repeating units of monomer A, monomer B, and monomer C, respectively, such that i and j are each greater than 0 and less than 1, k is 0 to less than 1, provided that i+j+k=1. q represents the number average degree of polymerization and ranges from 10 to 100,000. The thermoplastic block copolymer comprising at least one PA block and at least one PB block. PA represents a polymer block comprising one or more units of monomer A and PB represents a polymer block comprising one or more units of monomer B. Monomer A is an acrylated polyol monomeric unit having different degrees of acrylation of hydroxyl groups. The acrylated polyol monomeric unit has an average degree of acrylation greater than 1 and less than the number of the hydroxyl groups of the polyol. Monomer B is a radically polymerizable monomer.

The present invention involves the successful application of controlled free radical polymerization to multifunctional polyols, which can be derived from natural biofeedstocks or petrochemical feedstocks, e.g., glycerol and sorbitol, yielding thermoplastic rubbers.

Glycerol (1,2,3-propanetriol) is typically derived from both natural and petrochemical feedstocks (e.g., it is a co-product from the production of biodiesel, via soybean oil and other feedstocks), and is considered one of the most versatile chemicals for its wide range of applications. It is the backbone of all animal and vegetable triglycerides, constituting an average 10 wt % of the fatty portion. With the recent explosion in production of biofuels, glycerol has rapidly become a surplus in the market, as it is created as a byproduct in the manufacturing of biodiesel by transesterification of vegetable oils with methanol using NaOH as a catalyst (Pagliaro et al., "The Future of Glycerol: 2nd Edition. RSC Green Chemistry," (The Royal Society of Chemistry, $2^{nd}$ ed. 2010), which is herein incorporated by reference in its entirety). Sorbitol ((2S,3R,4R,5R)-hexane-1,2,3,4,5,6-hexol) is commonly produced from corn syrup or other sources of biomass. Dextrose is a simple monosaccharide found in plants. These small polyols currently represent some of the most inexpensive commodity chemicals available, ranging from $0.15 to $0.30 per pound. Thus, glycerol, sorbitol, and dextrose are "green," inexpensive, and offer multiple functional sites that can be exploited to alter their properties to be incorporated into biobased polymers.

Polyols are converted by standard acid- or base-catalyzed condensation chemistry to contain the conjugated and readily polymerizable acrylic (O=C—C=C) moiety. The resulting acrylated polyol can be represented by $AP_x$, in which x represents the average number of acrylic groups per molecule. At least one and as many as the maximum number of hydroxyl functionalities in the polyol can be arylated. Controlled free radical polymerization techniques, such as atom transfer radical polymerization (ATRP) and reversible addition-fragmentation chain transfer polymerization (RAFT) can be applied to these acrylated polyol monomers to yield thermoplastic rubbers or elastomers.

The distinctive feature of this polymerization is that it allows the design of the molecular architecture of the resultant polymers such that they are predominantly non-crosslinked linear or lightly branched chains that behave as rubbers/elastomers at room temperature but reversibly melt and are susceptible to common processing techniques at elevated temperatures. The success of the technology on polyols such as glycerol, sorbitol, or dextrose is surprising, as the multifunctional nature of polyol such as glycerol, sorbitol or dextrose have likely eliminated them as being considered as candidates for the basis of chain growth polymerization chemistries—even $AG_1$ (acrylated glycerol having an average of one acrylic group per molecule) contains a significant fraction of di- and even tri-acrylated moieties. Thus, it is reasonably expected that it would be fairly difficult to polymerize these monomers to result in a high molar mass thermoplastic polymer without gelation. However, the inventors have discovered that under certain conditions, ATRP and RAFT polymerizations can be successfully applied to polymerize acrylated polyols to achieve a high molecular weight and conversion rate.

The resulting acrylated polyol or poly(acrylated polyol) present properties capable of reducing mix and compaction temperatures, and preventing separation of rubbers during AR storage. Thus, the acrylated polyol or poly(acrylated polyol), such as acrylated glycerol, poly(acrylated glycerol), acrylated sorbitol, and/or poly(acrylated sorbitol), can be formulated as bio-based additives for the modification of asphalt cements. Moreover, the inventors have discovered that certain specific formulations of poly(acrylated polyols)—e.g., poly(acrylated glycerol) or poly(acrylated sorbitol)—have excellent properties as AR modifiers. For example, when added into an asphalt rubber composition, certain formulations of poly(acrylated polyols) can reduce mix and compaction temperature in asphalt cements, and thus can be used as "warm-mix" additive properties; certain formulations of poly(acrylated polyols) can extend the service temperature, and thus can be used as "grade-range extender"; certain formulations of poly(acrylated polyols) can prevent separation during AR storage, and thus can be used as "stabilizer/compatibilizer"; and certain formulations of poly(acrylated polyols) can soften otherwise unworkable asphalts such as those from vacuum tower bottoms, and thus can be used as "fluxes," i.e., additives used to soften asphalts from vacuum tower bottoms.

This technology enables the development of "green" and economical alternatives to petrochemically derived thermoplastic polymers. The resulting poly(acrylated polyol)-based thermoplastic copolymer can be used in thermoplastic rubber or elastomeric compositions for a variety of applications, such as adhesives (e.g., pressure-sensitive adhesives, hot-melt adhesives, or water soluble adhesives), sealants, components of tires, shoes, consumer electronics, bitumen modifiers, or viscosity modifiers for consumer care products or the oil fracking industry.

BRIEF DESCRIPTION OF THE DRAWINGS

FIG. 3 is a graph showing the results of differential scanning calorimetry (DSC) for a poly(acrylated glycerol) ("P(AG)") sample synthesized from the polymerization for 12 hours.

FIGS. 4A-4B are graphs showing the rheology curves of P(AG) samples synthesized using two different chain transfer agents: EMP (FIG. 4A) and ETMP (FIG. 4B), respectively. Reference temperature was 20° C.

FIGS. 9A-9C are graphs showing the rheology results measured by DSR at various conditions (unaged, RTFO aged, and PAV aged) for the AR binders and residual AR for the three samples in Example 3, Experiment 1: control AR (FIG. 9A); AR-V (FIG. 9B); and AR-AG (FIG. 9C).

FIGS. 10A-10C are graphs showing the grading results for the AR binders and residual AR for the three samples in Example 3, Experiment 1: control AR; AR-V; and AR-AG. FIG. 10A presents the G*/sin δ results. FIG. 10B presents the G* results. FIG. 10C presents the δ results.

FIGS. 15A-15F are graphs showing the comparison results between the samples in Experiment 1 and Experiment 2 in Example 3. FIG. 15A compares the grading results (G*/sin δ) for the AR binders and residual AR. FIG. 15B compares the grading results (G*) for the AR binders and residual AR. FIG. 15C compares the grading results (δ) for the AR binders and residual AR. FIG. 15D-15F compares the viscosities results for the AR binders and residual AR for control AR (FIG. 15D), AR-V (FIG. 15E), and AR-AG (FIG. 15F), respectively.

FIG. 19 shows tables and graphs summarizing the intermediate temperature continuous grade for the RTFO+PAV aged AR binders modified by P(AG), compared to the results of a non-stablized AR (control), AR binders stabilized with Vestenamer®, and an asphalt binder modified with 5% Kraton®.

FIG. 22 shows tables and graphs summarizing the percentage difference in DSR storage stability for AR binders modified by P(AG), compared to the results of a non-stablized AR (control), AR binders stabilized with Vestenamer®, and an asphalt binder modified with 5% Kraton®.

FIG. 25 shows tables and graphs summarizing the minimum compaction temperatures for AR binders modified by P(AG), compared to the results of a non-stablized AR (control), AR binders stabilized with Vestenamer®, and an asphalt binder modified with 5% Kraton®.

FIGS. 30A-C show the images of the poly(acrylated glycerol) polymer with molecular weight of 10K Daltons (FIG. 30A), 100K Daltons (FIG. 30B), and 1 million Daltons (FIG. 30C).

DETAILED DESCRIPTION OF THE INVENTION

Figure 1:
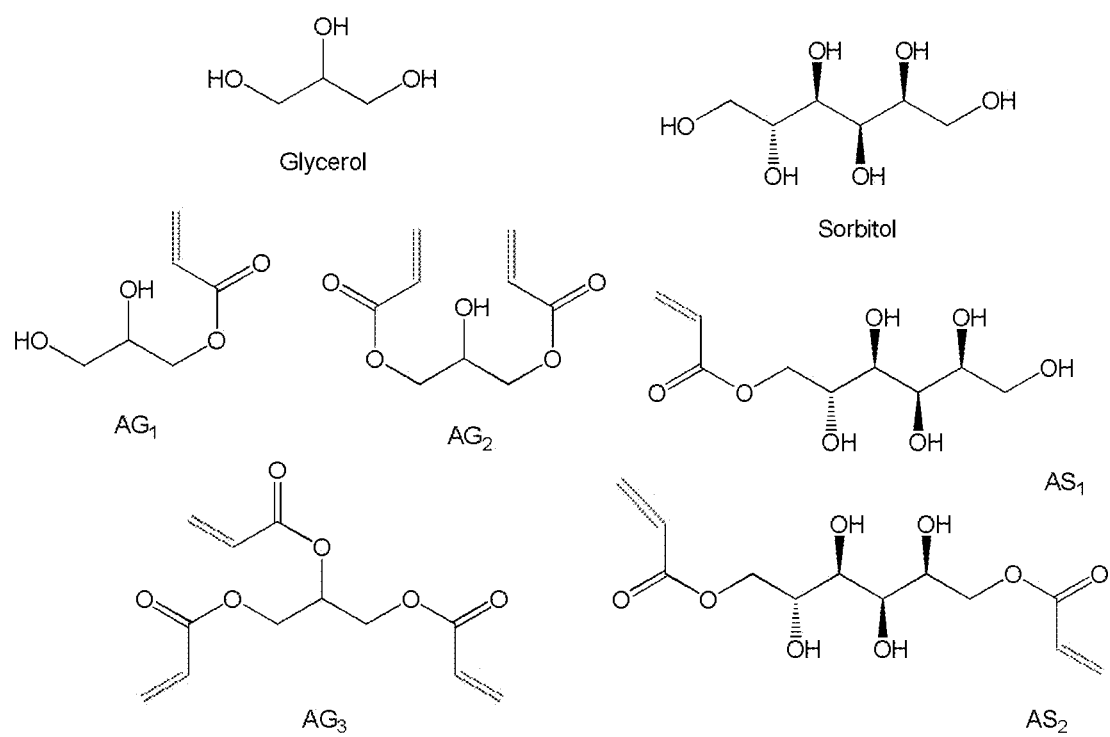
FIG. 1 shows the chemical structures for glycerol and sorbitol, and exemplary acrylated glycerol ($AG_x$) and exemplary acrylated sorbitol ($AS_x$) that may be present in the monomeric acrylated polyols, in which x is the number of acrylic groups. Acrylic groups were attached to glycerol or sorbitol through acid- or base-catalyzed condensation of glycerol or sorbitol with acrylic acid.
Figure 2A:
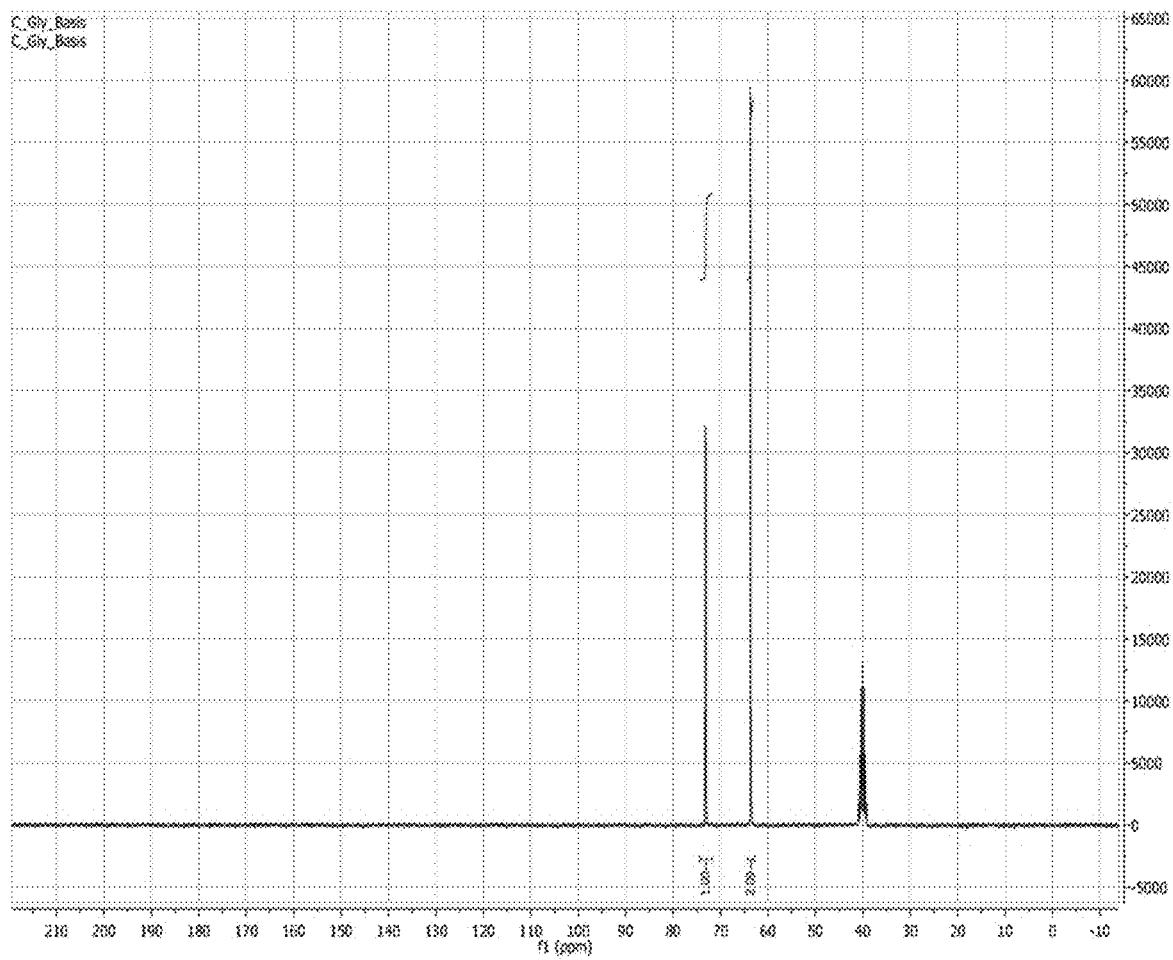
FIG. 2A is a graph showing the results of $^{13}C$-NMR for glycerol using deuterated DMSO as the solvent.
Figure 2B:
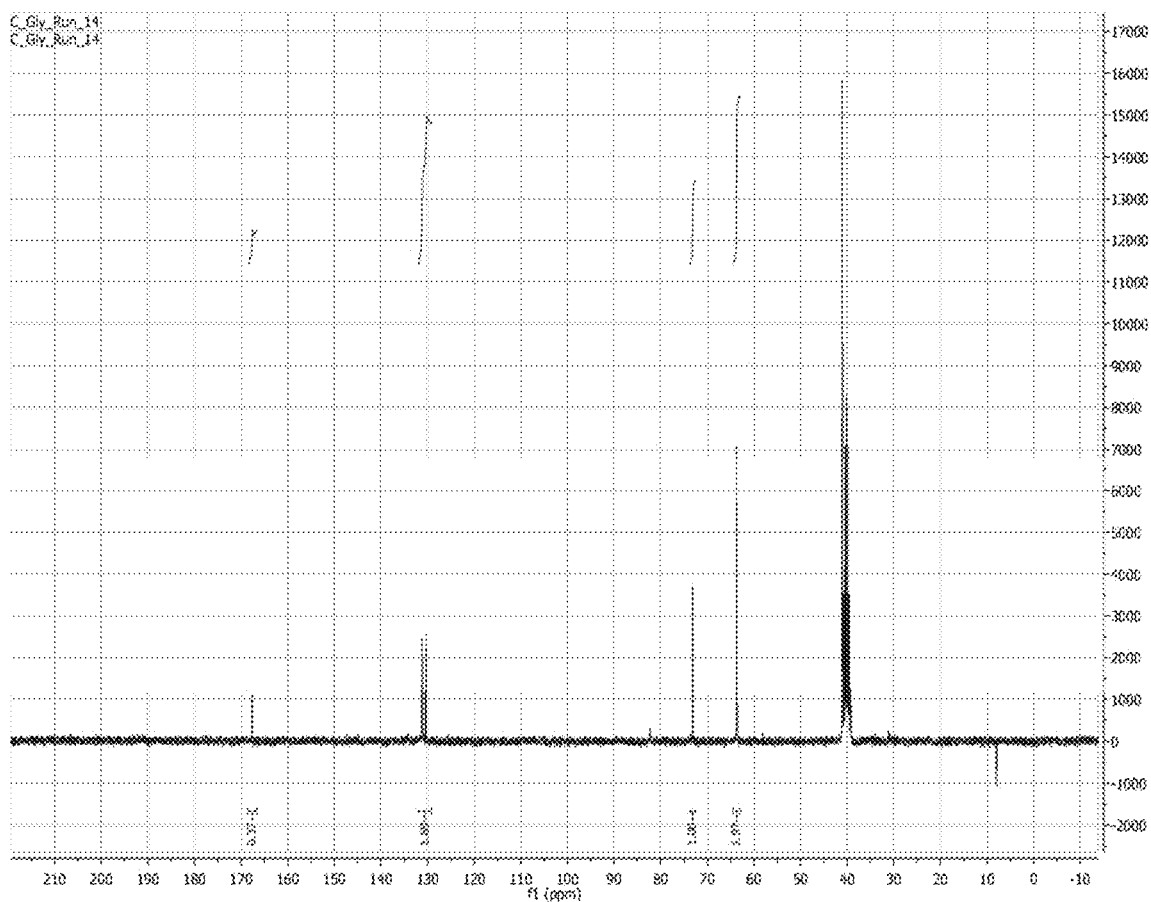
FIGS. 2B-2D are graphs showing the results of $^{13}C$ NMR for acrylated glycerol (AG) using deuterated DMSO as the solvent. The sample in FIG. 2B shows 0.85 acrylic groups per glycerol molecule. The sample in FIG. 2C shows 0.91 acrylic groups per glycerol molecule. The sample in FIG. 2D shows 2.15 acrylic groups per glycerol molecule.
Figure 2C:
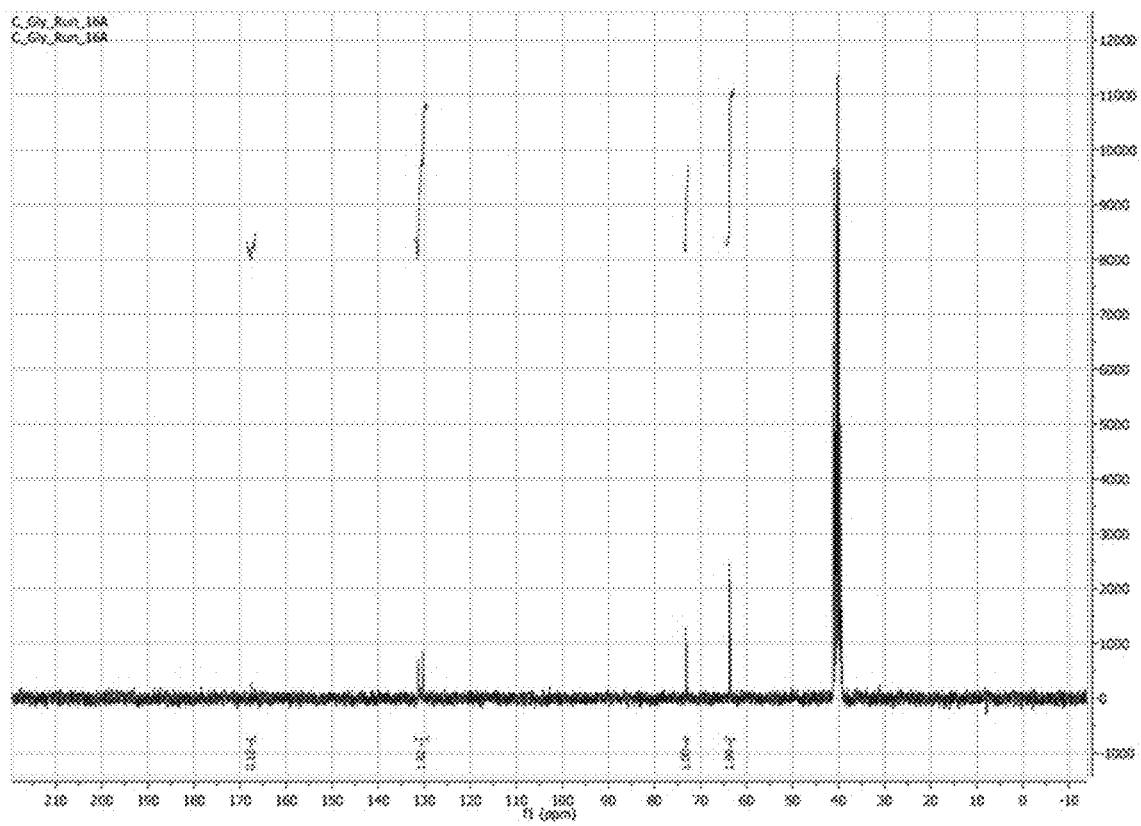
Figure 2D:
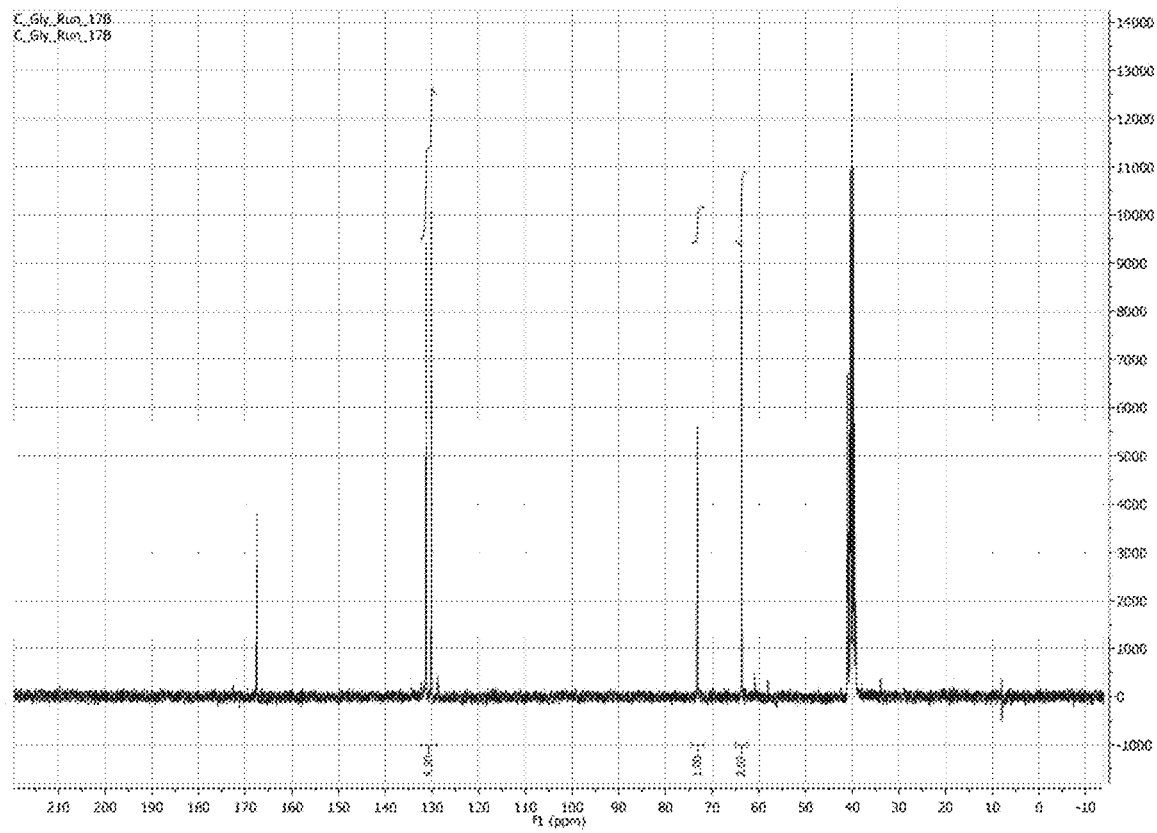

One aspect of the present invention relates to a thermoplastic copolymer comprising plural acrylated polyol monomeric units having different degrees of acrylation of hydroxyl groups. The acrylated polyol monomeric units have an average degree of acrylation greater than 1 and less than the number of the hydroxyl groups of the polyol.

Another aspect of the invention relates to a thermoplastic block copolymer comprising at least one PA block and at least one PB block. PA represents a polymer block comprising one or more units of monomer A and PB represents a polymer block comprising one or more units of monomer B. Monomer A is an acrylated polyol monomeric unit having different degrees of acrylation of hydroxyl groups. The acrylated polyol monomeric unit has an average degree of acrylation greater than 1 and less than the number of the hydroxyl groups of the polyol. Monomer B is a radically polymerizable monomer.

Another aspect of the invention relates to a thermoplastic statistical copolymer having a general formula of: $[A_i\text{-}B_j\text{-}C_k]_q$. A represents monomer A, which is an acrylated polyol monomeric unit having different degrees of acrylation of hydroxyl groups. The acrylated polyol monomeric unit has an average degree of acrylation greater than 1 and less than the number of the hydroxyl groups of the polyol. B represents monomer B, which is a radically polymerizable monomer. C represents monomer C, which is a radically polymerizable monomer. The monomer B is different than the monomer A, and the monomer C is different than the monomer A or monomer B. i, j, and k are average number of repeating units of monomer A, monomer B, and monomer C, respectively, such that i and j are each greater than 0 and less than 1, k is 0 to less than 1, provided that i+j+k=1. q represents the number average degree of polymerization and ranges from 10 to 100,000.

The polyols that can be used in the thermoplastic copolymer, block copolymer, or statistical copolymer include any polyols that are readily derived from natural biofeedstock or petrochemical feedstock as well as saccharides that contain multiple hydroxyl functional groups. Suitable polyols include, but are not limited to, ethylene glycol, propylene glycol, dipropylene glycol, 1,2,4-butanetriol, 1,7-heptanediol, glycerol, panaxatriol, panaxytriol, talose, balsaminol B, momordol, erythritol, enterodiol, xylitol, miglitol, sorbitol, mannitol, galactitol, isomalt, maltitol, and mixtures thereof. Suitable polyols can also include saccharides such as aldohexose, aldopentose, aldotetrose, aldotriose, aldose, allose, altrose, arabinose, amylopectin, amylose, dextrose, erythrose, fructose, galactose, glucose, gulose, hexose, idose, ketohexose, ketose, lactose, lyxose, maltose, mannose, pentose, ribose, saccharose, sucrose, talose, tetrose, triose, xylose, as well as their respective stereoisomers. Exemplary polyols used are glycerol, sorbitol, and dextrose.

The acrylated polyol monomeric unit can be represented by $AG_x$, in which x represents the average number of acrylic groups per arylated polyol molecule. At least one and as many as the maximum number of the hydroxyl functionalities in the polyol molecule can be arylated in the acrylated polyol monomeric unit. For example, glycerol contains 3 hydroxyl groups, and thus, in the acrylated glycerol represented by $AG_x$, x can range from greater than 0 to 3. Likewise, sorbitol contains 6 hydroxyl groups, and thus, in the acrylated sorbitol represented by $AS_x$, x can range from greater than 0 to 6. In the monomeric acrylated polyol $AP_x$, there can be a mixture of various acrylated polyol with different degrees of acrylation. For example, in the case of acrylated glycerol, while the majority monomeric acrylated polyol unit of $AG_x$ may be mono-acrylated glycerol, there can also be small populations of acrylated polyol monomeric unit that are non-acylated glycerol and di-acrylated glycerol (i.e., 2 hydroxyl groups of glycerol are acrylated) as well. Moreover, the monomeric $AP_x$ can also possess a small number of oligomers of arylated polyols, as the autopolymerization of the acrylic groups may not be completely suppressed. Accordingly, while $AP_x$ is referred to as "monomers" herein, it is to be understood that these monomeric units can contain mixtures having a distributions of various degree of arcylation and various molecular weight. Because the acrylated polyol monomeric unit is a mixture of various acrylated polyols, the resulting thermoplastic polymer is considered as a copolymer.

Exemplary acrylated polyol monomeric units are acrylated glycerol, acrylated sorbitol, and acrylated dextrose. The average degree of acrylation in acrylated glycerol can range from 0.01 to 3. Typically, the average degree of acrylation in acrylated glycerol ranges from 1.001 to 2.9, for instance, from 1.001 to 1.25. The average degree of acrylation in acrylated sorbitol can range from 0.01 to 6. Typically, the average degree of acrylation in acrylated sorbitol ranges from 1.001 to 3. The average degree of acrylation in acrylated dextrose can range from 0.01 to 5. Typically, the average degree of acrylation in acrylated dextrose ranges from 1.001 to 3. Structures of glycerol, sorbitol, and exemplary monomeric acrylated glycerol and acrylated sorbitol with different degrees of acrylation are shown in FIG. 1.

The structure of an exemplary poly(acrylated glycerol) molecule is shown in Scheme 1. Scheme 1 shows that the copolymer is a mixture of X units of mono-acrylated glycerol, Y units of di-acrylated glycerol, and Z units of tri-acrylated glycerol, and the resulting x, the average degree of acrylation of the poly(acrylated glycerol) molecule can be theoretically calculated as (X+Y+Z)/3.

Scheme 1

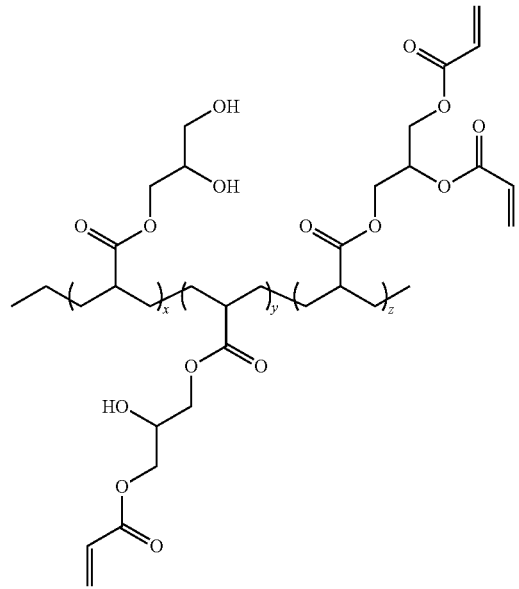

The thermoplastic copolymer has a linear or branched-chain structure, and has properties characteristic of thermoplastic substances in that it has the stability necessary for processing at elevated temperatures and yet possesses good strength below the temperature at which it softens. The thermoplastic copolymer has a glass transition temperature ($T_g$) below 0° C., for instance, from −60° C. to 0° C., from −60° C. to −15° C., or from −45° C. to −20° C. The thermoplastic copolymer has a molecular weight of at least 1 KDa, for instance, a molecular weight of 1 KDa to 10 MDa, 10 KDa to 1 MDa, 50 KDa to 10 MDa, or 50 KDa to 200 KDa.

The acrylated polyol monomeric unit can contain one or more conjugated sites that can increase the reactivity of acrylated polyol towards propagation reactions in the controlled radical polymerization.

In the thermoplastic block copolymer, the PA block represents a polymer block comprising one or more units of monomer A, with monomer A being an acrylated polyol monomeric unit having different degrees of acrylation of hydroxyl groups, wherein the acrylated polyol monomeric unit has an average degree of acrylation greater than 1 and less than the number of the hydroxyl groups of the polyol. Monomer A has been discussed in the above embodiments in the acrylated polyol-based thermoplastic copolymer.

The PB block can be polymerized from one or more radically polymerizable monomers, which can include a variety type of monomers such as vinyl (such as vinyl aromatic), acrylic (such as methacrylates, acrylates, methacrylamides, acrylamides, etc.), diolefin, nitrile, dinitrile, acrylonitrile monomer, a monomer with reactive functionality, and a crosslinking monomer.

Vinyl aromatic monomers are exemplary vinyl monomers that can be used in the block copolymer, and include any vinyl aromatics optionally having one or more substituents on the aromatic moiety. The aromatic moiety can be either mono- or polycyclic. Exemplary vinyl aromatic monomers for the PB block include styrene, α-methyl styrene, t-butyl styrene, vinyl xylene, vinyl naphthalene, vinyl pyridine, divinyl benzene, N-vinyl heteroaromatics (such as 4-vinylimidazole (Vim), N-vinylcarbazole (NVC), N-vinylpyrrolidone, etc.). Other exemplary vinyls include vinyl esters (such as vinyl acetate (VAc), vinyl butyrate (VB), vinyl benzoate (VBz)), N-vinyl amides and imides (such as N-vinylcaprolactam (NVCL), N-vinylpyrrolidone (NVP), N-vinylphthalimide (NVPI), etc.), vinylsulfonates (such as 1-butyl ethenesulfonate (BES), neopentyl ethenesulfonate (NES), etc.), vinylphosphonic acid (VPA), haloolefins (such as vinylidene fluoride (VF2)), etc. Exemplary methacrylates include $C_1$-$C_6$ (meth)acrylate (i.e., methyl methacrylate, ethyl methacrylate, propyl (meth)acrylate, butyl (meth)acrylate, isobutyl methacrylate, heptyl (meth)acrylate, or hexyl (meth)acrylate), 2-(acetoacetoxy)ethyl methacrylate (AAEMA), 2-aminoethyl methacrylate (hydrochloride) (AEMA), allyl methacrylate (AMA), cholesteryl methacrylate (CMA), t-butyldimethylsilyl methacrylate (BDSMA), (diethylene glycol monomethyl ether) methacrylate (DEGMA), 2-(dimethylamino)ethyl methacrylate (DMAEMA), (ethylene glycol monomethyl ether) methacrylate (EGMA), 2-hydroxyethyl methacrylate (HEMA), dodecyl methacrylate (LMA), methacryloyloxyethyl phosphorylcholine (MPC), (poly(ethylene glycol) monomethyl ether) methacrylate (PEGMA), pentafluorophenyl methacrylate (PFPMA), 2-(trimethylamonium)ethyl methacrylate (TMAEMA), 3-(trimethylamonium)propyl methacrylate (TMAPMA), triphenylmethyl methacrylate (TPMMA), etc. Other exemplary acrylates include 2-(acryloyloxy)ethyl phosphate (AEP), butyl acrylate (BA), 3-chloropropyl acrylate (CPA), dodecyl acrylate (DA), di(ethylene glycol) 2-ethylhexyl ether acrylate (DEHEA), 2-(dimethylamino) ethyl acrylate (DMAEA), ethyl acrylate (EA), ethyl a-acetoxyacrylate (EAA), ethoxyethyl acrylate (EEA), 2-ethylhexyl acrylate (EHA), isobornyl acrylate (iBoA), methyl acrylate (MA), propargyl acrylate (PA), (poly(ethylene glycol) monomethyl ether) acrylate (PEGA), tert-butyl acrylate (tBA), etc. Exemplary methacrylamides include N-(2-aminoethyl)methacrylamide (hydrochloride) (AEMAm) and N-(3-aminopropyl)methacrylamide (hydrochloride) (APMAm), N-(2-(dimethylamino)ethyl)acrylamide (DEAPMAm), N-(3-(dimethylamino)propyl)methacrylamide (hydrochloride) (DMAPMAm), etc. Other exemplary acrylamides include acrylamide (Am) 2-acrylamido-2-methylpropanesulfonic acid sodium salt (AMPS), N-benzylacrylamide (BzAm), N-cyclohexylacrylamide (CHAm), diacetone acrylamide (N-(1,1-dimethyl-3-oxobutyl) acrylamide) (DAAm), N,N-diethylacrylamide (DEAm), N,N-dimethylacrylamide (DMAm), N-(2-(dimethylamino)ethyl) acrylamide (DMAEAm), N-isopropylacrylamide (NIPAm), N-octylacrylamide (OAm), etc. Exemplary nitriles include acrylonitrile, adiponitrile, methacrylonitrile, etc. Exemplary diolefins include butadiene, isoprene, etc.

The radically polymerizable monomers suitable for usage herein also include those monomers with reactive functionality, e.g., a 'clickable' functionality so that when the monomers are incorporated in blocks, these 'clickable' functional groups can be used as a precursor to a polymer brush or copolymerized to provide sites for the attachment of functionality or for crosslinking. Exemplary reactive functionality include functional groups suitable for azide-alkyne 1,3-dipolar cycloaddition, such as azide functionality; "active ester" functional groups that are particular active with primary amine functionality; functional groups with protected thiol, hydrazide or amino functionality; functional groups with isocyanate or isothiocyanate functionality, etc.

The radically polymerizable monomers suitable for usage herein can also include those crosslinking monomers that are typically used both in the synthesis of microgels and polymer networks (see below). The monomers can include degradable crosslinks such as an acetal linkage, or disulfide linkages, resulting in the formation of degradable crosslinks. Exemplary crosslinking monomers diethyleneglycol dimethacrylate (DEGDMA), triethylene glycol dimethacrylate (TEGDMA), ethyleneglycol dimethacrylate (EGDMA), hexane-1,6-diol diacrylate (HDDA), methylene-bis-acrylamide (MBAm), divinylbenzene (DVB), etc.

A more extensive list of exemplary methacrylate monomers, acrylate monomers, methacrylamide monomers, acrylamide monomers, styrenic monomers, diene monomers, vinyl monomers, monomers with reactive functionality, and crosslinking monomers that are suitable for usage as the radically polymerizable monomers herein has been described in Moad et al., "Living Radical Polymerization by the Raft Process—a Third Update," *Australian Journal of Chemistry* 65: 985-1076 (2012), which is hereby incorporated by reference in its entirety.

Moreover, two or more different monomers can be used together in the formation of the PB block or different PB block in the block copolymer. A typical radically polymerizable monomer B used herein is styrene, and the resulting PB block is a styrene homopolymer. Another typical radically polymerizable monomer B used herein is methyl acrylate, and the resulting PB block is a methyl acrylate homopolymer.

The PB block can also be polymerized from one or more monomeric triglycerides, typically derived from a plant oil, animal fat, or a synthetic triglyceride. This polymerized plant oil or animal oil can be subsequently partially or fully saturated via a catalytic hydrogenation post-polymerization. The monomeric oils used in the block copolymer can be any triglycerides or triglyceride mixtures that are radically polymerizable. These triglycerides or triglyceride mixtures are typically plant oils. Suitable plant oils include, but are not limited to, a variety of vegetable oils such as soybean oil, peanut oil, walnut oil, palm oil, palm kernel oil, sesame oil, sunflower oil, safflower oil, rapeseed oil, linseed oil, flax seed oil, colza oil, coconut oil, corn oil, cottonseed oil, olive oil, castor oil, false flax oil, hemp oil, mustard oil, radish oil, ramtil oil, rice bran oil, salicornia oil, tigernut oil, tung oil, etc., and mixtures thereof. Typical vegetable oil used herein includes soybean oil, linseed oil, corn oil, flax seed oil, or rapeseed oil, and the resulting PB block is polymerized triglyceride or triglyceride derivatives.

The thermoplastic block copolymer can further comprise at least one PC block. The PC block can be polymerized from one or more radically polymerizable monomers. Any monomer that is suitable to form the PB block can be used to form the PC block.

The structure of an exemplary poly(acrylated glycerol) block copolymer is shown in Scheme 2. Scheme 2 shows that the copolymer is a mixture of X units of mono-acrylated glycerol, Y units of di-acrylated glycerol, Z units of tri-acrylated glycerol, and the resulting x, the average degree of acrylation of the poly(acrylated glycerol) molecule can be theoretically calculated as $(X+Y+Z)/3$. $R_1$ and $R_2$ are polymer blocks (e.g., the PB block and the PC block, respectively), different from the poly(acrylated glycerol) block.

Scheme 2

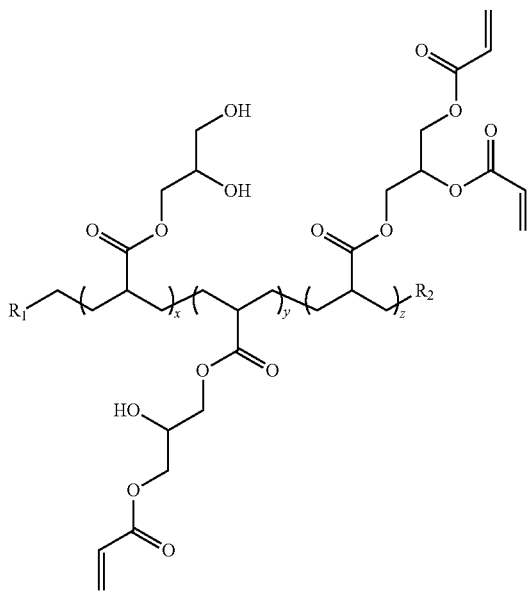

The thermoplastic block copolymer has a molecular weight ranging from 5 to 10 MDa, for instance, from 5 to 500 kDa, from about 15 to 300 kDa, from about 40 to about 100 kDa, or from about 80 to about 100 kDa. The PA block has a glass transition temperature ($T_g$) below 0° C., or below −15° C., for instance, from −60° C. to 0° C., from −60° C. to −15° C., or from −45° C. to −20° C. Typically, the PA block, PB block, and PC block, if present, each have a linear or branched-chain structure.

In the thermoplastic statistical copolymer $[A_i\text{-}B_j\text{-}C_k]_q$, Monomer A is based on an acrylated polyol monomeric unit having different degrees of acrylation of hydroxyl groups. Monomer A has been discussed in the above embodiments in the acrylated polyol-based thermoplastic copolymer.

Monomer B or monomer C can be each independently a vinyl, acrylic, diolefin, nitrile, dinitrile, acrylonitrile monomer, or monomer with reactive functionality, or crosslinking monomer. The exemplary embodiments for monomer B and monomer C suitable for usage in the thermoplastic statistical copolymer are the same as the exemplary embodiments for the monomer B, as described above in the thermoplastic block copolymer. Exemplary monomer B and monomer C include styrene, α-methyl styrene, t-butyl styrene, vinyl xylene, vinyl naphthalene, vinyl pyridine, divinyl benzene, vinyl acetate, N-vinylpyrrolidone, methyl acrylate, $C_1$-$C_6$ (meth)acrylate (i.e., methyl methacrylate, ethyl methacrylate, propyl (meth)acrylate, butyl (meth)acrylate, heptyl (meth)acrylate, or hexyl (meth)acrylate), acrylonitrile, adiponitrile, methacrylonitrile, butadiene, isoprene, radically polymerizable plant oils, or mixtures thereof. For example, the monomer B and the monomer C are each independently a vinyl aromatic monomer, such as a styrene; an acrylate monomer, such as a methyl (meth)acrylate; or a radically polymerizable plant oil, such as soybean oil, linseed oil, corn oil, flax seed oil, or rapeseed oil.

In one embodiment, the monomer C is absent.

One or more acrylated polyol monomeric units in the thermoplastic copolymer, block copolymer, or statistical copolymer can also contain one or more alkoxy groups, which can be derived from esterification of the un-acrylated hydroxy groups in the acrylated polyol. For instance, one or more acrylated polyol monomeric units in the thermoplastic copolymer contain one or more methoxy or ethoxy groups.

Exemplary applications of the poly(acrylated polyol)-based thermoplastic copolymers, block copolymers, and statistical copolymers include their use as "green" and economical alternatives to petrochemically derived thermoplastic polymers. For example, the thermoplastic copolymers, block copolymers, or statistical copolymers can be used as rubbers or elastomers; as components in consumer electronics, such as component for shock/impact protection or cover components; as asphalt modifiers; as resin modifiers; as engineering resins; as leather and cement modifiers; in footwear, such as in rubber shoe heels, rubber shoe soles; in automobiles, such as in tires, hoses, power belts, conveyor belts, printing rolls, rubber wringers, automobile floor mats, mud flaps for trucks, ball mill liners, and weather strips; as sealants or adhesives (such as pressure sensitive adhesives, hot-melt adhesives, or water soluble adhesives); in aerospace equipment; as viscosity modifiers for consumer care products, such as viscosity index improvers; as detergents; as diagnostic agents and supports therefore; as dispersants; as emulsifiers; as lubricants and/or surfactants; as paper additives and coating agents; as additives for the fracking industry, as fracking fluid; and in packaging, such as food and beverage packaging materials.

In some embodiments, the poly(acrylated polyol)-based thermoplastic copolymers, block copolymers, and statistical copolymers can be used as a main component in a thermoplastic elastomer composition, to improve the thermoplastic and elastic properties of the composition. To form an elastomeric composition, the poly(acrylated polyol)-based thermoplastic copolymers, block copolymers, or statistical copolymers can be further vulcanized, cross-linked, compatibilized, and/or compounded with one or more other materials, such as other elastomer, additive, modifier and/or filler. The resulting elastomer can be used as a rubber composition, in various industries such as in footwear, automobiles, packaging, or as an additive in the fracking industry, etc.

In one embodiment, the poly(acrylated polyol)-based thermoplastic copolymers, block copolymers, or statistical copolymers can be used in an automobile, such as in vehicle tires, hoses, power belts, conveyor belts, printing rolls, rubber wringers, automobile floor mats, mud flaps for trucks, ball mill liners, and weather strips. The automobile composition (e.g., vehicle tires) may further comprise a rubber compound. The thermoplastic copolymers, block copolymers, or statistical copolymers can serve as a main component in a thermoplastic composition, to improve the thermoplastic and elastic properties of the automobile compositions. The resulting compositions can be further vulcanized, cross-linked, compatibilized, and/or compounded with one or more other materials, such as other elastomer, additive, modifier and/or filler.

In one embodiment, the poly(acrylated polyol)-based thermoplastic copolymers, block copolymers, or statistical copolymers can be used in an asphalt binder composition, as an asphalt additive, modifier and/or filler. The asphalt binder composition may further comprise a crumb rubber.

In one embodiment, the poly(acrylated polyol)-based thermoplastic copolymers, block copolymers, or statistical copolymers can be used in an adhesive or sealant composition. The adhesive or sealant composition may further comprise a tackifier and/or a plasticizer, and/or a solvent. Suitable solvents include, but are not limited to, water, and an organic solvent such as dimethyl sulfoxide (DMSO), dimethylformamide (DMF), benzene, dioxane, toluene, chloroform, hexane, cyclohexane, xylene, carbon tetrachloride, acetone, acetonitrile, butanol, heptane, and ethanol. Suitable tackifiers include, but are not limited to, isosorbide-based tackifiers; Piccotac™1095 and Piccotac™8095; glycerol ester tackifiers, such as Staybelite™ Ester 10-E Ester of Hydrogenated Rosin and Staybelite™ Ester 3-E Ester of Hydrogenated Resin; Floral™ AX-E Fully Hydrogenated Rosin; phenolic resins; styrenated terpenes; polyterpenes; rosin esters; terpene phenolics; and monomeric resins. Suitable plasticizers include, but are not limited to, benzoflex 2088 (DEGD); abietic acid; Eastman™ Triacetin; Eastman 168™ non-phthalate plasticizer; polyalkylene esthers, such as polyethylene glycol, polytetramethylene glycol, polypropylene glycol, and mixtures thereof; glyceryl monostearate; octyl epoxy soyate, epoxidized soybean oil, epoxy tallate, and epoxidized linseed oil; polyhydroxyalkanoate; glycols, such as thylene glycol, pentamethylene glycol, and hexamethylene glycol; anionic or cationic plasticizers, such as dioctyl sulfosuccinate, alkane sulfonate, and sulfonated fatty acid; phthalate or trimellitate plasticizers; polyethylene glycol di-(2-ethylhexoate); citrate esters; naphthenic oil and dioctyl phthalate; white oil; lauric, sebacic, or citric acids esters; nonfugitive polyoxyethylene aryl ether; copolymer of ethylene and carbon monoxide; photopolymerizable unsaturated liquid plasticizer; and sorbitol.

In one embodiment, the poly(acrylated polyol)-based thermoplastic copolymers, block copolymers, or statistical copolymers can be used as an additive in the fracking fluid or as a fracking fluid. The fracking fluid may further comprise water and sand. A typical recipe for a fracking fluid comprises about 90% water, about 8-9% sand, and about 1-2% other chemicals such as biocides, acids, inhibitors, stabilizers, crosslinkers, friction reducers, pH adjusting agents, iron control, surfactants, and gelling agents. The poly(acrylated polyol)-based thermoplastic copolymers, block copolymers, or statistical copolymers can be used as a substitute for the gelling agents such as guar gum, can serve as a thickening agent for water, as a crosslinking agent, as a pH adjusting agent, as a breaking agent, or as a biocide. The fracking fluid composition can also comprise a thermoplastic polymer block added to confer a desired fluid property to the thermoplastic copolymer, statistical copolymer, or block copolymer. Suitable thermoplastic polymer block that can be added to the poly(acrylated polyol)-based thermoplastic copolymers, block copolymers, or statistical copolymers, discussed in the above embodiments, can also be used herein.

Another aspect of the present invention relates to a method of making a thermoplastic copolymer or block copolymer. The method comprises providing an acrylated polyol composition comprising plural acrylated polyol monomeric units having different degrees of acrylation of hydroxyl groups. The acrylated polyol composition has an average degree of acrylation greater than 1 and less than the number of the hydroxyl groups of the polyol. The method also comprises polymerizing the acrylated polyol composition through controlled radical polymerization to form the thermoplastic copolymer or block copolymer.

An acrylated polyol composition can be prepared by reacting one or more polyols with an acrylic reagent. Polyols are acrylated through a standard acid- or base-catalyzed condensation reaction. This reaction typically occurs at a mild temperature and produces water as the non-recyclable waste product. The reaction imparts acrylic functionality to the polyol molecule, rendering it to be readily polymerized and to interact with other rubber-like polymers such as polymers having backbones that contain tire rubber.

The acrylic reagent used can be an unsaturated carboxylic acid or an acidic halide. Suitable acrylic reagents include, but are not limited to, acrylic acid, acryloyl chloride, methacrylic acid, or other acid or acidic halide terminated with a vinyl.

The acrylic reagent is typically added in excess of the polyol. The amount of the acrylic reagent added may depend upon the desirable degree of acrylation: the more excessive of the acrylic reagent relative to the polyol, the larger degree of acrylation will be achieved. Typically, the stoichiometric ratio of the acrylic reagent to the polyol can range from 1 to the maximum number of the hydroxyl functionalities in the polyol molecule. For instance, the stoichiometric ratio of the acrylic reagent to glycerol typically ranges from 1 to 3.

The acrylation reaction is typically carried out at a temperature of 30° C. to 130° C., at a temperature of 50° C. to 110° C., or at a temperature of 90° C. to 110° C. The acrylation reaction can be carried out in the presence of a catalyst. Suitable catalysts include, but are not limited to, a homogeneous catalyst such as triphenyl phosphine or triamine pyrophosphate, or a heterogeneous polyanionic resin, such as the Amberlyst™ family (e.g., amberlyst 15). The acrylation reaction can be carried out in the presence of an inhibitor. Exemplary inhibitors include, but are not limited to, phenothiazine, hydroquinone, or antioxidant inhibitors such as the ETHANOX family (e.g., ETHANOX 330™.

The resulting arylated polyol can be represented by $AP_x$, in which x represents the average number of acrylic groups per arylated polyol molecule. At least one and as many as the maximum number of the hydroxyl functionalities in the polyol molecule can be arylated. For example, glycerol contains 3 hydroxyl groups prior to being acrylated. Acrylation of glycerol results $AG_x$, x can range from greater than 0 to 3. Likewise, sorbitol contains 6 hydroxyl groups prior to being acrylated. Acrylation of sorbitol results $AS_x$, where x ranges from greater than 0 to 6. In the resulting arylated polyol, $AP_x$, there can be a distribution of all possible reaction products. For example, in the case of acrylated glycerol, while $AG_1$ may be composed of mostly mono-acylated glycerol, there can also be small populations of non-acylated glycerol and di-acrylated glycerol as well.

Moreover, autopolymerization of the acrylic groups may not be completely suppressed. Thus, $AP_x$ can also possess a small number of oligomers of arylated polyol. Accordingly, while $AP_x$ is referred to as "monomers" herein, it is to be understood that these monomeric units can contain mixtures having a distributions of various degree of arcylation and various molecular weight.

Suitable polyols for acrylation include, but are not limited to, ethylene glycol, propylene glycol, dipropylene glycol, 1,2,4-butanetriol, 1,7-heptanediol, glycerol, panaxatriol, panaxytriol, talose, balsaminol B, momordol, erythritol, enterodiol, xylitol, miglitol, sorbitol, mannitol, galactitol, isomalt, and maltitol. Suitable polyols can also include saccharides such as aldohexose, aldopentose, aldotetrose, aldotriose, aldose, allose, altrose, arabinose, amylopectin, amylose, dextrose, erythrose, fructose, galactose, glucose, gulose, hexose, idose, ketohexose, ketose, lactose, lyxose, maltose, mannose, pentose, ribose, saccharose, sucrose, talose, tetrose, triose, xylose, as well as their respective stereoisomers. Exemplary polyols used are glycerol, sorbitol, and dextrose. The average degree of acrylation for glycerol can range from 0.01 to 3. Typically, the average degree of acrylation for glycerol ranges from 1.001 to 2.9, for instance, from 1.001 to 1.25. The average degree of acrylation for sorbitol can range from 0.01 to 6. Typically, the average degree of acrylation for sorbitol ranges from 1.001 to 3.

The acrylated polyol composition can then be polymerized through, e.g., free radical, anionic, or controlled radical polymerization. Typically, controlled radical polymerization is conducted on the acrylated polyol composition to form a thermoplastic copolymer, block copolymer, or statistical copolymer. The polymerizing step is carried out under conditions effective to produce the thermoplastic copolymer, block copolymer, or statistical copolymer with a molecular weight of at least 1 KDa without gelation. The resulting thermoplastic copolymer, block copolymer, or statistical copolymer has a linear or branched-chain structure.

The side reactions in the acrylation process can promote the joining of mono-acrylated polyol, di-acrylated polyol, or other multi-acrylated polyol to form larger molecules known as oligomers. The acrylated glycerol monomer or oligomers may be further polymerized.

The polymerizing step is performed through living free radical polymerization which involves living/controlled polymerization with free radical as the active polymer chain end (Moad et al., "The Chemistry of Radical Polymerization—Second Fully Revised Edition," Elsevier Science Ltd. (2006), which is hereby incorporated by reference in its entirety). This form of polymerization is a form of addition polymerization where the ability of a growing polymer chain to terminate has been removed. The rate of chain initiation is thus much larger than the rate of chain propagation. The result is that the polymer chains grow at a more constant rate than seen in traditional chain polymerization and their lengths remain very similar. The polymerizing step typically occurs in the presence of a free radical initiator, and a catalyst or a chain transfer agent to form the thermoplastic copolymer.

One form of living free radical polymerization is atom transfer radical polymerization. Atom transfer radical polymerization (ATRP) is a catalyzed, reversible redox process that achieves controlled polymerization via facile transfer of labile radicals (e.g., halide radicals) between growing polymer chains and a catalyst (Davis et al., "Atom Transfer Radical Polymerization of tert-Butyl Acrylate and Preparation of Block Copolymers," *Macromolecules* 33:4039-4047 (2000); Matyjaszewski et al., "Atom Transfer Radical Polymerization," *Chemical Reviews* 101:2921-2990 (2001), which are hereby incorporated by reference in their entirety). In ATRP, chain termination and transfer reactions are essentially eliminated by keeping the free radical concentration small. Briefly, the mechanism by which ATRP operates may be summarized as:

In Equation (1), the labile radical X may be a halogen (e.g., Br, Cl) attached to end of a polymer P. The catalyst, $Cu_IBr$, reversibly abstracts this halogen, forming a polymer free radical (P.). The equilibrium achieved between inert polymers and active polymer free radicals strongly favors the left side ($K<<10^{-8}$). Equation (2) is the standard free radical propagation reaction between a polymer of length i and a monomer M. The small free radical concentration ensured by equation (1) virtually eliminates termination reactions, and the halogen functionality is retained on polymers produced, which allows the production of copolymers from nearly any monomer amenable to conventional free radical polymerization.

The ATRP polymerization reaction starts with initiation. Initiation is accomplished by adding an agent capable of decomposing to form free radicals; the decomposed free radical fragment of the initiator attacks a monomer yielding a monomer-free radical, and ultimately produces an intermediate capable of propagating polymerization. These agents often are referred to as "initiators." The initiation is typically based on the reversible formation of growing radicals in a redox reaction between various transition metal compounds and an initiator.

Suitable initiators depend greatly on the details of the polymerization, including the types of monomers being used, the type of catalyst system, the solvent system and the reaction conditions. Simple organic halides are typically used as model halogen atom transfer initiators. Exemplary initiators are aralkyl halides or aryl halides, such as benzyl bromide or benzyl chloride.

In ATRP, the introduction of a catalyst system to the reaction media is required to establish the equilibrium between active states (active polymer free radicals for the growth of the polymer) and dormant states (the formed inert polymer). The catalyst is typically a transition metal compound being capable of participating in a redox cycle with the initiator and a dormant polymer chain. The transition-metal compound used herein is a transition-metal halide. Any transition metal that can participate in a redox cycle with the initiator and dormant polymer chain, but does not form a direct C-metal bond with the polymer chain, is suitable in the present invention. The exemplary transition metal includes $Cu^{1+}$, $Cu^{2+}$, $Fe^{2+}$, $Fe^{3+}$, $Ru^{2+}$, $Ru^{3+}$, $Ru^{4+}$, $Ru^{5+}$, $Ru^{6+}$, $Cr^{2+}$, $Cr^{3+}$, $Mo^0$, $Mo^+$, $Mo^{2+}$, $Mo^{3+}$, $W^{2+}$, $W^{3+}$, $Mn^{3+}$, $Mn^{4+}$, $Rh^+$, $Rh^{2+}$, $Rh^{3+}$, $Rh^{4+}$, $Re^{2+}$, $Re^{3+}$, $Re^{4+}$, $Co^+$, $Co^{2+}$, $Co^{3+}$, $V^{2+}$, $V_{3+}$, $V^{4+}$, $V^{5+}$, $Zn^+$, $Zn^{2+}$, $Au^+$, $Au^{2+}$, $Au^{3+}$, $Hg^+$, $Hg^{2+}$, $Pd^0$, $Pd^+$, $Pd^{2+}$, $Pt^0$, $Pt^+$, $Pt^{2+}$, $Pt^{3+}$, $Pt^{4+}$, $Ir^0$, $Ir^+$, $Ir^{2+}$, $Ir^{3+}$, $Ir^{4+}$, $Os^{2+}$, $Os^{3+}$, $Os^{4+}$, $Nh^{2+}$, $Nb^{3+}$, $Nh^{4+}$, $Nb^{5+}$, $Ta^{3+}$, $Ta^{4+}$, $Ta^{5+}$, $Ni^0$, $Ni^+$, $Ni^{2+}$, $Ni^{3+}$, $Nd^0$, $Nd^+$, $Nd^{2+}$, $Nd^{3+}$, $Ag^+$, and $Ag^{2+}$. A typical transition-metal catalyst system used herein is $CuCl/CuCl_2$.

The ligand serves to coordinate with the transition metal compound such that direct bonds between the transition metal and growing polymer radicals are not formed, and the formed copolymer are isolated. The ligand can be any N-, O-, P- or S-containing compound that coordinates with the transition metal to form a σ-bond, any C-containing compound that coordinates with the transition metal to form a π-bond, or any C-containing compound that coordinates with the transition metal to form a C-transition metal σ-bond but does not form a C—C bond with the monomers under the polymerizing conditions. A typical ligand used herein is pentamethyldiethylene-triamine (PMDETA).

The state of the art of ATRP has been reviewed by Matyjaszewski (Matyjaszewski et al., "Atom Transfer Radical Polymerization," *Chemical Reviews* 101:2921-2990 (2001), which is hereby incorporated by reference in its entirety). More details for selection of initiators and catalysts/ligand system for ATRP reaction can be found in U.S. Pat. No. 5,763,548 to Matyjaszewski et al. and U.S. Pat. No. 6,538,091 to Matyjaszewski et al., which are hereby incorporated by reference in their entirety. Detailed descriptions for ATRP polymerization of a similar system, conjugated vegetable oil-based thermoplastic copolymer, can be found in U.S. patent application Ser. No. 13/744,733 to Cochran et al., which is hereby incorporated by reference in its entirety.

Thus, some embodiments of the present invention relates to a method of making a thermoplastic copolymer or thermoplastic block copolymer via ATRP. The method comprises providing an acrylated polyol composition comprising plural acrylated polyol monomeric units having different degrees of acrylation of hydroxyl groups. The acrylated polyol composition has an average degree of acrylation greater than 1 and less than the number of the hydroxyl groups of the polyol. The method also comprises polymerizing the acrylated polyol composition through ATRP, in the presence of a solvent, a catalyst, a counter catalyst, an initiator, and a ligand.

In some other embodiments, the present invention relates to a method of making a thermoplastic block copolymer. The method comprises providing an acrylated polyol composition comprising plural acrylated polyol monomeric units having different degrees of acrylation of hydroxyl groups. The acrylated polyol composition has an average degree of acrylation greater than 1 and less than the number of the hydroxyl groups of the polyol. The method also comprises polymerizing the acrylated polyol composition through controlled radical polymerization in the presence of a solvent, a catalyst, a counter catalyst, a macromolecular initiator, and a ligand to form the thermoplastic block copolymer. The method can further comprise the providing a radically polymerizable monomer different than the acrylated polyol monomeric unit; and polymerizing the radically polymerizable monomer through atom transfer radical polymerization (ATRP) with the formed thermoplastic block copolymer as a macromolecular free radical initiator to add an additional block to the thermoplastic block copolymer.

The formed thermoplastic block copolymer based on poly (acrylated polyol) can be used as a macromolecular free radical initiator to add additional polymer block. Thus, the method can further comprise providing a radically polymerizable monomer different than the acrylated polyol monomeric unit; and polymerizing the radically polymerizable monomer with the formed thermoplastic block copolymer as a macromolecular free radical initiator to add an additional block to the thermoplastic block copolymer. The radically polymerizable monomer suitable for usage in the method are the same as the exemplary embodiments for the monomer B, as described above in the thermoplastic block copolymer.

One form of living free radical polymerization is Radical Addition-Fragmentation Chain Transfer (RAFT). Radical Addition-Fragmentation Chain Transfer (RAFT) polymerization is a type of living polymerization or controlled polymerization, utilizing a chain transfer agent (CTA). Conventional RAFT polymerization mechanism, consisting of a sequence of addition-fragmentation equilibria, is shown in Moad et al., "Living Radical Polymerization by the Raft Process—a First Update," *Australian Journal of Chemistry* 59: 669-92 (2006), which is incorporated herein by reference in its entirety. The RAFT polymerization reaction starts with initiation. Initiation is accomplished by adding an agent capable of decomposing to form free radicals; the decomposed free radical fragment of the initiator attacks a monomer yielding a propagating radical ($P_{\cdot n}$), in which additional monomers are added producing a growing polymer chain. In the propagation step, the propagating radical ($P_{\cdot n}$) adds to a chain transfer agent (CTA), followed by the fragmentation of the intermediate radical forming a dormant polymer chain and a new radical (R.). This radical (R.) reacts with a new monomer molecule forming a new propagating radical ($P_{\cdot m}$). In the chain propagation step, ($P_{\cdot n}$) and ($P_{\cdot m}$) reach equilibrium and the dormant polymer chain provides an equal probability to all polymers chains to grow at the same rate, allowing polymers to be synthesized with narrow polydispersity. Termination is limited in RAFT, and, if occurring, is negligible. Targeting a specific molecular weight in RAFT can be calculated by multiplying the ratio of monomer consumed to the concentration of CTA used by the molecular weight of the monomer.

The initiating agents often are referred to as "initiators." Suitable initiators depend greatly on the details of the polymerization, including the types of monomers being used, the type of catalyst system, the solvent system, and the reaction conditions. A typical radical initiator can be azo compounds, which provide a two-carbon centered radical. Radical initiators such as benzoyl peroxide, azobisisobutyronitrile (AIBN), 1,1' azobis(cyclohexanecarbonitrile) or (ABCN), or 4,4'-Azobis(4-cyanovaleric acid) (ACVA); redox initiator such as benzoyl peroxide/N,N-dimethylaniline; microwave heating initiator; photoinitiator such as (2,4,6-trimethylbenzoyl)-diphenylphosphine oxide; gamma radiation initiator; or lewis acids such as scandium(III) triflate or yttrium (III) triflate, are typically used in RAFT polymerization.

RAFT polymerization can use a wide variety of CTA agents. Suitable CTA agents should be capable of initiating the polymerization of the monomers (styrene and AESO) and achieve a narrow polydispersity in the process. For a RAFT polymerization to be efficient, the initial CTA agents and the polymer RAFT agent should have a reactive C=S double bond; the intermediate radical should fragment rapidly without side reactions; the intermediate should partition in favor of products, and the expelled radicals (R') should efficiently re-initiate polymerization. Suitable CTA agent is typically a thiocarbonylthio compound (ZC(=S)SR:

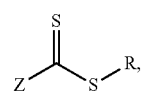

where R is free radical leaving group and Z is a group that modifies addition and fragmentation rates of RAFT polymerization. Exemplary CTA agents include, but are not limited to, a dithioester compound (where Z=aryl, heteraryl, or alkyl), a trithiocarbonate compound (where Z=alkylthio, arylthio, or heteroarylthio), a dithiocarbamate compound (where Z=arylamine or heterarylamine or alkylamine), and a xanthate compound (where Z=alkoxy, aryloxy, or heteroaryloxy), that are capable or reversible association with polymerizable free radicals. Z can also be sulfonyl, phosphonate, or phosphine. A more extensive list of suitable CTA agents (or RAFT agents) can be found in Moad et al., "Living Radical Polymerization by the Raft Process—a First Update," *Australian Journal of Chemistry* 59: 669-92 (2006); Moad et al., "Living Radical Polymerization by the Raft Process—a Second Update," *Australian Journal of Chemistry* 62(11):1402-72 (2009); Moad et al., "Living Radical Polymerization by the Raft Process—a Third Update," *Australian Journal of Chemistry* 65: 985-1076 (2012); Skey et al., "Facile one pot synthesis of a range of reversible addition-fragmentation chain transfer (RAFT) agents." *Chemical Communications* 35: 4183-85 (2008), which are hereby incorporated by reference in their entirety. Effectiveness of the CTA agent depends on the monomer being used and is determined by the properties of the free radical leaving group R and the Z group. These groups activate and deactivate the thiocarbonyl double bond of the RAFT agent and modify the stability of the intermediate radicals (Moad et al., "Living Radical Polymerization by the Raft Process—a Second Update," *Australian Journal of Chemistry* 62(11):1402-72 (2009), which is hereby incorporated by reference in its entirety). Typical CTA agents used are 1-phenylethyl benzodithioate or 1-phenylethyl 2-phenylpropanedithioate.

More details for selection of initiators, chain transfer agents, and other reaction conditions for RAFT reaction as well as detailed descriptions for RAFT polymerization of a similar system, conjugated vegetable oil-based thermoplastic copolymer, can be found in U.S. Provisional Application No. 61/825,241, filed May 20, 2013, to Cochran et al., which is hereby incorporated by reference in its entirety.

Thus, some embodiments of the present invention relates to a method of making a thermoplastic copolymer or thermoplastic block copolymer via RAFT. The method comprises providing an acrylated polyol composition comprising plurally acrylated polyol monomeric units having different degrees of acrylation of hydroxyl groups. The acrylated polyol composition has an average degree of acrylation greater than 1 and less than the number of the hydroxyl groups of the polyol. The method also comprises polymerizing the acrylated polyol composition through RAFT, in the presence of a free radical initiator, a solvent, and a chain transfer agent.

In one embodiment, polymerizing the acrylated polyol is carried out by RAFT polymerization. In RAFT polymerization, reaction time, temperature, and solvent concentration should be chosen appropriately to ensure the production of non-crosslinked thermoplastic elastomers. Reaction time relates closely to the temperature the reaction is carried out at: higher temperature requires shorter reaction times and lower temperature requires longer reaction times. Monitoring the time of the polymerization of the acrylated polyol is crucial as reacting the acrylated polyol too long causes the polymer to crosslink; whereas reacting the acrylated polyol for too short causes the polymer conversion to be too slow.

Temperatures for the RAFT polymerization on acrylated polyols can range from room temperature to up to 180° C. Typical reaction temperatures for a RAFT reaction of acrylated polyol is 120° C. or lower, for instance, from 50 to 120° C., or from 50° C. to 85° C.

The monomeric acrylated polyol to CTA ratio can vary depending upon the desired molecular weight. In polymerization of acrylated polyols, the multifunctional character of the monomer tends towards crosslinking. This crosslinking can be mitigated by the use of excess CTA. In one embodiment, RAFT polymerization is carried out at a molar ratio of the chain transfer agent to the monomer ranging from 1:1 to 1:10000.

Solvent is selected based the requirements of acrylated polyol solubility and a normal boiling point compatible with the polymerization temperature. The solvent used in the RAFT polymerization of acrylated polyol may be toluene, dioxane, THF, chloroform, cyclohexane, dimethyl sulfoxide, dimethyl formamide, acetone, acetonitrile, n-butanol, n-pentanol, chlorobenzene, dichloromethane, diethylether, tert-butanol, 1,2,-dichloroethylene, diisopropylether, ethanol, ethylacetate, ethylmethylketone, heptane, hexane, isopropylalcohol, isoamylalcohol, methanol, pentane, n-propylalcohol, pentachloroethane, 1,1,2,2,-tetrachloroethane, 1,1,1,-trichloroethane, tetrachloroethylene, tetrachloromethane, trichloroethylene, water, xylene, benzene, nitromethane, glycerol, or a mixture thereof. Typical solvent used for RAFT of acrylated polyols is methanol, glycerol, or a mixture thereof.

The concentrations of the monomeric acrylated polyol used in the reactions depend partially on the solubility of the monomer and the polymer products as well as the evaporation temperature of the solvent. Solvent concentration can affect the gelation of the polymer. Insufficient solvent in the RAFT reaction can cause the polymer to crosslink in a shorter time period without ever reaching high enough conversions. Therefore, solvent is typically added in excess to allow the polymer chains to grow and obtain a conversion rate to 80% without risk of the polymer reaching the gel point. The concentration of the monomeric acrylated polyol dissolved in the solvent in the RAFT reactions may range from 5% to 100% weight percentage monomer. Typically, a monomer concentration of less than 90 wt % is suitable to ensure the solubility of the resulting polymers and additionally to prevent premature gelation.

In one embodiment, the method is carried out in the presence of a solvent, with the acrylated polyol monomer having a concentration, when dissolved in the solvent, ranging from 1 wt % to 90 wt %, for instance, from 1 wt % to 40 wt %, from 1 wt % to 10 wt %, or from 20 wt % to 30 wt %.

In one embodiment, RAFT polymerization of the acrylated polyol is carried out with a free radical initiator selected from the group consisting of benzoyl peroxide and azobisisobutyronitrile.

In one embodiment, RAFT polymerization of the acrylated polyol is carried out in the presence of a chain transfer agent. The chain transfer agent used can be a thiocarbonylthio compound, a dithioester compound, a trithiocarbonate compound, a dithiocarbamate compound, or a xanthate compound capable of reversible association with polymerizable free radicals. Typically, the chain transfer agent is 1-phenylethyl benzodithioate, 1-phenyl ethyl 2-phenylpropanedithioate, or dibenzyl carbonotrithioate.

In some other embodiments, the present invention relates to a method of making a thermoplastic block copolymer. The method comprises providing an acrylated polyol composition comprising plurally acrylated polyol monomeric units having different degrees of acrylation of hydroxyl groups. The acrylated polyol composition has an average degree of acrylation greater than 1 and less than the number of the hydroxyl groups of the polyol. The method also comprises polymerizing the acrylated polyol composition through controlled radical polymerization in the presence of a free radical initiator, a solvent, and a macromolecular-chain transfer agent to form the thermoplastic block copolymer. The method can further comprise providing a radically polymerizable monomer different than the acrylated polyol monomeric unit, and polymerizing the radically polymerizable monomer through reversible addition-fragmentation chain-transfer polymerization (RAFT) with the formed thermoplastic block copolymer as a macromolecular-chain transfer agent to add an additional block to the thermoplastic block copolymer.

The formed thermoplastic block copolymer based on poly (acrylated polyol) can be used as a macromolecular free radical initiator to add additional polymer block. Thus, the method can further comprise providing a radically polymerizable monomer different than the acrylated polyol monomeric unit; and polymerizing the radically polymerizable monomer with the formed thermoplastic block copolymer as a macromolecular chain transfer agent to add an additional block to the thermoplastic block copolymer. The radically polymerizable monomer suitable for usage in the method are the same as the exemplary embodiments for the monomer B, as described above in the thermoplastic block copolymer.

Another aspect of the invention relates to a method of preparing a thermoplastic statistical copolymer. The method comprises providing monomer A, which is an acrylated polyol monomeric unit having different degrees of acrylation of hydroxyl groups, wherein the acrylated polyol monomeric unit has an average degree of acrylation greater than 1 and less than the number of the hydroxyl groups of the polyol. The method also comprises providing a radically polymerizable monomer, represented by B. The method further comprises polymerizing monomer A and monomer B simultaneously, via reversible addition-fragmentation chain-transfer polymerization (RAFT), in the presence of a free radical initiator and a chain transfer agent to form the thermoplastic statistical copolymer. The polymerizing step may be carried out under conditions effective to achieve a number average degree of polymerization ($N_n$) for the thermoplastic statistical copolymer of up to 100,000 without gelation.

The method can be used to simultaneously polymerize three or more different monomer units. For instance, another radically polymerizable monomer, represented by C can also be provided, in addition to monomer A and monomer B. Monomer C is different than monomer A or monomer B. Monomer A, monomer B, and monomer C are then polymerized simultaneously, via RAFT, in the presence of the free radical initiator and the chain transfer agent to form the thermoplastic statistical copolymer. The polymerizing step may be carried out under conditions effective to achieve a number average degree of polymerization ($N_n$) for the thermoplastic statistical copolymer of up to 100,000 without gelation.

Suitable RAFT polymerization conditions, reaction reagents, and monomers A, B, and C for the method of preparing the thermoplastic statistical copolymer are the same as those discussed in the above embodiments.

The above-described controlled radical polymerization can be used to polymerize acrylated polyol, under the above-described reaction conditions effective to produce the thermoplastic copolymer, block copolymer, and statistical copolymer with a molecular weight ranging 1 KDa to 10 MKDa without gelation, for instance, a molecular weight of 50 KDa to 200 KDa without gelation, or a molecular weight of 50 KDa to 10 MKDa without gelation.

The thermoplastic copolymer, block copolymer, or statistical copolymer can be further reacted with an organic acid to esterify one or more remaining un-acrylated hydroxy groups in one or more acrylated polyol monomeric units, to change the solvent compatibility of the thermoplastic copolymer, block copolymer, or statistical copolymer. Alternatively, the acrylated polyol monomer, prior to polymerization, can be treated with the organic acid to esterify one or more remaining un-acrylated hydroxy groups the acrylated polyol monomer. Suitable organic acid include any organic acid capable of converting the free hydroxy groups in the acrylated polyol into alkoxy groups, such as methoxy or ethoxy. Typically used organic acids are formic acid, acetic acid, hexanoic acid, ethanoic acid, propanoic acid, amongst others.

The thermoplastic copolymer, block copolymer, or statistical copolymer, when containing unreacted acrylated groups, can undergo a crosslinking reaction at an elevated temperature. Moreover, the thermoplastic copolymer, block copolymer, or statistical copolymer can be further chemically modified with a crosslinking agent to undergo a crosslinking reaction at an elevated temperature.

The crosslinking agent used to chemically modify the thermoplastic copolymer, block copolymer, or statistical copolymer can include those that are typically used both in the synthesis of microgels and polymer networks, e.g., degradable crosslinks such as an acetal linkage, or disulfide linkages, resulting in the formation of degradable crosslinks. Exemplary crosslinking agents used to modify the thermoplastic copolymer, block copolymer, and statistical copolymer include diethyleneglycol dimethacrylate (DEGDMA), diethylene glycol diacrylate, triethylene glycol dimethacrylate (TEGDMA), ethyleneglycol dimethacrylate (EGDMA), hexane-1,6-diol diacrylate (HDDA), methylene-bis-acrylamide (MBAm), divinylbenzene (DVB), p-divinylbenzene (p-DVB), sulfur, 1,4-cyclohexanedimethanol divinyl ether, N,N'-(1,2-dihydroxyethylene)bisacrylamide, ethylene glycol diacrylate, ethylene glycol dimethacrylate, 4,4'-Methylenebis(cyclohexyl isocyanate), 1,4-Phenylenediacryloyl chloride, poly(ethylene glycol) diacrylate, poly(ethylene glycol) dimethacrylate, tetra(ethylene glycol) diacrylate, tetraethylene glycol dimethyl ether, triethylene glycol dimethacrylate, potassium metaborate, triethanolaminezirconate, sodium tetraborate, boric acid, zirconium complexes, borate salts, methanol, etc.

The thermoplastic copolymer, block copolymer, or statistical copolymer can be further chemically modified with a reagent to confer an acidic or basic functionality to the thermoplastic copolymer, block copolymer, or statistical copolymer, making the thermoplastic copolymer, block copolymer, or statistical copolymer a pH adjusting agent. Unreactive hydroxyl groups in the polyols can be modified with a diacid such as oxalic acid, malonic acid, succinic acid, glutatic acid, adipic acid, pimelic acid, suberic acid, azelaic acid, sebacic acid, undecanoic acid, dodecanoic acid; or a dicarboxylic acid such as ortho-phtalic acid, isophtalic acid, terephthalic acid, to provide an acidic environment. Unreactive hydroxyl groups in the polyols can also be modified with a dibasic salt such as glyphosphate, hydroquinone, resorcinol, to provide a basic environment.

The thermoplastic copolymer, block copolymer, or statistical copolymer can be further chemically modified with a reagent to confer a biocidic functionality to the thermoplastic copolymer, block copolymer, or statistical copolymer, making the thermoplastic copolymer, block copolymer, or statistical copolymer a biocide agent. The reagent can be a quaternary ammonium, glutaraldehyde, tetrakis hydroxymethyl phosphonium sulfate, etc.

Another aspect of the present invention relates to an asphalt composition. The asphalt composition comprises: i)

an asphalt component; ii) a crumb rubber having a weight percentage in the range of 1% to 15%; and iii) a thermoplastic copolymer, block copolymer, or statistical copolymer as an asphalt additive, modifier, and/or filler having a weight percentage in the range of 0.01% to 1.05%. Any of the thermoplastic, block copolymer, and statistical copolymer discussed in the above embodiments can be used herein.

A typical source of crumb rubber is ground tire rubber (GTR). Two basic types of GTR are available based on the processes of preparing the GTR: cryogenic GTR is produced by shredding the tire into relatively large pieces and then subjecting the rubber to grinding under cryogenic conditions; ambient or warm-ground GTR is produced under warm or ambient grinding procedure. The shredding and pulling apart of the tire rubber at ambient temperatures produces irregular particles having a high surface area which desirably increases the number of reactive sites available for bonding or cross-linking with the acrylated polyol-based thermoplastic copolymer. There are many sources of GTR and the material can be used in the vulcanized or a devulcanized form. Devulcanized GTR produced by either an oxidative or reductive process can be used.

GTR of various particle sizes can be incorporated into an asphalt cement. Typically, any GTR having particle sizes smaller than about 10 mesh can be used. Exemplary ground tire rubbers have particle sizes capable of passing 20 mesh to 80 mesh screens, for instance, 30 mesh to 40 mesh screens.

Another suitable source of crumb rubber is ground industrial waste rubber. These materials can be produced by either ambient grinding or cryogenic grinding. Different types of crumb rubbers can be mixed to achieve desired properties.

The aggregate used to prepare the asphalt component can be one or a mixture of the various standard aggregates used in the art, including gravel, crushed rock, stone, quarry gravel, and recycled paving material.

To enhance certain performance specifications, other asphalt modifiers or additives can be incorporated in the asphalt composition. For instance, mineral oil, heating oils, vegetable oils, or light petroleum distillates can be added to an asphalt binder to maintain the PG value within an acceptable range.

In the asphalt rubber formulations containing the poly (acrylated polyol)-based thermoplastic copolymer, block copolymer, or statistical copolymer, varying parameters, such as the concentration of the poly(acrylated polyol)-based thermoplastic copolymer, block copolymer, or statistical copolymers, the average degree of acrylation in the poly(aryclated polyol), and the molecular weight of the poly(aryclated polyol), can affect the performance of the resulting asphalt rubber.

For the poly(acrylated polyol)-based thermoplastic copolymer, typically, the thermoplastic copolymer, block copolymer, or statistical copolymer can have a weight percentage in the range of 0.1 wt % to 30 wt % relative to the weight of the crumb rubber, e.g., a range of 0.1 wt % to 7 wt %, or 2.5 wt % to 6.5 wt % relative to the weight of the crumb rubber. The degree of acrylation for the poly(acrylated polyol)-based thermoplastic copolymer typically can range from 1.001 to 2.9. Typically, a low degree of acrylation is desirable for the asphalt formulation, which ranges from 1.001 to 1.25, from 1.001 to 1.17, or from 1.001 to 1.05. The molecular weight for the poly(acrylated polyol)-based thermoplastic copolymer, block copolymer, or statistical copolymer can range from 1 KDa to 10M KDa, from 0 to 50 KDa, from 50 KDa to 10M KDa, from 50 KDa to 200 KDa, or from 200 KDa to 10M KDa. Typically, a medium molecular weight of acrylated glycerol-based thermoplastic copolymer, block copolymer, or statistical copolymer is desirable for the asphalt formulation, which ranges from 200 KDa to 10M KDa.

The detailed formulations for the poly(acrylated polyol)-based thermoplastic copolymer, block copolymer, or statistical copolymer in terms of the average degree of acrylation in the poly(aryclated polyol), the molecular weight of the poly(aryclated polyol), and the concentration of the poly (aryclated polyol) relative to the crumb rubber, and resulting performances of the asphalt rubbers are exemplified in Examples 3 and 4. The use of the poly(acrylated glycerol) in asphalt rubber improves performance in all the characteristics of the asphalt rubbers, e.g., reduces the low continue performance grade of the asphalt rubber, reduces sensitivity of the asphalt rubber's viscosity to temperature, reduces the asphalt rubber binder's modulus at low temperature, and lowers the separation of the asphalt rubbers after curing.

In one embodiment, the polyol in the poly(acrylated polyol)-based thermoplastic copolymer, block copolymer, or statistical copolymer is glycerol; the average degree of acrylation ranges from 1.001 to 1.25; the thermoplastic copolymer, block copolymer, or statistical copolymer has a molecular weight ranging from 50 KDa to 200 KDa; and the weight concentration of the thermoplastic copolymer, block copolymer, or statistical copolymer relative to the weight of the crumb rubber is 4.5%. The resulting asphalt composition has one or more of the following properties: a high temperature grade higher than 78° C., a low temperature grade no higher than −29° C., a grade range higher than 107° C., a minimum mixing temperature lower than 171° C., and a minimum compaction temperature lower than 161° C.

In one embodiment, the polyol in the poly(acrylated polyol)-based thermoplastic copolymer, block copolymer, or statistical copolymer is glycerol; the average degree of acrylation ranges from 1.001 to 1.25; the thermoplastic copolymer, block copolymer, or statistical copolymer has a molecular weight ranging from 50 KDa to 200 KDa; and the weight concentration of the thermoplastic copolymer relative to the weight of the crumb rubber is 6.5%. The resulting asphalt composition has one or more of the following properties: a high temperature grade higher than 82° C., a low temperature grade no higher than −28.5° C., a grade range higher than 110° C., a minimum mixing temperature lower than 179° C., and a minimum compaction temperature lower than 168° C.

The resulting asphalt composition prepared from the above embodiments can be stable and homogenous for at least 3 days under a temperature of 130° C. to 180° C.

Another aspect of the present invention relates to a method for preparing a homogeneous asphalt composition. The method comprises mixing a thermoplastic copolymer, block copolymer, or statistical copolymer as an asphalt additive, modifier, and/or filler, with a weight percentage in the range of 0.01% to 1.05%, into an asphalt composition to form a homogeneous asphalt composition. The asphalt composition comprises: i) an asphalt component, and ii) a crumb rubber having a weight percentage in the range of 1% to 15%. Any of the thermoplastic copolymer, block copolymer, or statistical copolymer discussed in the above embodiments can be used herein.

Suitable crumb rubbers, sizes of the crumb rubbers, aggregate used to prepare the asphalt component, other asphalt modifiers or additives, and detailed asphalt rubber formulations containing the poly(acrylated polyol) varying the average degree of acrylation, the molecular weight and the concentration of poly(aryclated polyol) have been described in the above embodiments relating to the asphalt composition, and are also suitable for the method of preparing the homogeneous asphalt composition herein.

One way to mix the thermoplastic copolymer, block copolymer, or statistical copolymer into an asphalt composition is by premixing GTR and the thermoplastic copolymer, block copolymer, or statistical copolymer, then adding the pre-mixture to an asphalt component, typically a hot liquified asphalt cement, and continuing the mixing at the same temperature range.

Alternatively, the GTR can be mixed with an asphalt component, typically a hot liquified asphalt cement. The thermoplastic copolymer, block copolymer, or statistical copolymer is then added into the mixture, and the mixing is continued at the same temperature range.

The mixing temperature can depend upon the qualities and characteristics of the asphalt cement. The mixing of the acrylated-polyol-based thermoplastic copolymer, block copolymer, or statistical copolymer with the asphalt rubber composition is typically carried out at a temperature range of 130° C. to 180° C.

The use of the poly(acrylated glycerol) in an asphalt rubber lowers mixing and compaction temperatures and lowers the separation of the asphalt rubber after curing. Thus, the mixing can occur at a location remote from the location at which the homogeneous asphalt composition is used. The resulting asphalt composition is stable and homogenous for at least 3 days at a temperature of 130° C. to 180° C.

EXAMPLES

The following examples are for illustrative purposes only and are not intended to limit, in any way, the scope of the present invention.

Example 1—Synthesis of Poly(Acrylated Glycerol) (P(AG)) Via Reversible Addition-Fragmentation Chain Transfer Polymerization (RAFT)

Acrylation of Glycerol

Glycerol was mixed with hydroquinone (inhibitor, 0.5 wt % of glycerol), thiamine pyrophosphate (TPP, catalyst) in a 0.06:1 mass ratio to glycerol, acrylic acid in a 1.5:1 mass ratio to glycerol, and DMSO in a 1:1 mass ratio to glycerol. The reaction was stirred and bubbled for 20 minutes, and then heated to 90° C. The reaction was allowed to proceed for a minimum of 12 hours, and was ended by cooling to room temperature. The final acrylated glycerol was mixed with cyclohexane to remove DMSO, and was dried overnight on vacuum ovens under room temperature.

RAFT Polymerization of Acrylated Glycerol

RAFT synthesis was performed in a similar manner to the procedure described in Moad et al., "Living radical polymerization by the raft process—a first update," *Australian Journal of Chemistry* 59:669-92 (2006); Moad et al., "Living radical polymerization by the raft process—a second update," *Australian Journal of Chemistry* 62(11):1402-72 (2009), which are hereby incorporated by reference in their entirety. Briefly, azobisisobutyronitrile (AIBN) was used as the initiator, 1-phenylethyl benzodithioate (PBT) was used as the chain transfer agent (CTA).

Monomer (acrylated glycerol), initiator, CTA, and solvent (DMSO) were mixed under argon in a 100 mL round-bottomed flask with various mass ratios of monomer to solvent, 1:5 molar ratio of initiator to CTA, and 10:1 molar ratio of monomer to CTA. The reaction flask was bubbled with argon for 30 minutes to remove oxygen from the system before the temperature was increased. The reaction was run at 95° C., and the reaction time varied according the desired molecular weight (Mn). The polymer was precipitated by adding isopropanol drop wise, and was then dried on vacuum oven under room temperature for 24 hours.

Procedure for Calculating the Number of Acrylic Groups Per Molecule $^{13}$C-NMR was used to calculate the number of acrylic groups per molecule. The integral of peak at ~74 was set to a value of 1. The integral of peak at ~64 would then be approximately 2. The integrals over both peaks at ~130 were then combined. These are the carbon peaks of the acrylic groups. The integral was then divided by two to obtain the average number of acrylic groups per molecule because there are two carbons per acrylic group. The integral of peak at ~168 was calculated (carboxyl carbon).

Varying ratios of reactants, the amount of solvent, and the reaction time can vary the average number of acrylic groups per molecule. The $^{13}$C-NMR results are shown in FIGS. 2A-2D. The correlation between the average number of acrylic groups per molecule and various reaction conditions are shown in Table 1. The results demonstrate that glycerol's primary alcohols were all acrylated, while not all the secondary alcohols were acrylated. These findings agree with the reactivity of alcohols (1°>2°>3°), suggesting that a longer reaction time, an increased temperatures, or an increase in the acrylic acid concentration are desirable to further acrylate the secondary alcohols.

TABLE 1

List of acrylated glycerol materials with their proper reaction time, pH, and acrylic groups per molecule.

|  | 1 | 2 | 3 |
| --- | --- | --- | --- |
| Glycerol (g) | 50.312 | 50.153 | 50.458 |
| Acrylic Acid (mL) | 55.35 | 55.35 | 117 |
| Hydroquinone (g) | 0.21 | 0.211 | 0.442 |
| Triphenolphosphine (g) | 2.617 | 2.616 | 2.616 |
| DMSO (mL) | 45 | 25 | 35 |
| Reaction Time | 2.5 hr | 3 hr | 2.5 hr |
| pH | 7 | 7 | 7 |
| Acrylic groups/molecule | 0.85 | 0.91 | 2.15 |

Viscoelastic/Thermal Characterization

Differential scanning calorimetry (DSC) experiments showed a glass transition temperature ($T_g$) for the P(AG) at 14° C. See FIG. 3.

It was also found that the product's viscosity was affected by the degree of acrylation—as the degree of acrylation increased the product became more viscous.

Rheology samples were mixed with butylated hydroxytoluene (BHT) to prevent crosslinking of the polymer. FIG. 4 shows the rheology curves of two different P(AG) polymers synthesized using two different CTA: 2-ethylsulfanyl-thiocarbonylsulfanyl)-2-methylpropionic acid (EMP) and ethyl 2-((ethoxycarbonothioyl)thio)-2-methylpropanoate (ETMP), respectively. The results showed a low modulus and liquid-like behavior at high temperatures, which is the characteristics of thermoplastic elastomers. These curves also showed a rubbery plateau, signaling a high entangled system.

All these findings proved that these P(AG) polymers can be used as substitutes for petroleum-based elastomers.

Example 2—Synthesis of Poly(Acrylated Glycerol) (P(AG)) or Poly(Acrylated Sorbitol) (P(AS)) Via RAFT Synthesis of $AG_x$ or $AS_x$ Synthesis of $AG_x$ or $AS_x$ can be carried out following the general processes described below.

Process 1:

G moles glycerol (sorbitol) are combined with 1-5% by mass hydroquinone or Ethanox 330™ (oxidative inhibitors), triphenylphosphine (TPP) or Amberlyst 15 (catalyst) in a 0.05:1 mass ratio to glycerol, and xG mol of acrylic acid (x is the molar ratio of acrylic acid to glycerol or sorbitol). The mixture is stirred and air-sparged for 36 hours at either 127° C. (TPP) or 120° C. (Amberlyst). Inhibitor and air-sparging ($O_2$) help to reduce auto-polymerization (which will otherwise lead to gelation). After 36 hours, the reaction is terminated by cooling to room temperature. The monomer contains up to 20% of the initial charge of acrylic acid.

Process 2:

G moles glycerol (sorbitol) are combined with 1-5% by mass hydroquinone or Ethanox 330™, 0.05:1 mass ratio of triphenylphosphine (TPP) or Amberlyst 15 (catalyst) to glycerol, and xEG moles acrylic acid. Here, xE is the molar ratio of acrylic acid to glycerol or sorbitol, and means an excess stoichiometric ratio that ranges from 1 to 3. The reaction is stirred and air-sparged for 8 hours between 90° C.-110° C.

In contrast to Process 1, the lower temperature in Process 2 substantially reduces autopolymerization; the use of a molar excess of acrylic acid allows the desired functionality to be achieved within the shortened time frame. After 8 hours, the reaction is quenched with a 50%/50% water/acetone. The excess acrylic, water, and acetone are then removed under vacuum.

The characteristics of a representative set of poly(acrylated glycerol) $P(AG)_x$-produced following the above processes are shown in Table 2.

TABLE 2

Representative table of acrylated polyols monomers.

| | AG1.78 | | AG1.42 | | AG1.08 | | AG1.02 | |
|---|---|---|---|---|---|---|---|---|
| Internal Sample Code | gammf56 | | gammf41 | | gammf37 | | gammf77 | |
| Process | 2 | | 2 | | 1 | | 1 | |
| Glycerol (g, mol) | 100 | 1.09 | 1000 | 10.9 | 1250 | 13.6 | 200 | 2.17 |
| Acrylic Acid (g, mol) | 174 | 2.4 | 1391 | 19.3 | 1304.2 | 18.1 | 208.7 | 2.9 |
| Hydroquinone (g, mol) | 7.83 | 0.071 | 0.57 | 0.07 | 58.7 | 0.53 | 10.4 | 0.095 |
| TPP (g, mol) | — | — | — | — | — | — | 187.5 | 0.71 |
| Amberlyst 15 (g) | 5 | | 50 | | | | | |
| Reaction Time | 8 h | | 8 h | | 24 h | | 36 h | |
| Acrylic groups/molecule | 1.78 | | 1.42 | | 1.08 | | 1.02 | |
| Residual Acrylic Acid, w/w | 20 | | ~20 | | ~20 | | ~20 | |

RAFT Polymerization of Acrylated Glycerol

RAFT polymerization was performed in a similar manner to the procedure described in Moad et al., "Living radical polymerization by the raft process—a first update," *Australian Journal of Chemistry* 59:669-92 (2006); Moad et al., "Living radical polymerization by the raft process—a second update," *Australian Journal of Chemistry* 62(11):1402-72 (2009), which are hereby incorporated by reference in their entirety. Briefly, azobisisobutyronitrile (AIBN) was used as the initiator, dibenzylcarbonotrithioate (DBCT) as the chain transfer agent (CTA).

Monomer, initiator, CTA, and solvent (methanol and/or glycerol) were mixed under argon in a 100 mL round-bottomed flask with various mass ratios of monomer to solvent, 0.05 mass ratio of initiator to monomer, and various ratios of monomer to CTA, depending on the desired molecular weight of resulting polymer. The reaction flask was purged with argon for 30 minutes to remove oxygen from the system before the temperature was increased. The reaction was conducted at 71° C., and the reaction time was controlled to allow for maximum conversion without cross-linking the sample. The polymer was then precipitated by adding a 50%/50% mixture of acetone and hexane. The solvent was then decanted, and acetone was mixed with the polymer to further clean the polymer.

The characteristics of a representative set of poly(acrylated glycerol) $P(AG)_x$ produced in this manner are shown in Table 3.

TABLE 3

Characteristics P(AG) materials

| Material | PAG1.08-L | PAG1.02-M | PAG1.08-H | PAG1.42-L | PAG1.42-M | PAG1.78-L |
|---|---|---|---|---|---|---|
| Polymer Code | ghrmf30 | ghrmf82 | ghrmf37 | ghrmf54 | ghrmf59 | ghrmf59 |
| Monomer Code | gammf29 | gammf77 | gammf29 | gammf41 | gammf41 | gammf41 |

TABLE 3-continued

Characteristics P(AG) materials

| Material | PAG1.08-L | | PAG1.02-M | | PAG1.08-H | | PAG1.42-L | | PAG1.42-M | | PAG1.78-L | |
|---|---|---|---|---|---|---|---|---|---|---|---|---|
| Monomer, (g | mol) | 150 | 1.00 | 150 | 1.02 | 150 | 1.00 | 250 | 1.48 | 300 | 1.78 | 100 | 0.53 |
| CTA (DBCTT), (g | mmol) | 4.35 | 15.0 | 0.44 | 1.50 | 0.044 | 0.15 | 7.25 | 24.96 | 0.87 | 3.00 | 2.9 | 9.98 |
| AIBN (mg | mmol) | 750 | 4.57 | 750 | 4.57 | 750 | 4.57 | 1250 | 7.61 | 1500 | 9.13 | 1500 | 9.13 |
| [M]:[CTA] | 67 | | 680 | | 6656 | | 59 | | 593 | | 53 | |
| Methanol, v/v % | 55% | | 81% | | 81% | | 71% | | 88% | | 56% | |
| Time, h | 4 | | 8 | | 8 | | 8 | | 8 | | 8 | |
| Temperature, °C. | 71 | | 71 | | 71 | | 71 | | 71 | | 71 | |
| $T_g$, °C. | −45 | | −34 | | −25 | | −30 | | −20 | | — | |
| [η], dL/g | 0.13 | | 0.17 | | 0.17 | | 0.09 | | 0.14 | | — | |

Procedure for Calculating the Conversion of Acrylic Acid to Acrylic Groups

Figure 5:
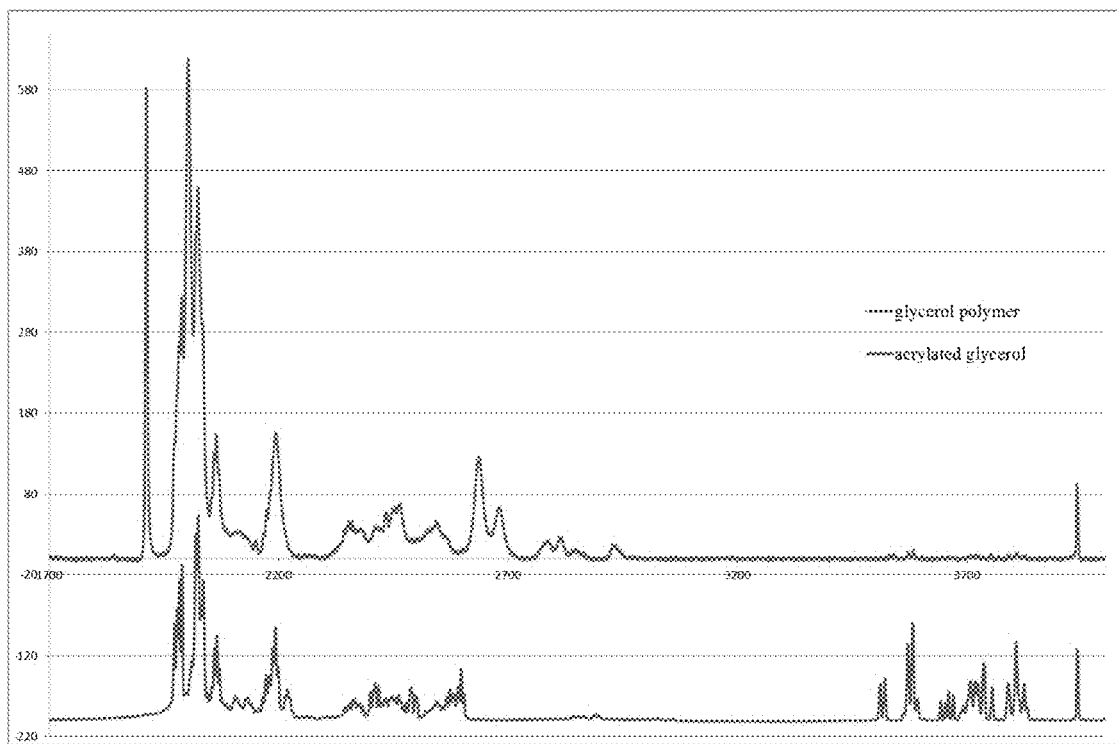
FIG. 5 is a graph showing the result of proton $^{1}H$-NMR for AG and P(AG).

Proton nuclear magnetic resonance was used to calculate the average number of acrylic groups per molecule. The results are shown in FIG. 5. The integral of peak over 5.74-6.02 in deuterated DMSO was set to a value of 1. The integral over both peaks at 5.74-5.82 were then combined. The integral of peak at 5.90-6.02 was calculated. The peak between 5.74-5.82 measured the unreacted acrylic acid. The peak between 5.90-6.02 measured the reacted acrylic groups. The integral over the reacted acrylic groups provide the conversion of acrylic acid to the acrylic groups in the polymer.

It was found that, to acrylate the secondary alcohols in the glycerol, a higher acrylic acid concentration or an increased temperature was needed. These findings agree with the reactivity of alcohols (1°>2°>3°).

Molecular Characterization

Figure 6:
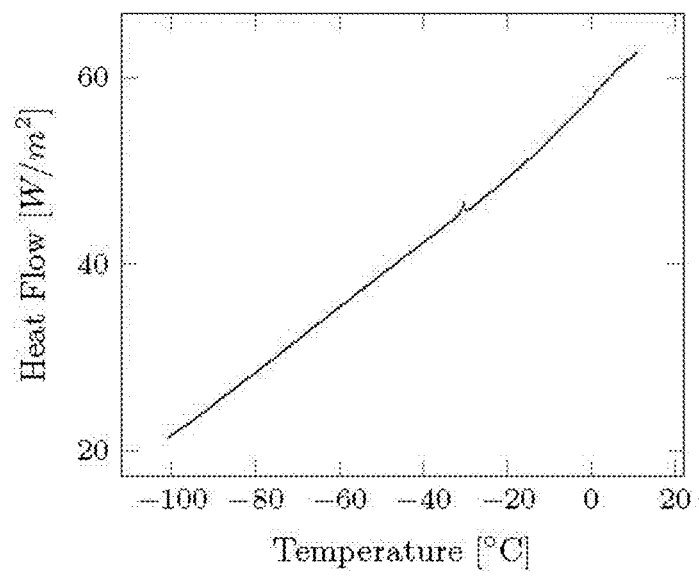
FIG. 6 is a graph showing the results of DSC of a P(AG) sample (ghrmf82, see Table 3). A glass transition temperature is shown in the graph at −30° C.

DSC experiments showed glass transition temperature ($T_g$) for the P(AG) between −45° C. (sample ghrmf30) to −20° C. (sample ghrmf59). See Table 3. FIG. 6 shows an example of DSC results for the P(AG) (sample ghrmf82) demonstrating that the $T_g$ was at −30° C.

It was also found that the product's viscosity was affected by the degree of acrylation—as the degree of acrylation increased the product became more viscous.

Figure 7A:
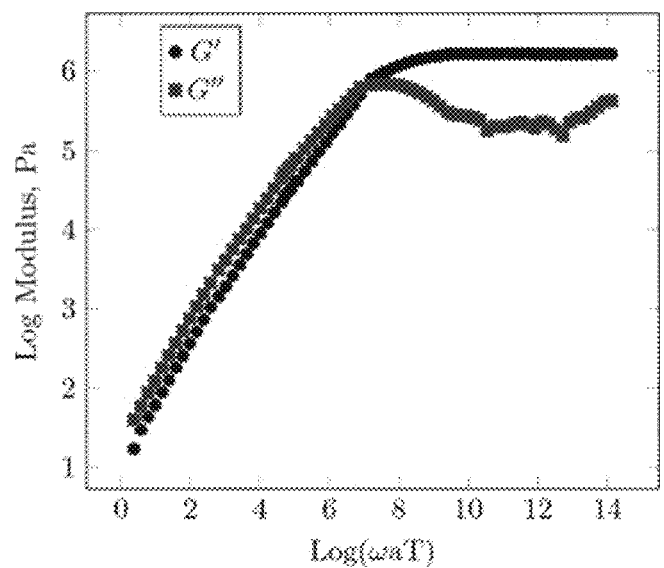
FIGS. 7A-7B are graphs showing rheology curves for P(AG) samples with a low molecular weight (reference temperature was 50° C.) (FIG. 7A), and a medium molecular weight (reference temperature was 80° C.) (FIG. 7B).
Figure 7B:
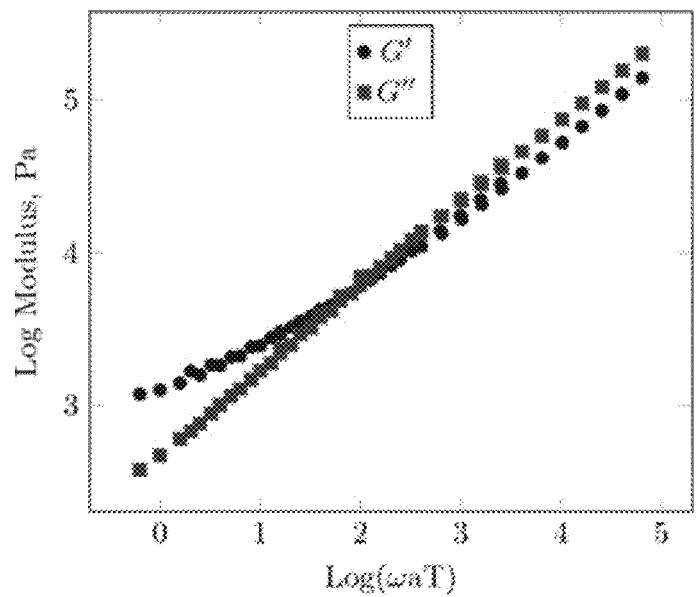

Rheology samples were mixed with butylated hydroxytoluene (BHT) to prevent crosslinking of the polymer. FIG. 7 shows the rheology curves of distinct P(AG) polymers with different target molecular weights.

Example 3—Asphalt Rubber Modification with Polymers Derived from RAFT Polymerization of Acrylated Glycerol The glycerol from the biodiesel industry was acrylated and polymerized to different extents, and the resulting materials were then used in the production of asphalt rubber. The asphalt rubber binders "stabilized" by the polymerized acrylated glycerol were tested, and the results were compared to an asphalt rubber (GTR) without any stabilizer, and an asphalt rubber stabilized with Vestenamer®.

The performances of the asphalt rubber (AR) without any stabilizer, stabilized by the poly(acrylated glycerol), and stabilized by Vestenamer® were compared in terms of rheology, viscosity, and the mixing and compaction temperatures of the AR, the effect on the separation during the AR storage, and the effect in the AR and residual AR.

Materials and Equipment

Poly(acrylated glycerol)(P(AG)) with different degrees of acrylation and polymerization was prepared based on procedures similarly to the procedures described in Example 1 or 2.

The base asphalt used was PG 58-28 (Seneca Petroleum), and the rubber was ambient ground tire rubber (ambGTR) prepared by mechanical shredding supplied by Seneca Petroleum (Ø30 mesh). Vestenamer® was used as commercially available asphalt modifier to compare with the performance of the P(AG) as the asphalt modifier.

a. Experiment 1

The asphalt and crumb rubber were blended at the following conditions:

Controlled velocity—3000 rpm

Controlled interaction temperature—180° C.

Interaction time—1 hour

Rubber concentration—15 wt % of the blended asphalt-rubber

Additives concentration—4.5 wt % of the rubber

The asphalt-rubber was then centrifuged at controlled velocity (1500 rpm) at 180° C. for 3 minutes.

Three samples of AR were produced:

PG58-28+15 wt % ambGTR (referred to as control "AR")

PG58-28+15 wt % (ambGTR+4.5% Vestenamer® by weight of ambGTR) (referred to as "AR-V")

PG58-28+15 wt % (ambGTR+4.5% Poly(Acrylated Glycerol) by weight of ambGTR)—(referred to as "AR-AG").

The samples were tested in the rotational viscometer (RV) to characterize their viscometry, in the dynamic shear rheometer (DSR) and/or bending beam rheometer (BBR) to characterize their rheology. The separation of the samples were tested by the cigar tube separation (CTS) method (ASTM D 7173). The binders were aged using the rolling thin film oven (RTFO), to simulate short-term aging, and further aged using the pressurized aging vessel (PAV) to simulate long-term aging. The testings conducted on AR binder samples and residual AR are shown in Table 4.

TABLE 4

The testings conducted on AR and residual AR

|  | Un-aged | RTFO | PAV |
|---|---|---|---|
| AR | RV, DSR, CT | DSR | DSR, BBR |
| Residual AR (referred to as "Res") | RV, DSR | DSR | DSR, BBR |

Figure 8A:
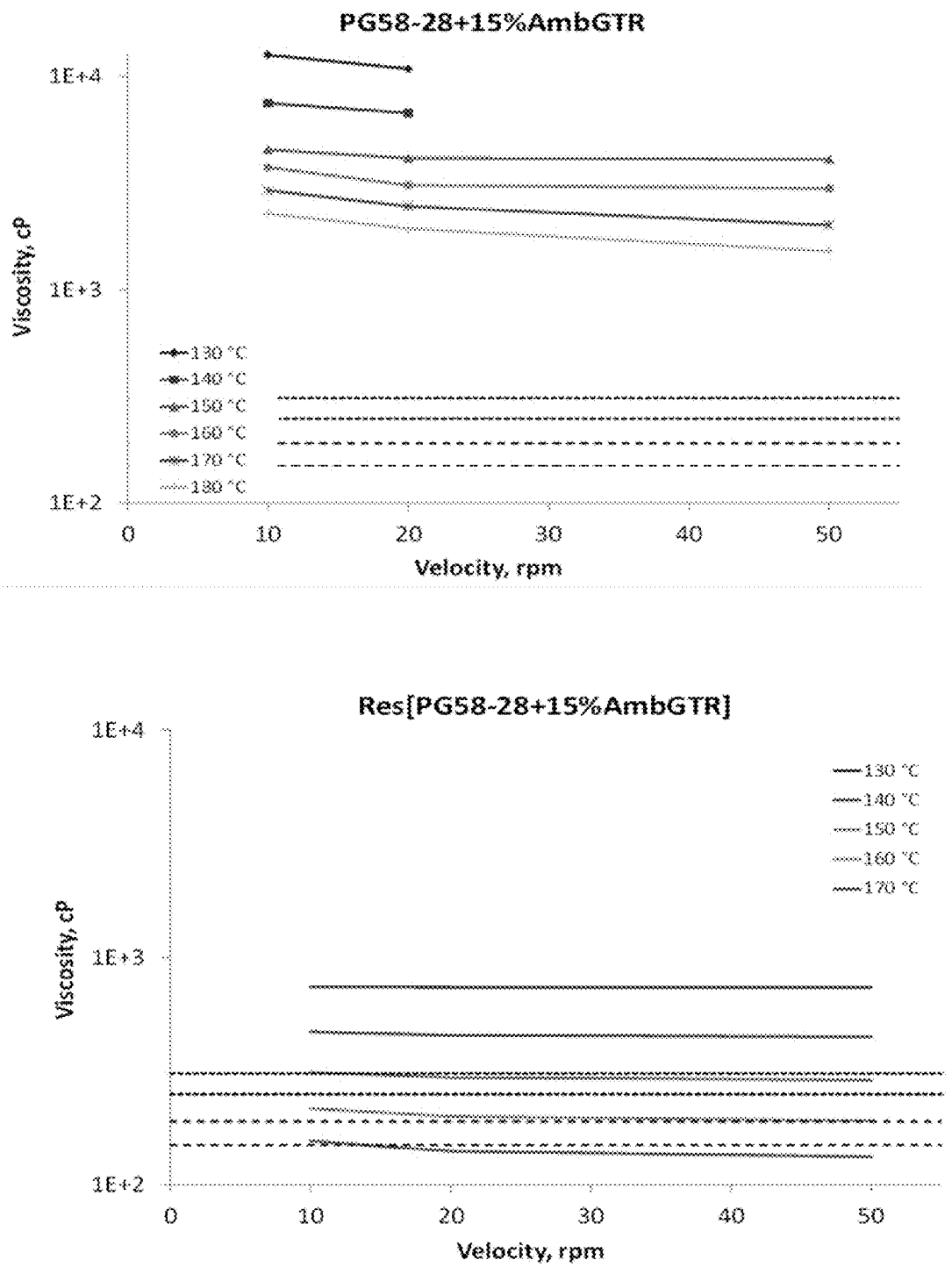
FIGS. 8A-8C are graphs showing the viscosities results at various temperatures for the asphalt rubber (AR) binders and residual AR for the three samples in Example 3, Experiment 1: control AR (FIG. 8A); AR-V (FIG. 8B); and AR-AG (FIG. 8C).
Figure 8B:
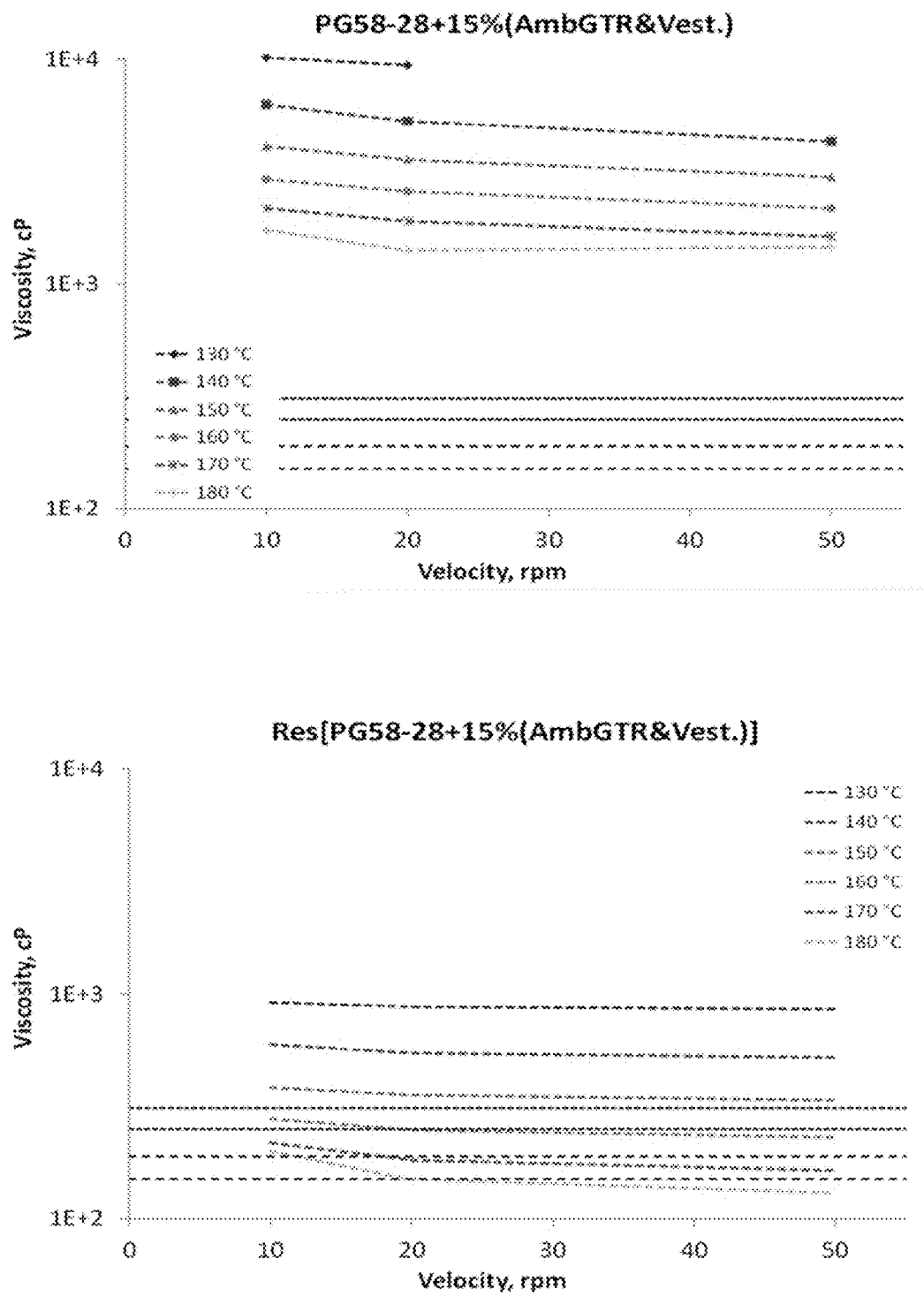
Figure 8C:
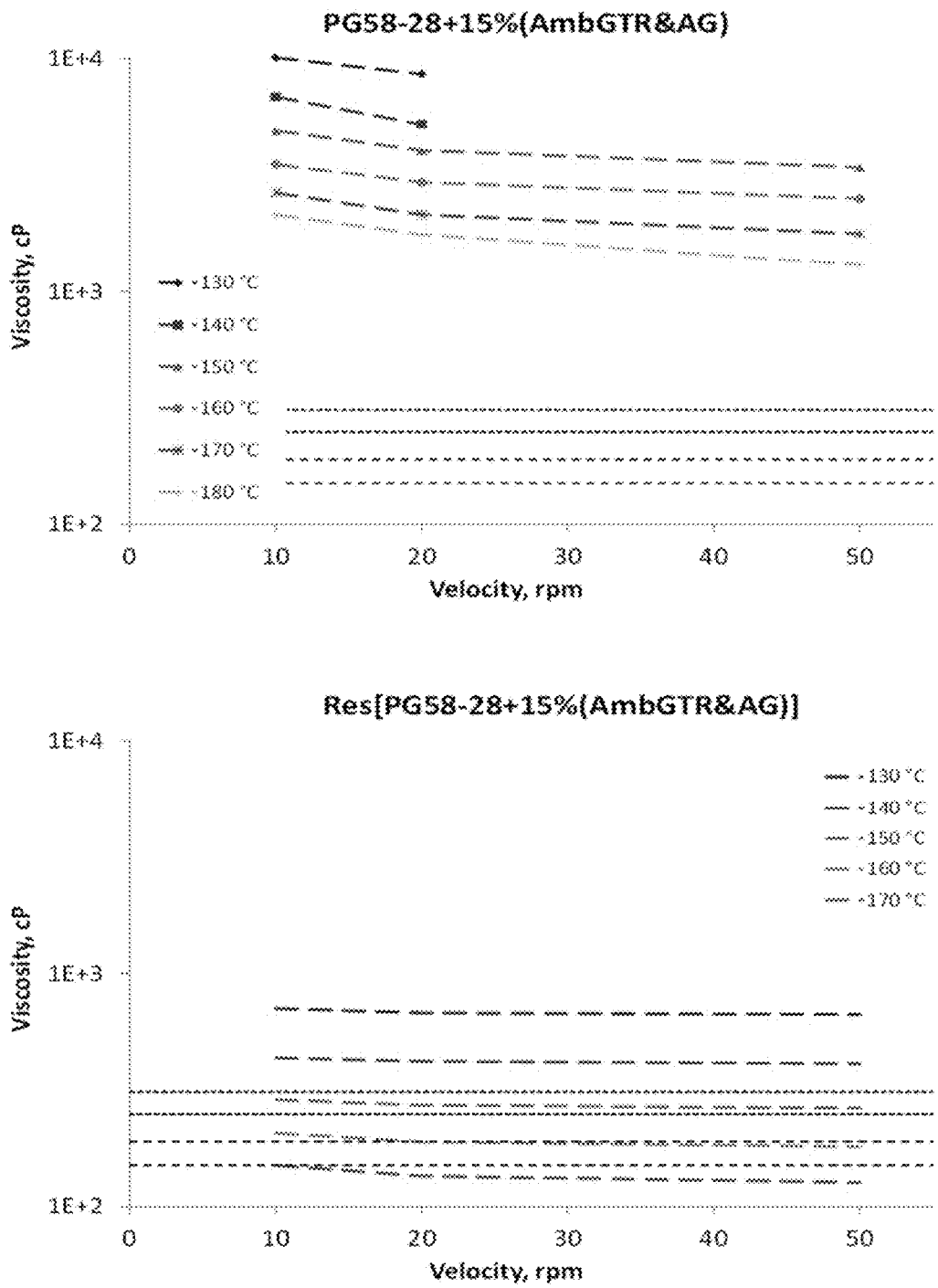

The viscosities results at various temperatures for the asphalt-rubber binders and residual AR for the three samples are shown in FIGS. 8A-8C.

Figure 9A:
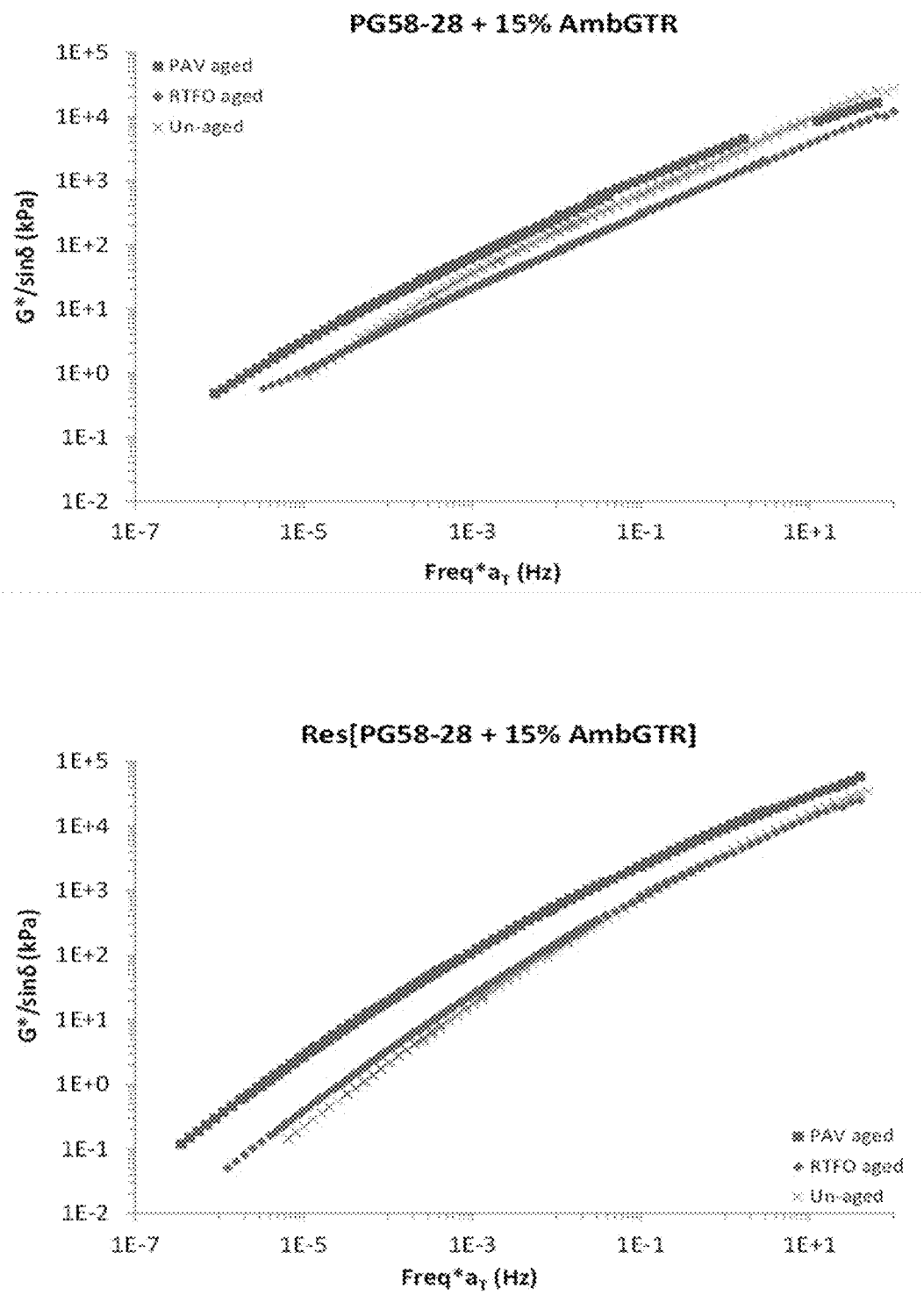
Figure 9B:
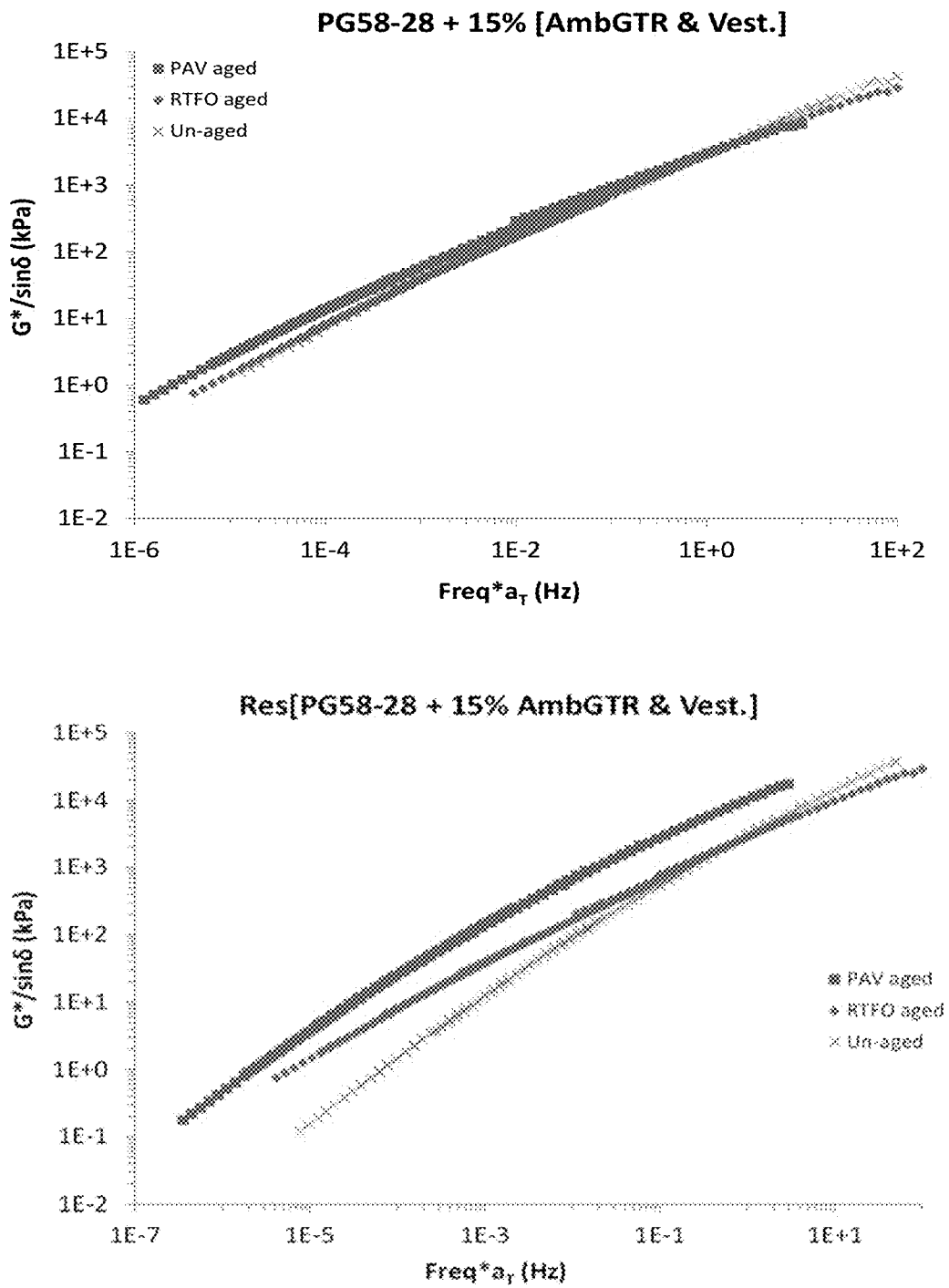

The rheology results measured by DSR for the AR binders and residual AR for the three samples at various conditions (unaged, RTFO aged, and PAV aged) are shown in FIGS. 9A-9C.

The grading results for the AR binders and residual AR for the three samples at various conditions (unaged, RTFO aged, and PAV aged) are shown in FIGS. 10A-10C.

Figure 11A:
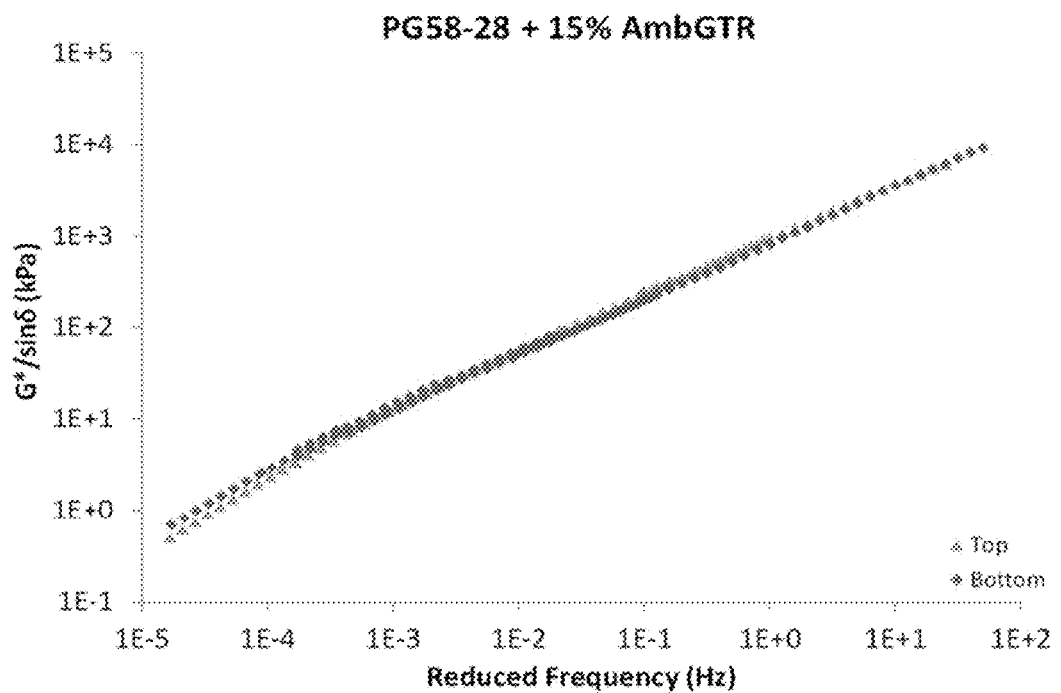
FIGS. 11A-11C are graphs showing the separation results for the AR binders and residual AR for the three samples in Example 3, Experiment 1: control AR (FIG. 11A); AR-V (FIG. 11B); and AR-AG (FIG. 11C).
Figure 11B:
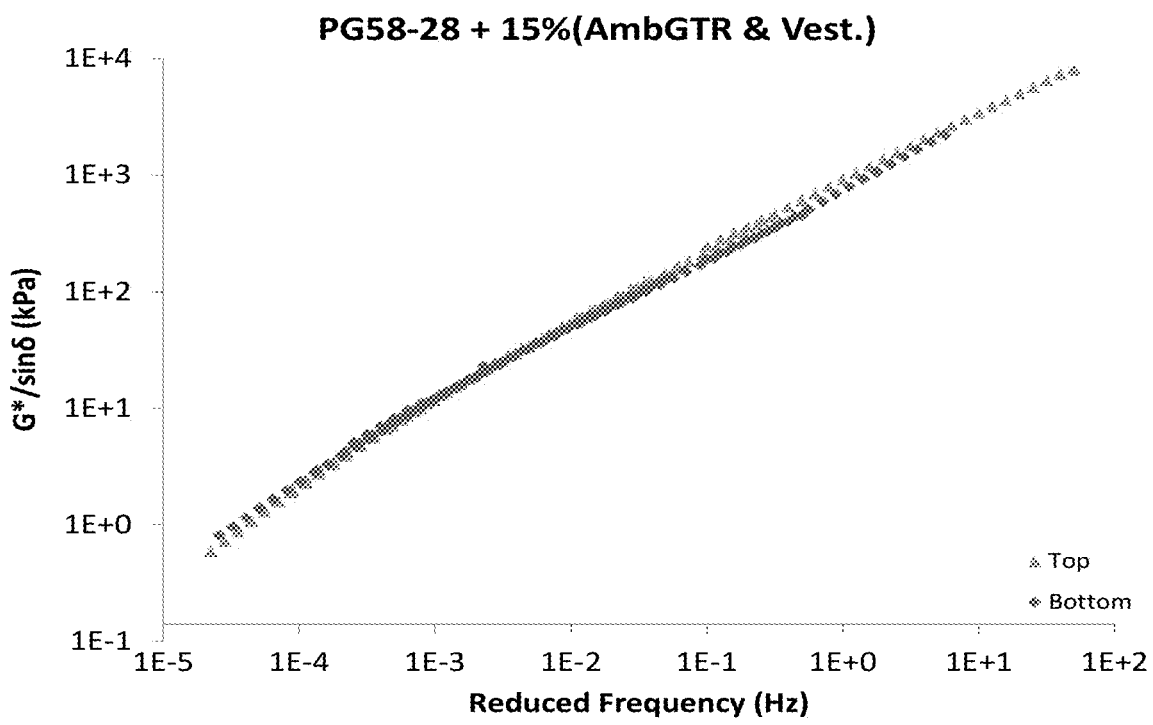
Figure 11C:
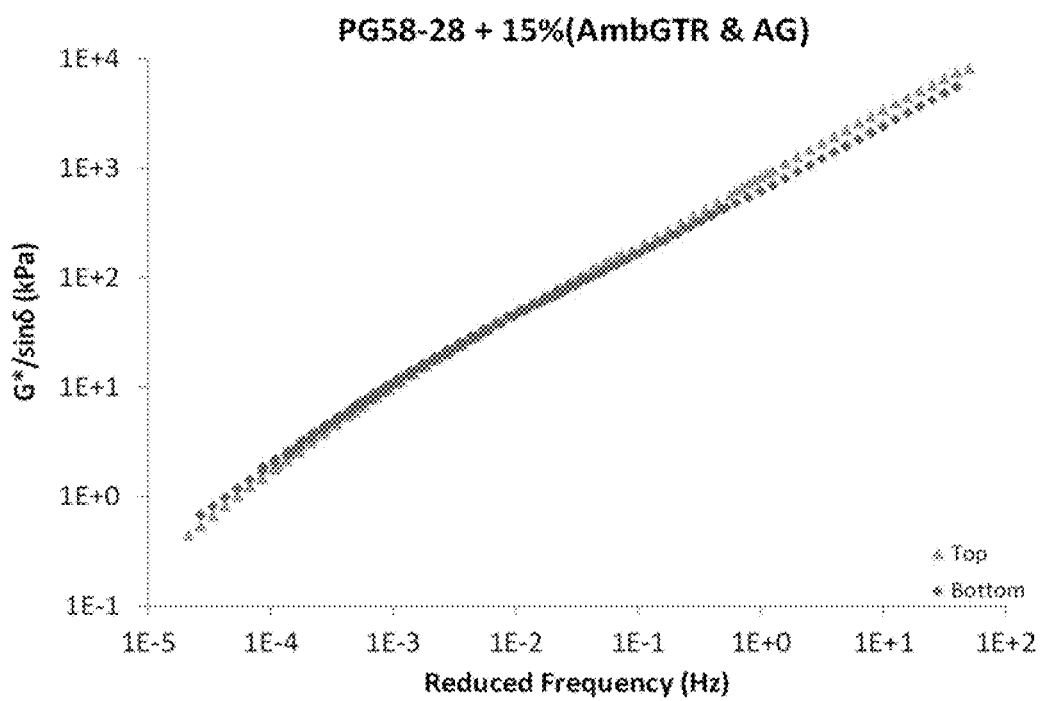

The separation results for the AR binders (top and bottom, i.e., the binder material in the top and bottom ⅓ of the cigar tube as specified in ASTM D 7173) for the three samples are shown in FIGS. 11A-11C.

All the testing results were analyzed and summarized in Tables 5-6.

TABLE 5

Low temperature grading summary

| PG low at −18° C. |  | Stiffness (MPa) | m-value |
|---|---|---|---|
| AR | Total | 117 | 0.317 |
|  | Residual | 293 | 0.281 |
| AR-V | Total | 136 | 0.302 |
|  | Residual | 255 | 0.276 |
| AR-AG | Total | 91.8 | 0.331 |
|  | Residual | 233 | 0.290 |

TABLE 6

ASTM D 7173 cigar tube separation test results.

|  | Total | Residual | Separation |  | % Difference |
|---|---|---|---|---|---|
| AR | PG88-28 (89.6-28) | PG70-22 (72.7-22) | Top Bottom | 82.3 83.8 | 1.7% |
| AR-V | PG82-28 (84.9-28) | PG70-22 (73.4-22) | Top Bottom | 82.7 85.8 | 3.6% |
| AR-AG | PG76-28 (78.3-28) | PG70-22 (72.1-22) | Top Bottom | 80.8 84.5 | 4.5% | b. Experiment 2

The experimental conditions were similar to the experimental conditions in Experiment 1 in this example, except that the three samples of AR were produced and cured (covered containers) in the oven at 163° C. for 72 hours, and then centrifuged:

PG58-28+15% ambGTR (referred to as control "AR")
PG58-28+15 wt % (ambGTR+4.5% Vestenamer®) by weight of ambGTR) (referred to as "AR-V")
PG58-28+15 wt % (ambGTR+4.5% Poly(Acrylated Glycerol) by weight of ambGTR)—(referred to as "AR-AG").

The samples were tested in the dynamic shear rheometer (DSR) to characterize their rheology for total AR and residual materials. The separations of the samples were tested by CT for total AR and residual materials.

Figure 12A:
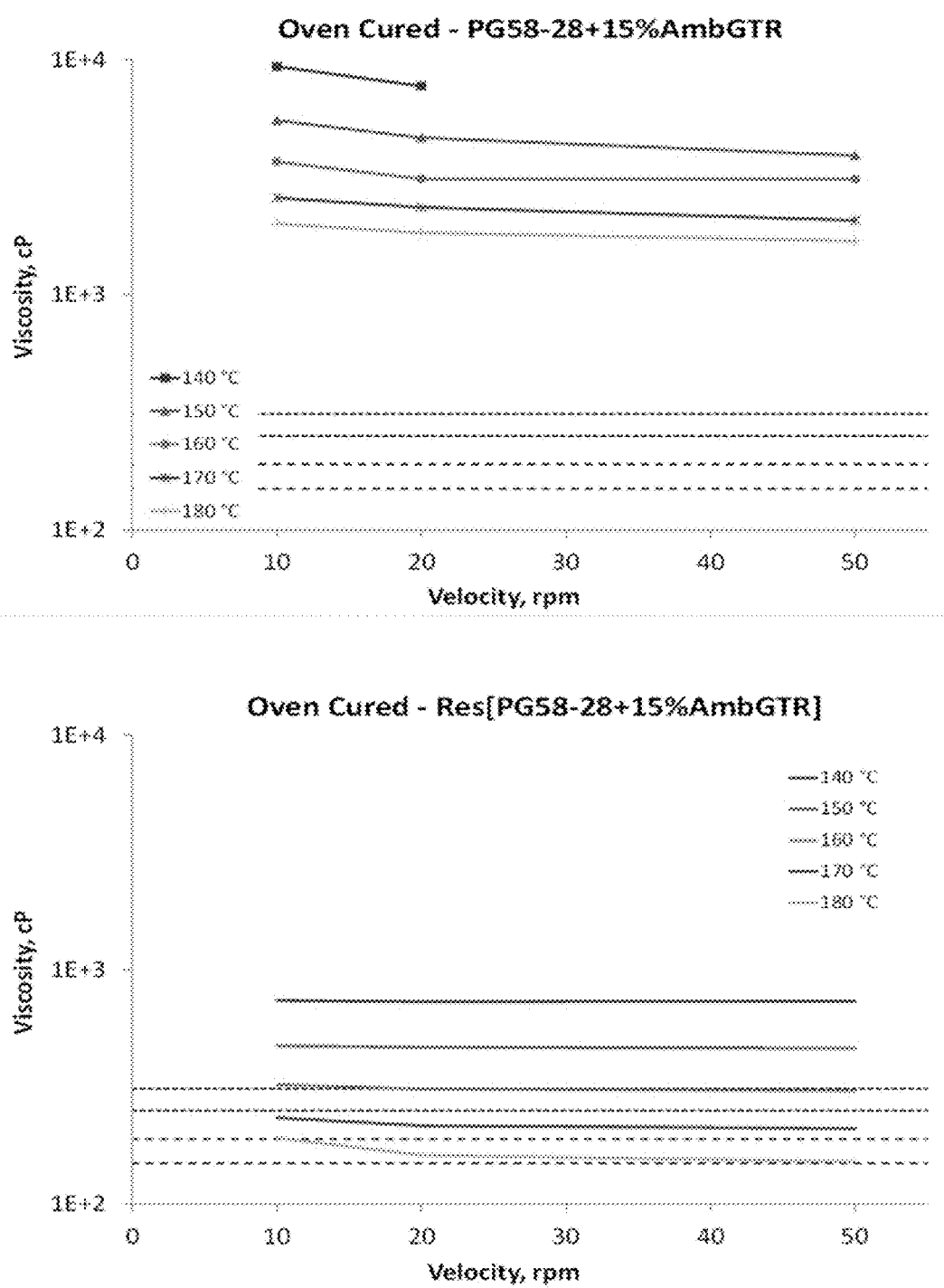
FIGS. 12A-12C are graphs showing the viscosities results at various temperatures for the AR binders and residual AR for the oven-cured three samples in Example 3, Experiment 2: control AR (FIG. 12A); AR-V (FIG. 12B); and AR-AG (FIG. 12C).
Figure 12B:
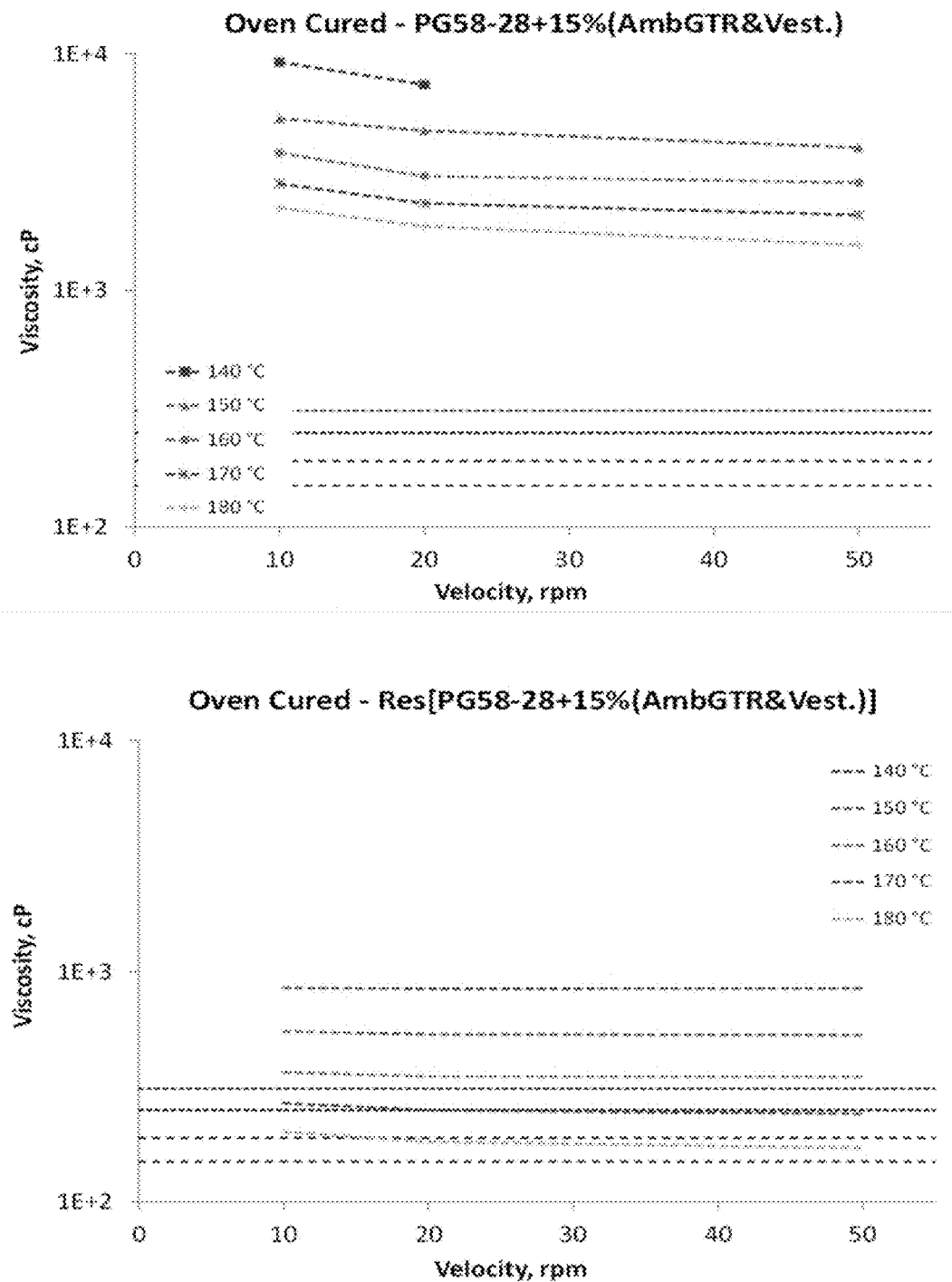
Figure 12C:
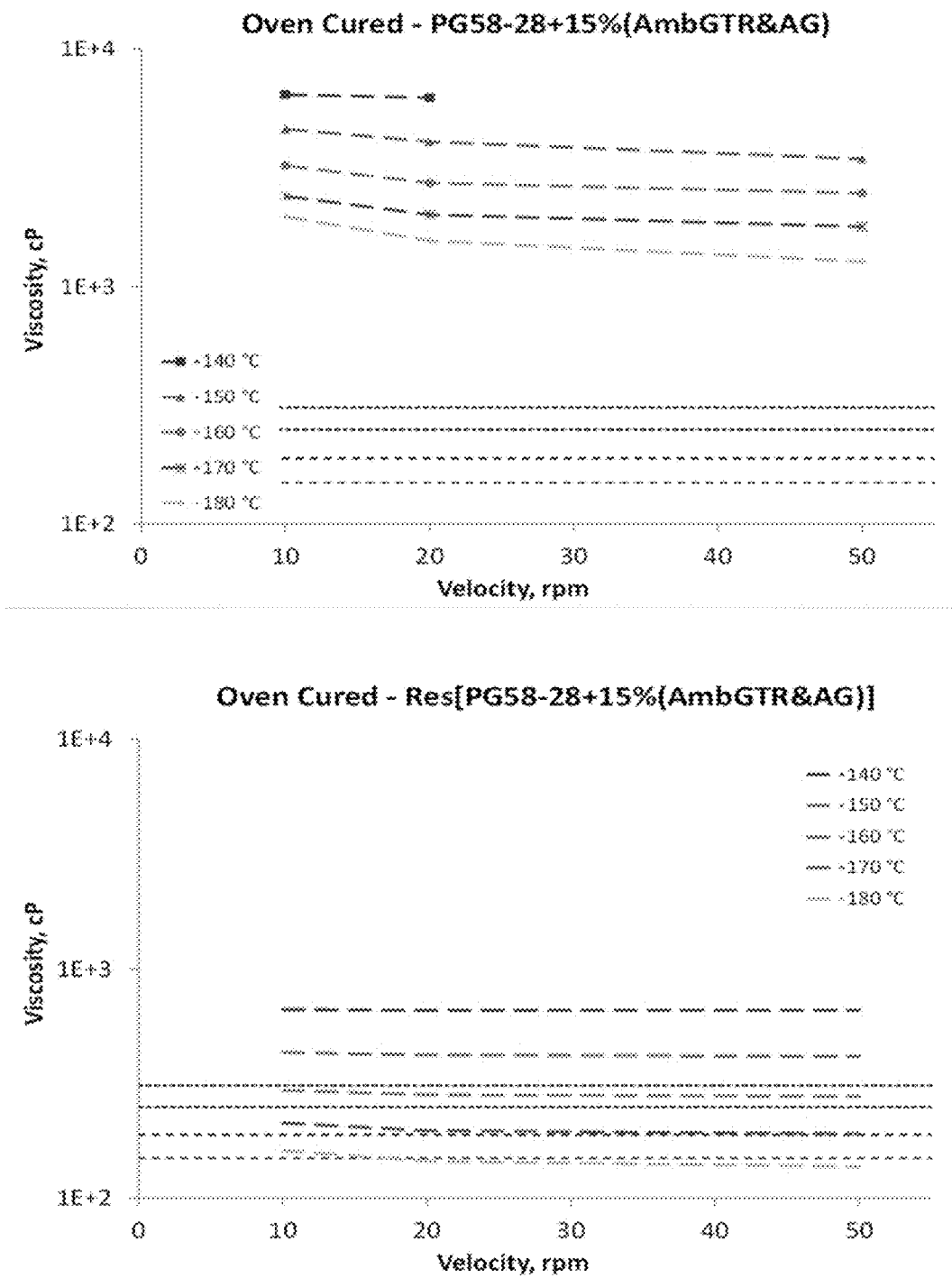

The viscosities results at various temperatures for the asphalt-rubber binders and residual AR for the three samples are shown in FIGS. 12A-12C.

Figure 13A:
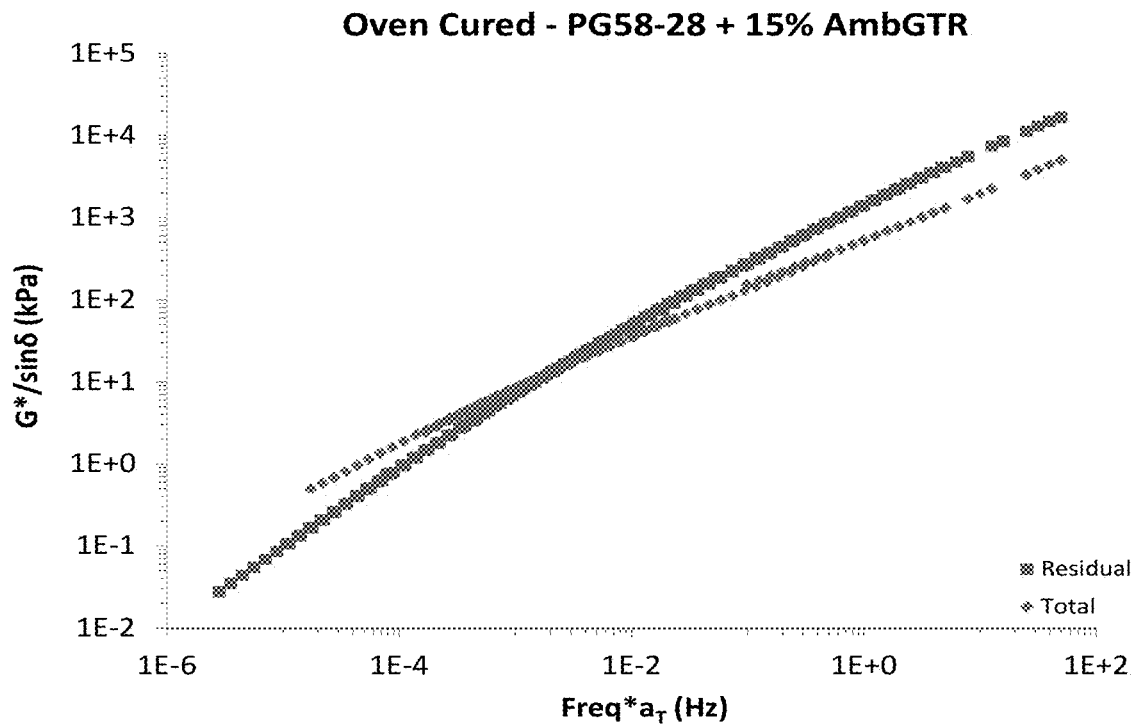
FIGS. 13A-13C are graphs showing the rheology results measured by DSR for the AR binders and residual AR for the oven-cured three samples in Example 3, Experiment 2: control AR (FIG. 13A); AR-V (FIG. 13B); and AR-AG (FIG. 13C).
Figure 13B:
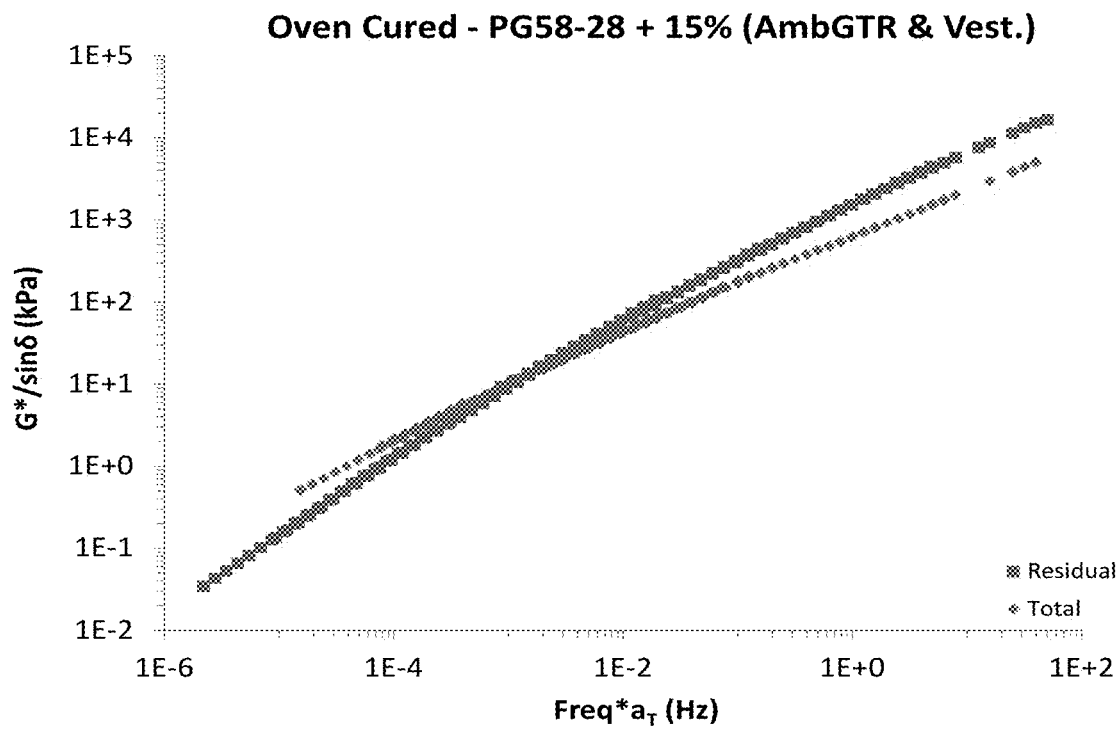
Figure 13C:
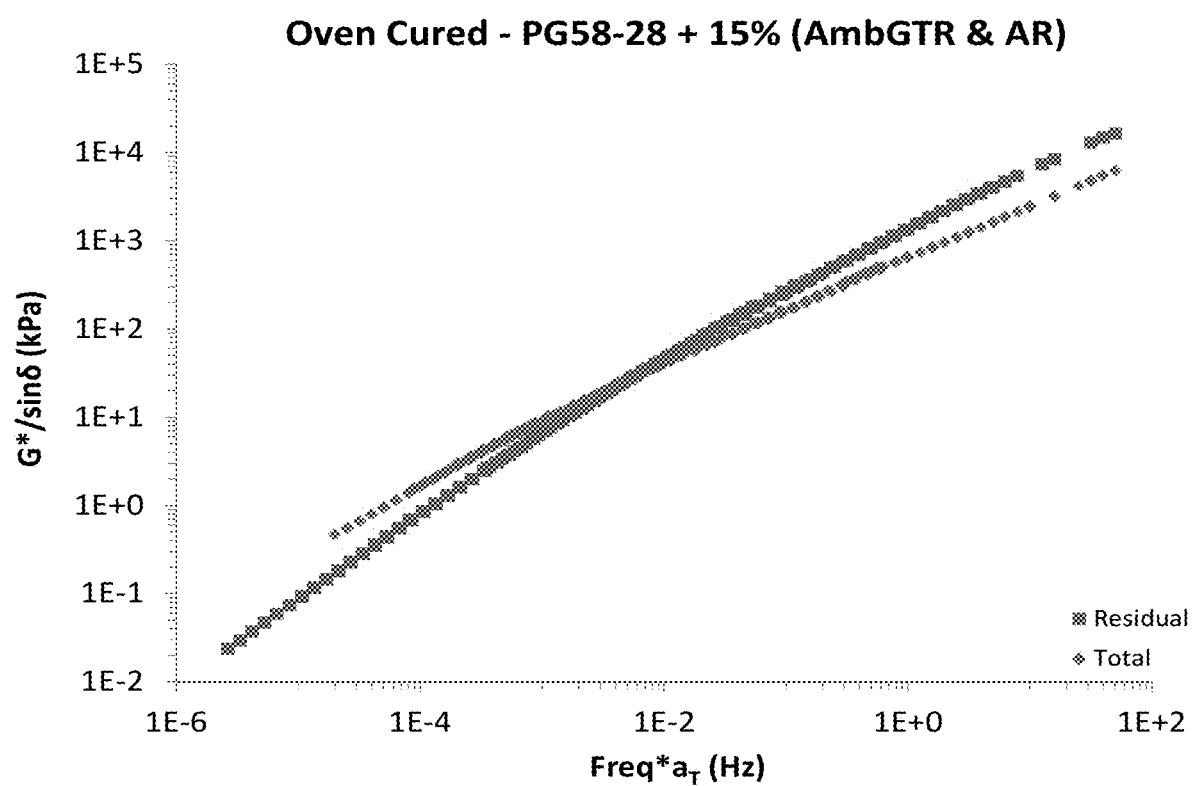

The rheology results measured by DSR for the asphalt-rubber binders (top and bottom) for the three samples are shown in FIGS. 13A-13C.

Figure 14A:
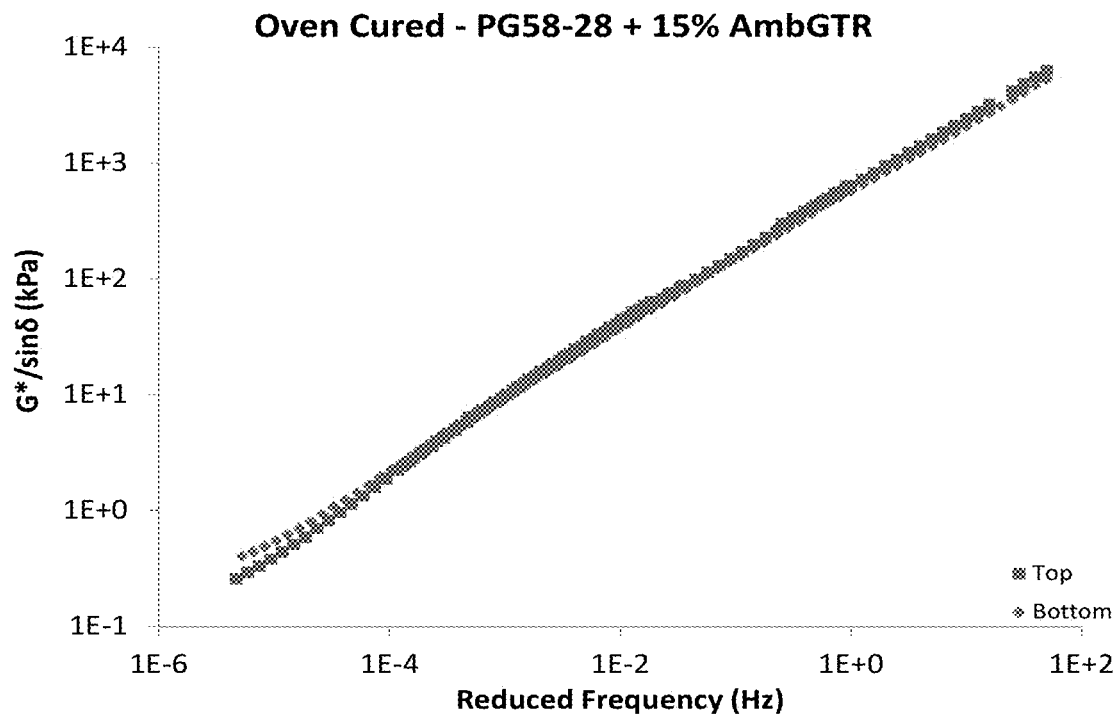
FIGS. 14A-14C are graphs showing the separation results for the AR binders and residual AR for the three samples in Example 3, Experiment 2: control AR (FIG. 14A); AR-V (FIG. 14B); and AR-AG (FIG. 14C).
Figure 14B:
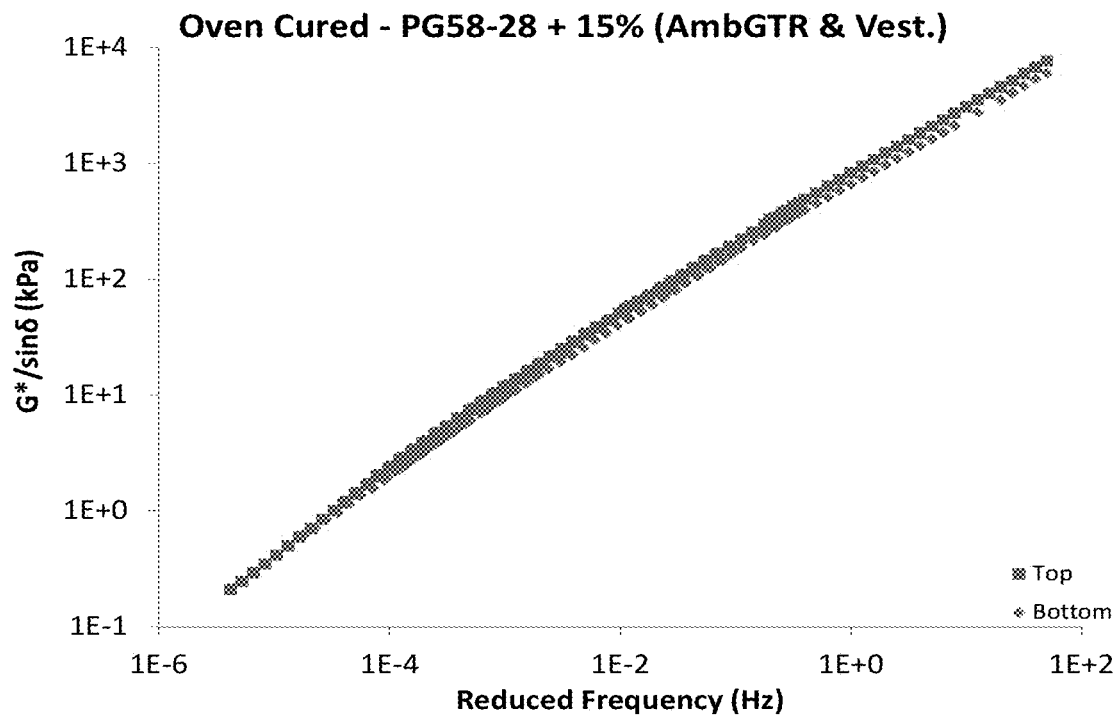
Figure 14C:
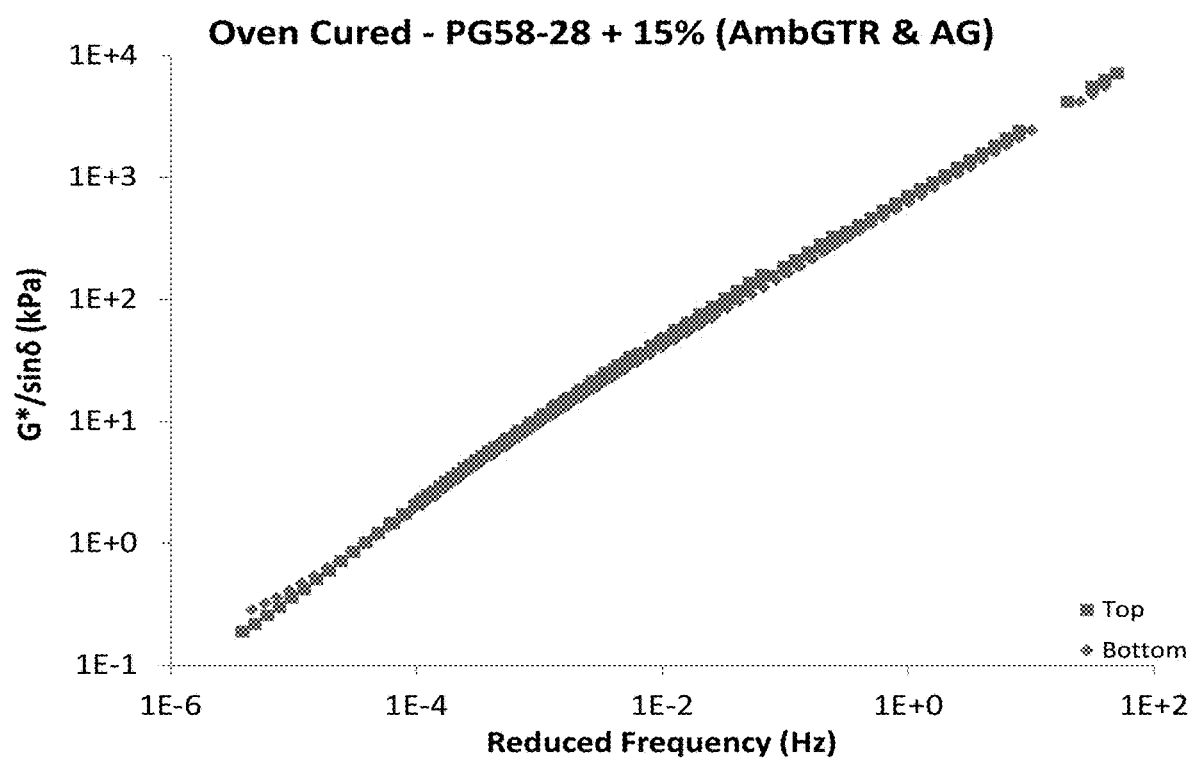
Figure 15A:
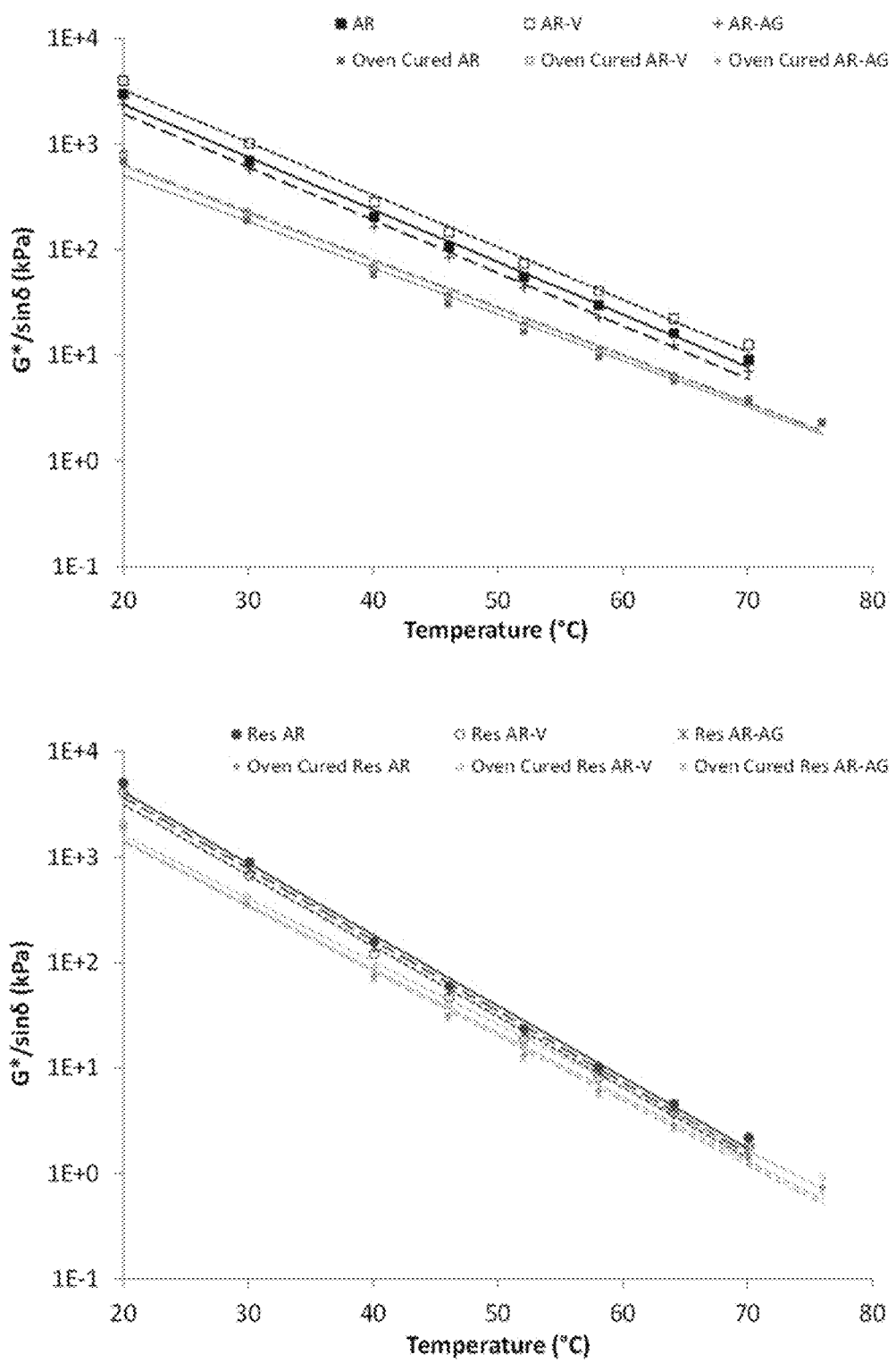
Figure 15C:
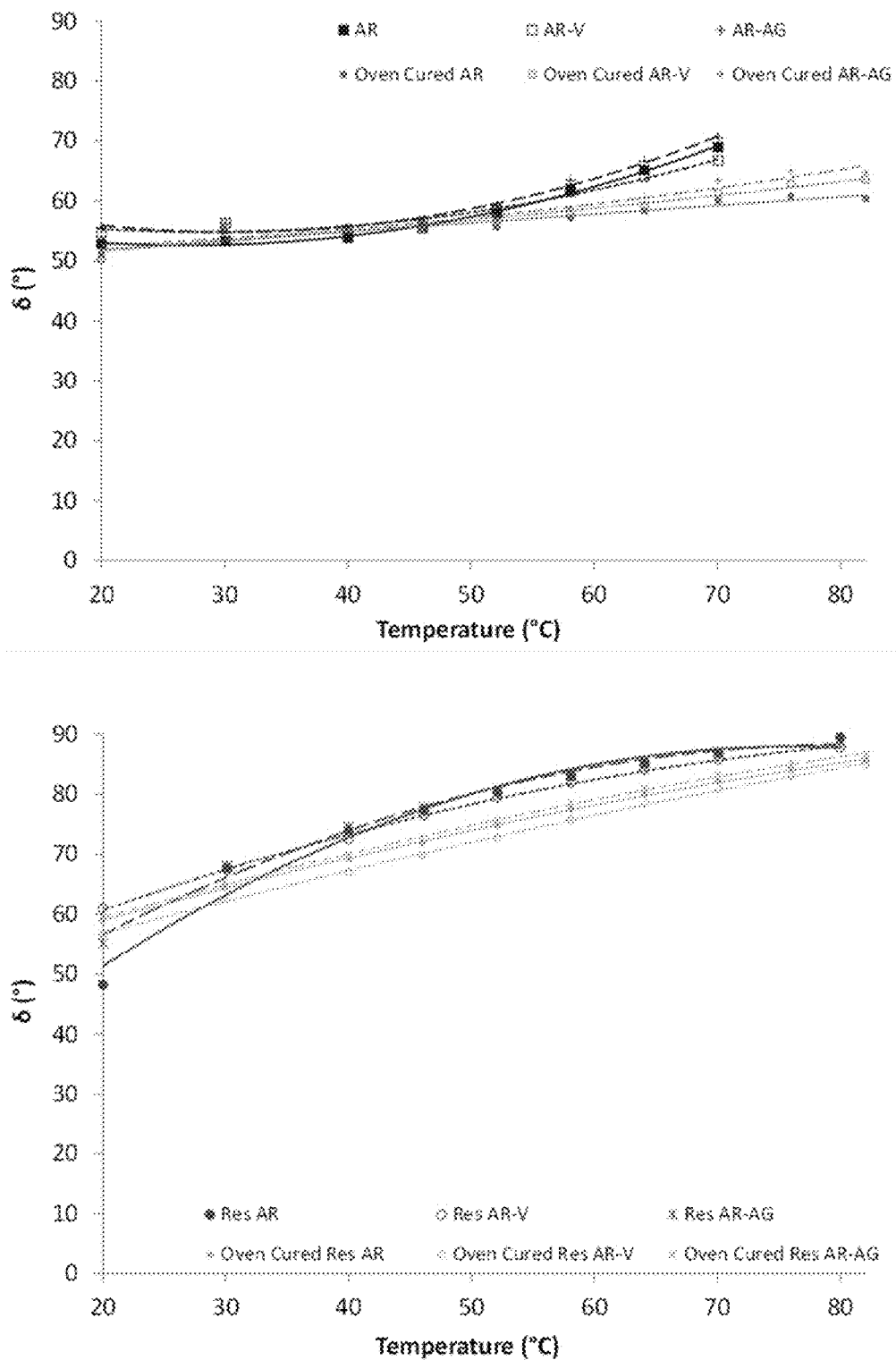
Figure 15D:
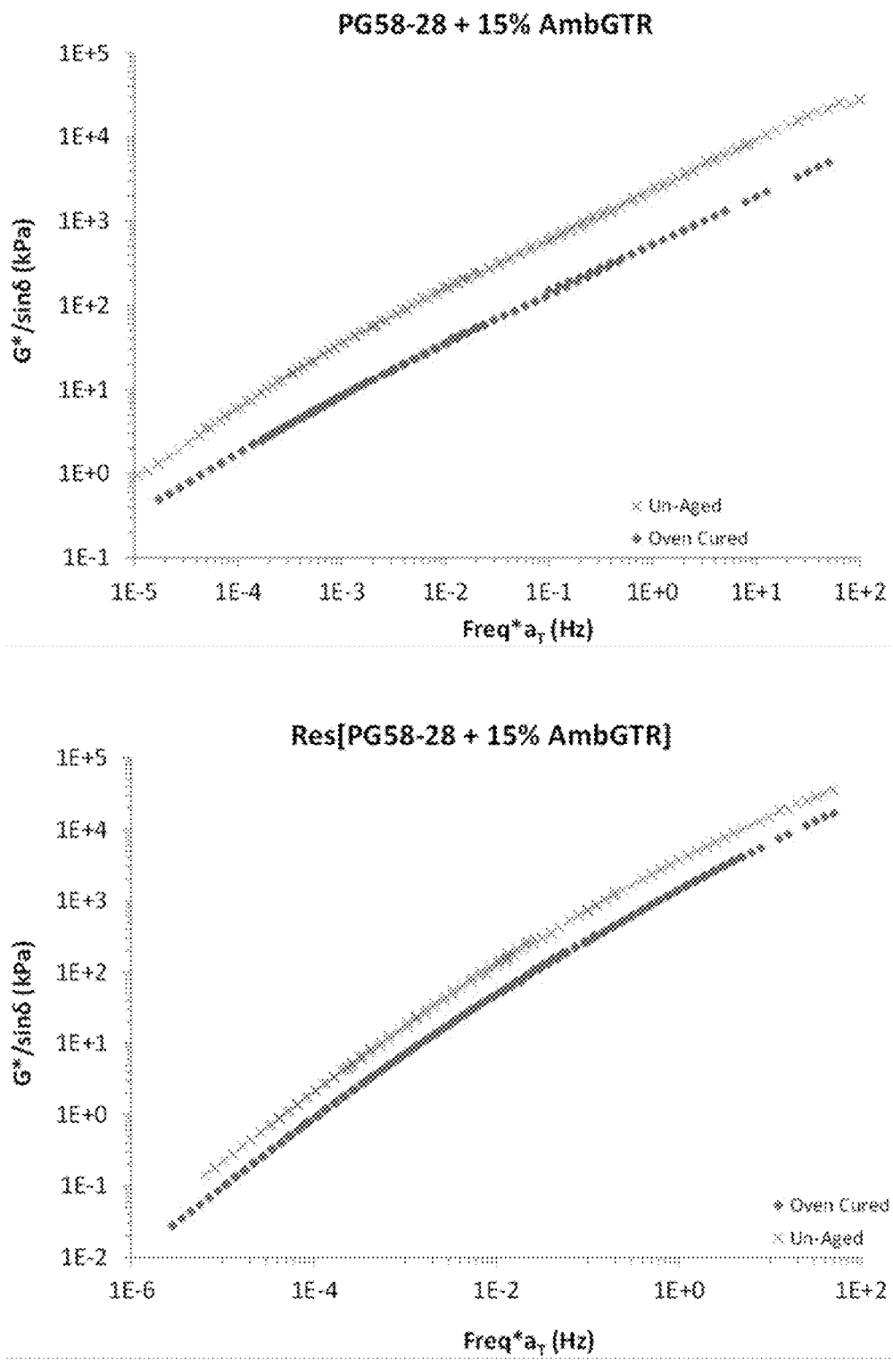
Figure 15E:
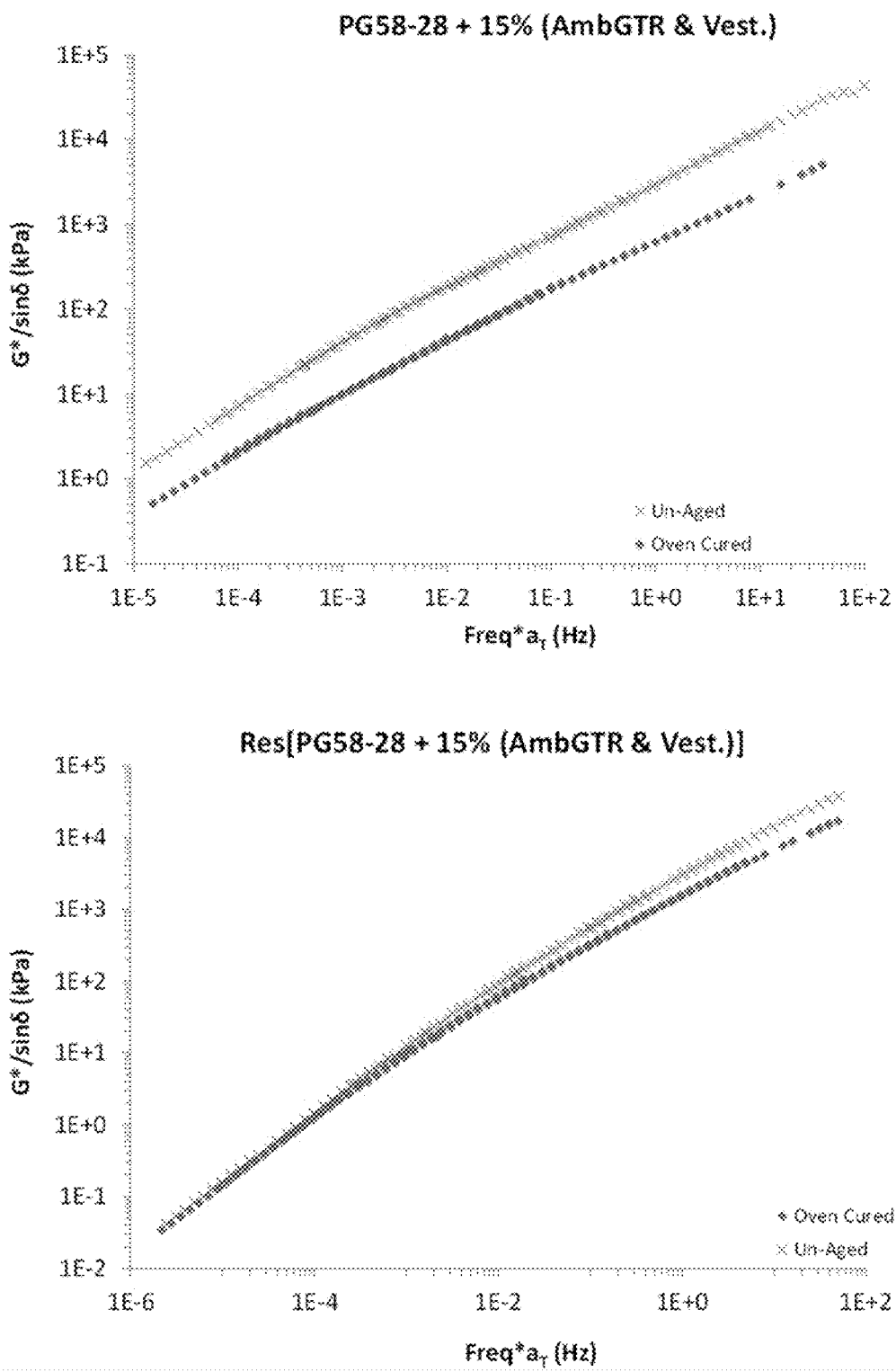
Figure 15F:
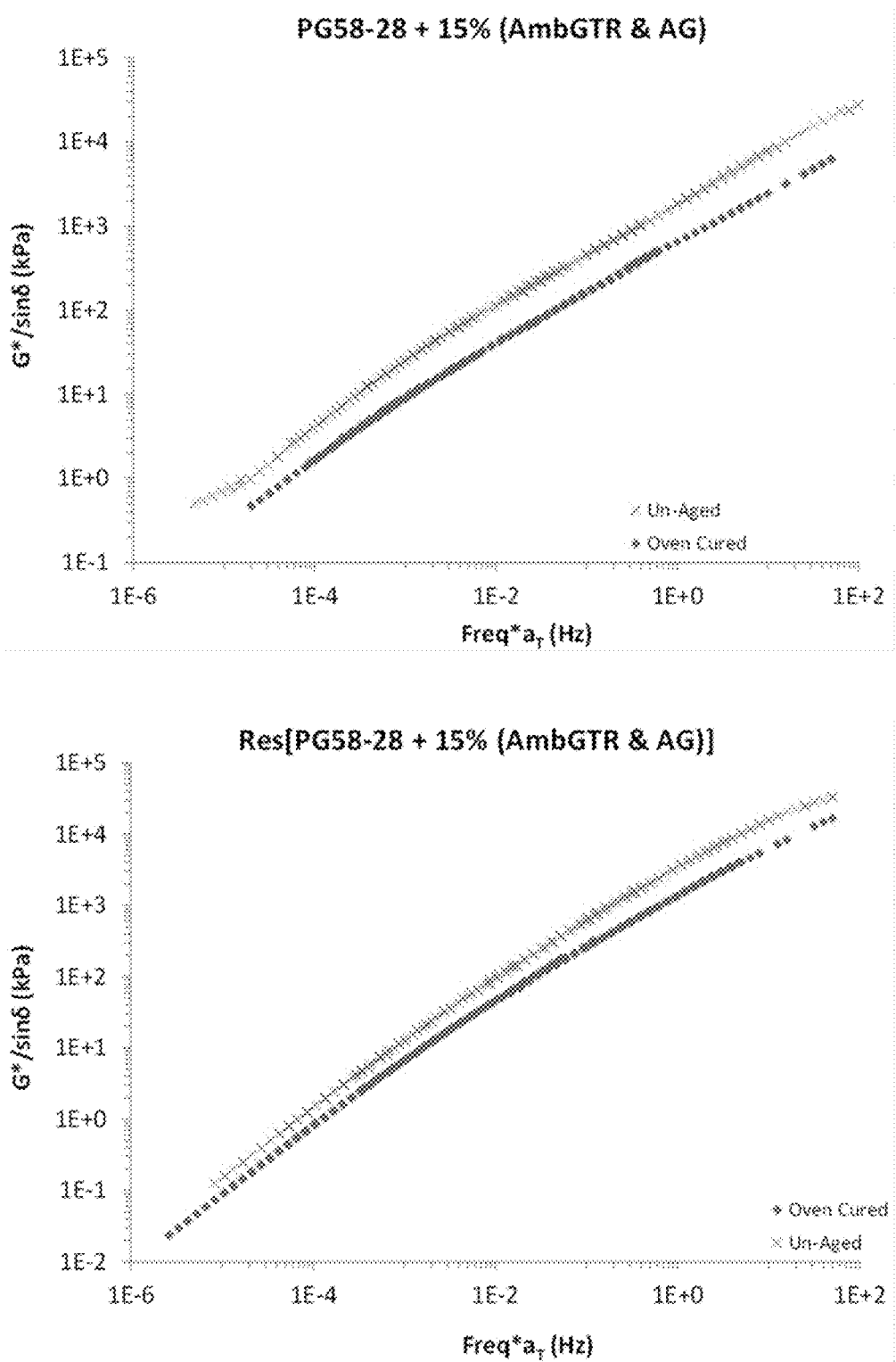

The separation results for the asphalt-rubber binders for the three samples are shown in FIGS. 14A-14C.

c. Comparison

Testing results for the three samples in Experiment 1 (unaged) and Experiment 2 (oven-cured) were compared. The results of comparison are shown in FIGS. 15A-15F, and summarized in Tables 7-9.

TABLE 7

Rubber swelling summary
Rubber swelling

| Un-Aged | | Oven Cured | |
|---|---|---|---|
| % increase | x weight | % increase | x weight |
| 149.9% | 2.50 | 234.7% | 3.35 |
| 174.2% | 2.74 | 215.0% | 3.15 |
| 223.7% | 3.24 | 253.7% | 3.54 |

TABLE 8

ASTM D 7173 cigar tube separation test results.

| Grading | | Separation | | % Difference | |
|---|---|---|---|---|---|
| Total | Residual | | Oven Cured | | Un-Aged |
| 82 | 70 | Top | 82.2 | 2.3% | 1.7% |
| 82.9 | 72.7 | Bottom | 84.07 |  |  |
| 82 | 70 | Top | 82.18 | 2.0% | 3.6% |
| 83.2 | 74.4 | Bottom | 83.82 |  |  |
| 82 | 70 | Top | 82.66 | 1.1% | 4.5% |
| 83.4 | 72.0 | Bottom | 83.60 |  |  |

TABLE 9

Viscosity - Mixing and Compaction Temperature (° C.)

|  |  | Un-Aged | | Oven Cured | |
|---|---|---|---|---|---|
|  |  | Mix | Compact | Mix | Compact |
| AR | Total | 249.3* | 227.6* | 265.9* | 244.4* |
|  | Residual | 164.2 | 151.4 | 177.5 | 163.1 |
| AR-V | Total | 257.5* | 236.0* | 271.1* | 248.0* |
|  | Residual | 164.2 | 151.4 | 181.1 | 166.9 |
| AR-AG | Total | 287.6* | 259.5* | 265.9* | 243.2* |
|  | Residual | 162.8 | 149.9 | 174.6 | 160.8 |

*The mixing and compacting temperatures above 180° C. were extrapolated

The results show that the rubber particles added in the asphalt affected the AR viscosity, which would have affected the accurate determination of mixing and compaction temperatures.

Compared to the AR (control, without additives) and the AR with Vestenamer®, the use of the poly(acrylated glycerol) in the AR improved performance in all the characteristics of the AR, i.e., reduced the low continue performance grade of the AR, reduced sensitivity of the AR's viscosity to temperature, reduced the AR binder's modulus at low temperature, and lowers the separation of the AR after curing (72 hours at 163° C.).

Example 4—Asphalt Rubber Modification with Polymers Derived from RAFT Polymerization of Acrylated Glycerol The glycerol from the biodiesel industry was acrylated and polymerized to different extents, and the resulting materials were then used in the production of asphalt rubber. The AR binders "stabilized" by the polymerized acrylated glycerol were tested, and the results were compared to an asphalt rubber (GTR) without any stabilizer, an AR stabilized with Kraton® D1101, and an asphalt rubber stabilized with Vestenamer®.

Experimental Procedures

Six samples of P(AG) with different degrees of acrylation and polymerization were used in the production of the ARs at three different concentrations (2.5%, 4.5% and 6.5% by weight of the GTR) as summarized in Table 10 below. Only 6.5% levels of concentration were used for the 37 and 64 acrylated glycerol experimental blocks resulting in 14 experimental compositions for the acrylated glycerol being evaluated. See Table 10. The Vestanamer® sample was blended at the same three concentrations with the GTR without any stabilizer and resulted in a total of 18 experimental compositions being evaluated.

The polymer/GTR was added to the base asphalt at 12% by weight of the total AR binder.

TABLE 10

Tested materials for three degrees of acrylation and polymerization (molecular weight) for different P(AG) contents

|  |  |  | Low | | Medium | | High | |
|---|---|---|---|---|---|---|---|---|
|  |  |  | AR | Residual | AR | Residual | AR | Residual |
| Degree of Acylation | Low | 2.5% |  |  |  |  |  |  |
|  |  | 4.5% |  | 78 |  | 82 |  |  |
|  |  | 6.5% |  |  |  |  |  | 37 |
|  | Medium | 2.5% |  |  |  |  |  |  |
|  |  | 4.5% |  | 54 |  | 59 |  |  |
|  |  | 6.5% |  |  |  |  |  |  |
|  | High | 2.5% |  |  |  |  |  |  |
|  |  | 4.5% |  |  |  |  |  |  |
|  |  | 6.5% |  | 64 |  |  |  |  |

The overall performance of the AR stabilized by Vestenamer® was better than the control, unstabilized AR. However, the best performance was attained by the AR stabilized by using 4.5 wt % of poly (acrylated glycerol) with a low degree of acrylation and medium molecular weight (the weight percentage was relative to the weight of the rubber binder).

Materials and Equipment

Poly(acrylated glycerol)(P(AG)) with different degrees of acrylation and polymerization was prepared based on procedures similarly to the procedures described in Example 1 or 2.

The base asphalt used was PG 58-28 (Seneca Petroleum), and the rubber was ambient ground tire rubber (ambGTR) prepared by mechanical shredding supplied by Seneca Petroleum (Ø30 mesh). Kraton® D1101 and Vestenamer® were used as commercially available asphalt modifiers to compare with the performance of the P(AG) as the AR modifier.

The following equipment was used to prepare AR binders, and to characterize modified AR.
  Silverson shear mill
  Binder Accelerated Separator—BAS (this method separates the swelled rubber from the residual binder of the AR)
  Rotational viscometer
  Dynamic shear rheometer
  Rolling thin film oven
  Pressure aging vessel
  Bending beam rheometer
  Degassing oven All samples were tested in the dynamic shear rheometer (DSR), bending beam rheometer (BBR) and in the rotational viscometer (RV) to obtain their high, inter-medium and low continuous grades. All the AR binders were also tested for separation susceptibility (for 48 hours at 163° C.). The binders were aged using the rolling thin film oven (RTFO), to simulate short term aging, and further aged using the pressurized aging vessel (PAV) to simulate long term aging. All the grading tests in the binders were performed as specified in the Superpave®: Performance graded asphalt binder specification and testing (2003) (Asphalt Institute), as well as in AASHTO R 29-08 and AASHTO M 320-05. The determination of the rheological properties of asphalt binder using a dynamic shear rheometer was conducted according to ASTM D 7175-08.

Experimental Results

The results of each test are presented in a summary tables (FIGS. 16-28), where the results of the AR stabilized with P(AG) were compared with the non-stabilized (control) AR, the AR stabilized with Vestenamer®, and additionally a binder modified with 5% Kraton®.

The shaded cells in the summary tables regarding the Vestenamer®-stabilized binders indicate the values that ideally can be reached or surpassed using the poly(acrylated glycerol)—these values are also shaded in the summary tables regarding the P(AG)-stabilized binders in dark grey. The light grey in the summary tables regarding the P(AG)-stabilized binders are the ones that have similar performance to the Vestenamer®-stabilized binders, taking into account the test variability.

a. High Temperature Continuous Grade for the Unaged Binders—DSR

Figure 16:
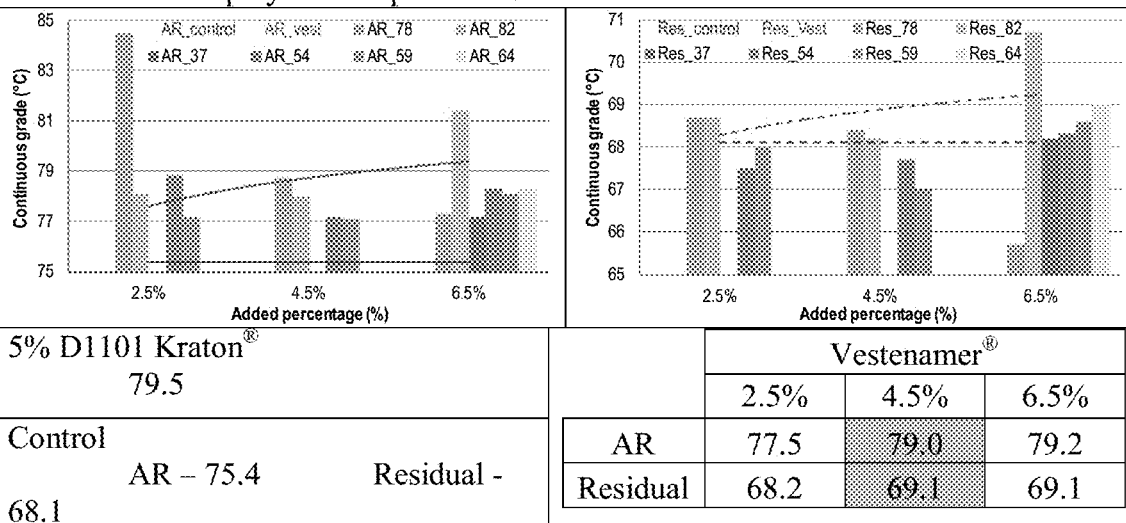
FIG. 16 shows tables and graphs summarizing the high temperature continuous grade for the unaged AR binders modified by P(AG), compared to the results of a non-stablized AR (control), AR binders stabilized with Vestenamer®, and an asphalt binder modified with 5% Kraton®.

The AR binders were unaged. The samples were tested in the DSR to obtain their high temperature continuous grades. The results for the unaged AR binders modified by P(AG) are summarized in the table, and compared to the results of a non-stabilized AR (control), AR binders stabilized with Vestenamer®, and an asphalt binder modified with 5% Kraton®, as shown in FIG. 16.

The addition of rubber to the asphalt increased the high temperature grade of AR from 58° to 76°, and the high performance grade (PG) of the residual binder was almost 70°. These results were further improved by the addition of Vestenamer®, which behaved better than the asphalt modified with 5%®Kraton D1101.

The PG of the stabilized AR binders, either with P(AG) or Vestenamer®, was always better than the non-stabilized AR (control). The addition of the poly(acrylated glycerol) improved the high PG of the binders to at least the same extent as Vestenamer®, and in some cases (e.g. 6.5% AG82 and 6.5% AG54) better than Vestenamer®.

b. High Temperature Continuous Grade for the RTFO Aged Binders—DSR

The AR binders were aged using the RTFO to simulate short term aging.

Figure 17:
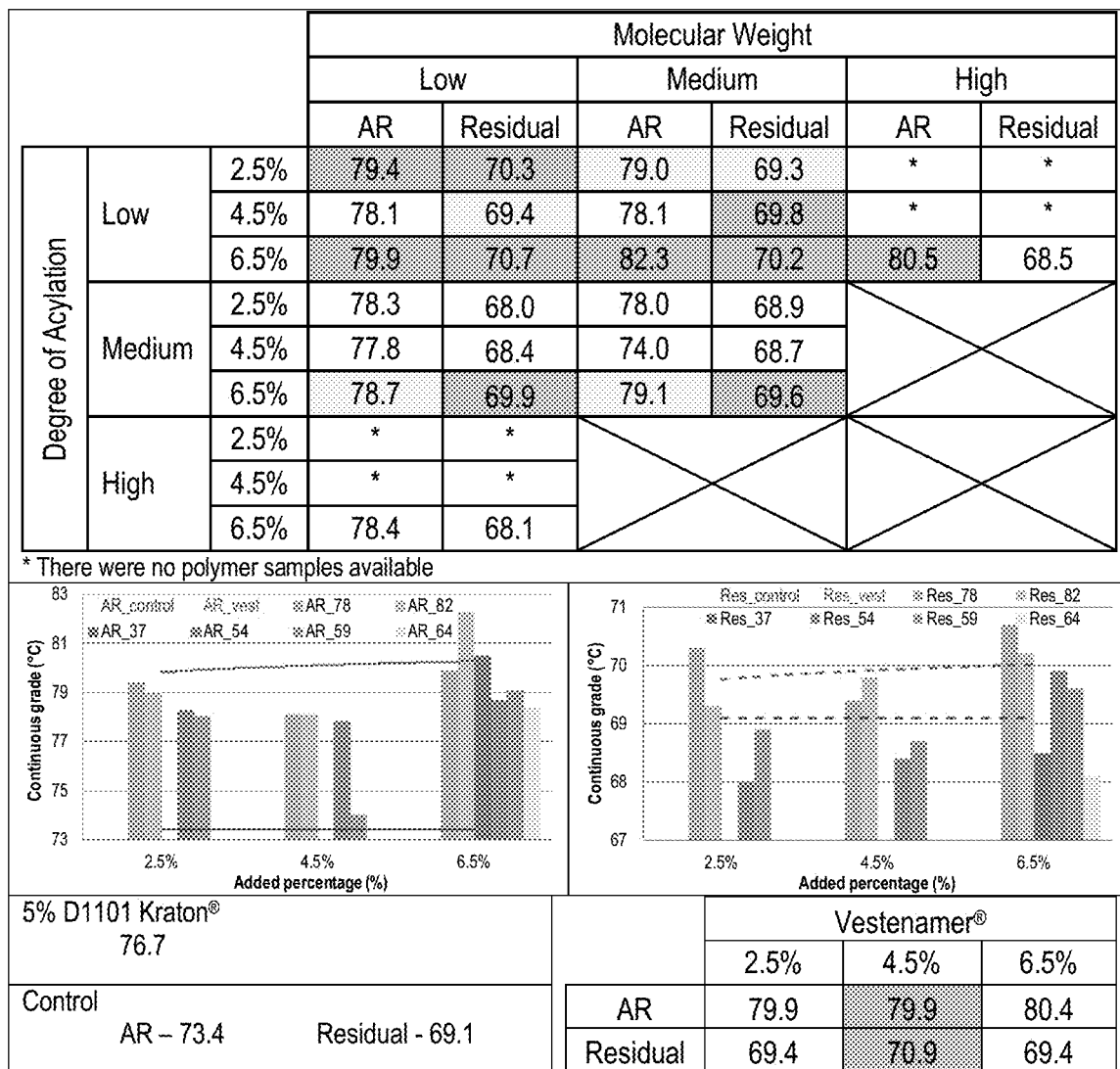
FIG. 17 shows tables and graphs summarizing the high temperature continuous grade for the RTFO-aged AR binders modified by P(AG), compared to the results of a non-stablized AR (control), AR binders stabilized with Vestenamer®, and an asphalt binder modified with 5% Kraton®.

The samples were tested in the DSR to obtain their high temperature continuous grades. The tests were performed according to ASTM D 2872-04. The results for the RTFO-aged AR binders modified by P(AG) are summarized in the table, and compared to the results of a non-stabilized AR (control), AR binders stabilized with Vestenamer®, and an asphalt binder modified with 5% Kraton®, as shown in FIG. 17.

Figure 18:
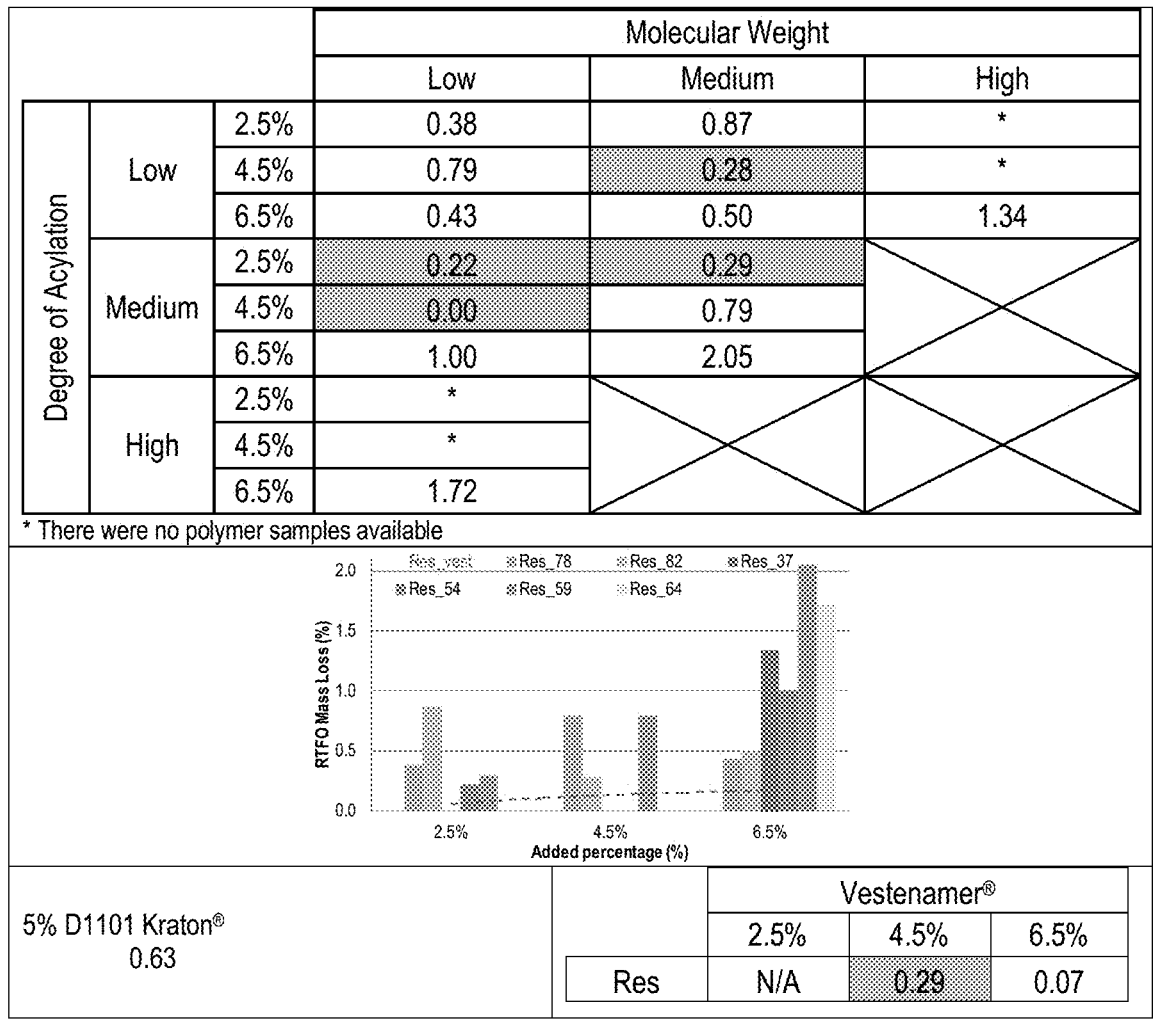
FIG. 18 shows tables and graphs summarizing the mass loss percentage during the RTFO testing of the residual binder.

After the RTFO aging, all of the binders (except the 2.5 AG78) produced about the same grade, which is the normal behavior for asphalt binders. The table in FIG. 18 summarized the mass loss percentage attained during the RTFO testing.

The RTFO aging process can result in variable results, and 1% mass loss is the acceptable criteria. Thus, the residuals of the AR stabilized with AG presented an acceptable value of mass loss (except the 6.5% of the AG 37, 59 and 64). The AR stabilized with 2.5% AG54 and 4.5% AG82 performed better that the AR stabilized with Vestenamer®. The absolute values of the mass loss for the AR binder could not be measured because the bottles overflowed during the test.

c. Intermediate Temperature Continuous Grade for the RTFO+PAV Aged Binders—DSR The AR binders were aged using the RTFO, and further aged using the PAV to simulate long term aging. The PAV aging was performed according to AASHTO R 28. The samples were tested in the DSR to obtain their intermediate temperature continuous grades. The results for the RTFO+PAV-aged AR binders modified by P(AG) are summarized in the table, and compared to the results of a non-stabilized AR (control), AR binders stabilized with Vestenamer®, and an asphalt binder modified with 5% Kraton®, as shown in FIG. 19.

For intermediate temperatures, the poorer behavior of the Kraton® D1101 was noticeable when compared with the other binders, especially the non-stabilizer AR (control). The Vestenamer® sample improved the AR binder but had the opposite effect on the residual. The same trend was observed for the P(AG), but the improvements of the performance for the AR binder by using the P(AG) were more substantial than Vestenamer®. This more substantial improvements than the Vestenamer® sample by using P(AG) were observed both for the AR binders and for the residual binder.

d. Low Temperature Continuous Grade for the RTFO+PAV Aged Binders—BBR

Figure 20:
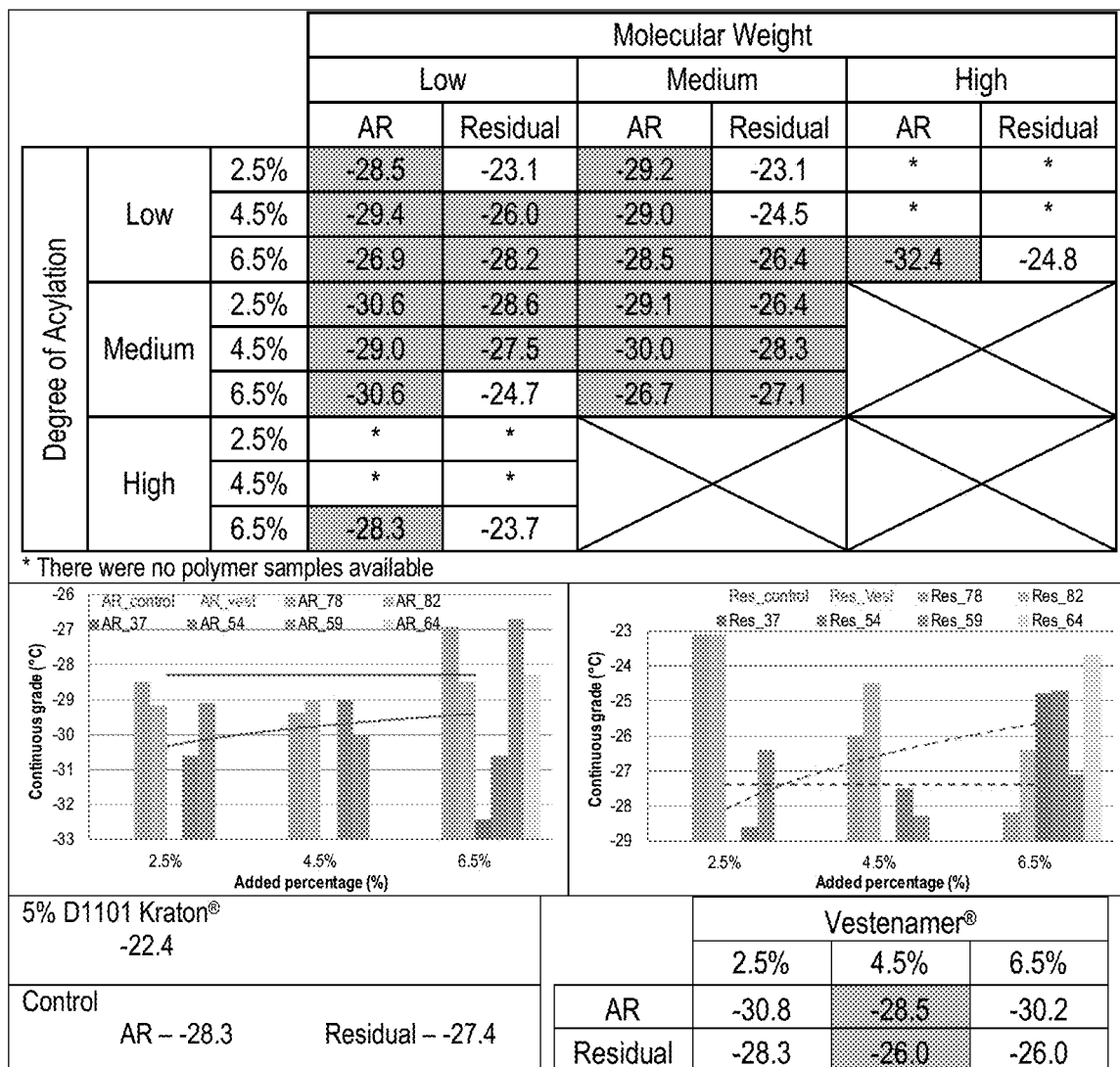
FIG. 20 shows tables and graphs summarizing the low temperature continuous grade for the RTFO+PAV-aged AR binders modified by P(AG), compared to the results of a non-stablized AR (control), AR binders stabilized with Vestenamer®, and an asphalt binder modified with 5% Kraton®.

The AR binders were aged using the RTFO, and further aged using the PAV to simulate long term aging. The samples were tested in the BBR to obtain their low temperature continuous grades. The tests were performed according to ASTM D 6648-08. The results for the RTFO+PAV-aged AR binders modified by P(AG) are summarized in the table, and compared to the results of a non-stabilized AR (control), AR binders stabilized with Vestenamer®, and an asphalt binder modified with 5% Kraton®, as shown in FIG. 20.

Similar to the results in the intermediate temperature continuous grades, the Kraton® had the poorest performance in the low temperature PG. The most significant result is that the stabilization of the AR binders with P(AG) was very significant, even when compared with the AR binders modified by the Vestenamer®.

e. Viscosity Determination for the Unaged Binders—RV

Figure 21A:
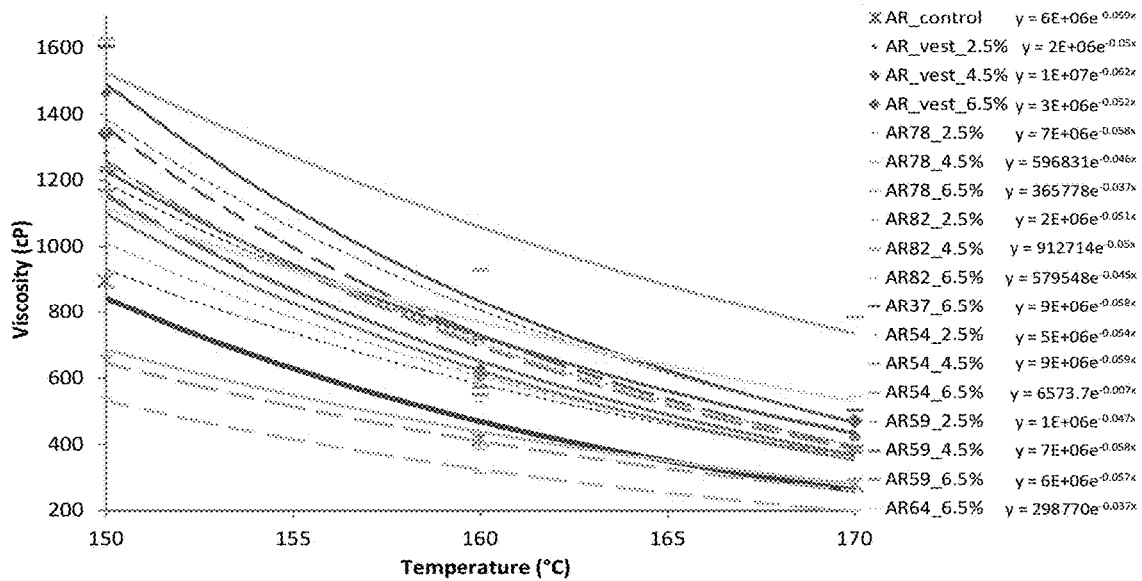
FIG. 21A is a graph showing the results of viscosities for the AR binders modified by P(AG), compared to the results of a non-stablized AR (control), and the AR binders stabilized with Vestenamer®. The viscosities were measured at 20 rpm.
Figure 21B:
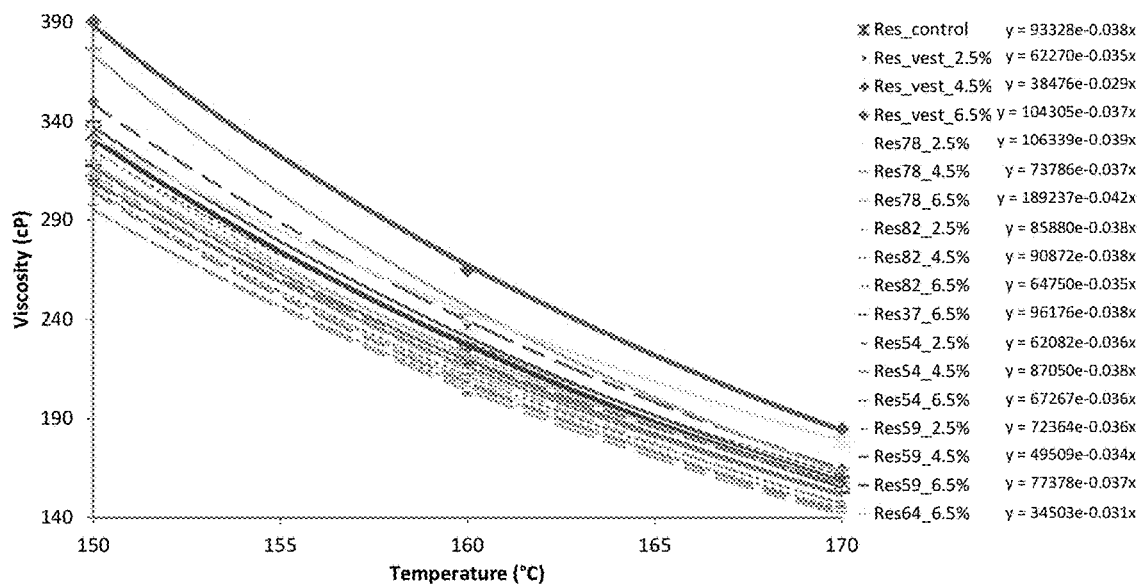
FIG. 21B is a graph showing the results of viscosities for the residual AR binders measured at 20 rpm.

The viscosity testing was performed in the RV according to ASTM D 4402-06. The results are illustrated in FIGS. 21A and 21B.

The viscosity test revealed the outstanding performance of the AR binders stabilized with P(AG). These binders showed an improved performance with regard to the high, intermediate, and low temperature grades. Typically, it is expected that a relatively high level of sensitivity to temperature would result. However, FIG. 21A shows mostly the opposite, especially for the AR binder stabilized with 6.5% and 4.5% AG82 and 4.5% AG78. The addition of the Vestenamer® sample increased the viscosity of the AR binder when compared with the non-stabilized AR (control). By using the P(AG) to modify the AR, most binders presented lower viscosities than the AR binders modified by Vestenamer®, and some AR binders modified by P(AG) showed an even lower viscosity than the control AR.

The viscosities of the residual were also assessed for the AR binders modified with the P(AG), and a reduction of viscosity was observed when compared to the AR, even to the Vestenamer® sample. However, the sensitivity to the temperature was quite similar among all the binders, which suggests that the P(AG) acts in conjunction with the rubber particles. See FIG. 21B.

f. Storage Stability of the Asphalt Rubber Binders—DSR

The storage stability was tested in the DSR according to ASTM D 7173-05. The results of the percentage difference in DSR storage stability for the AR binders modified by P(AG) are summarized in the table, and compared to the results of a non-stabilized AR (control), AR binders stabilized with Vestenamer®, and an asphalt binder modified with 5% Kraton®, as shown in FIG. 22.

The results showed that the Vestenamer® stabilized the AR binder. The storage stability of the AR binders modified by the P(AG) was improved significantly for most of the tested samples compared to the control AR binders.

g. Grade Range

The improvement of the high and low temperature grade is desirable and indicates in which conditions the binder can be used successfully. It is also desirable to have a binder that can be used in a broad range of climate conditions. This is determined by the grade range.

Figure 23:
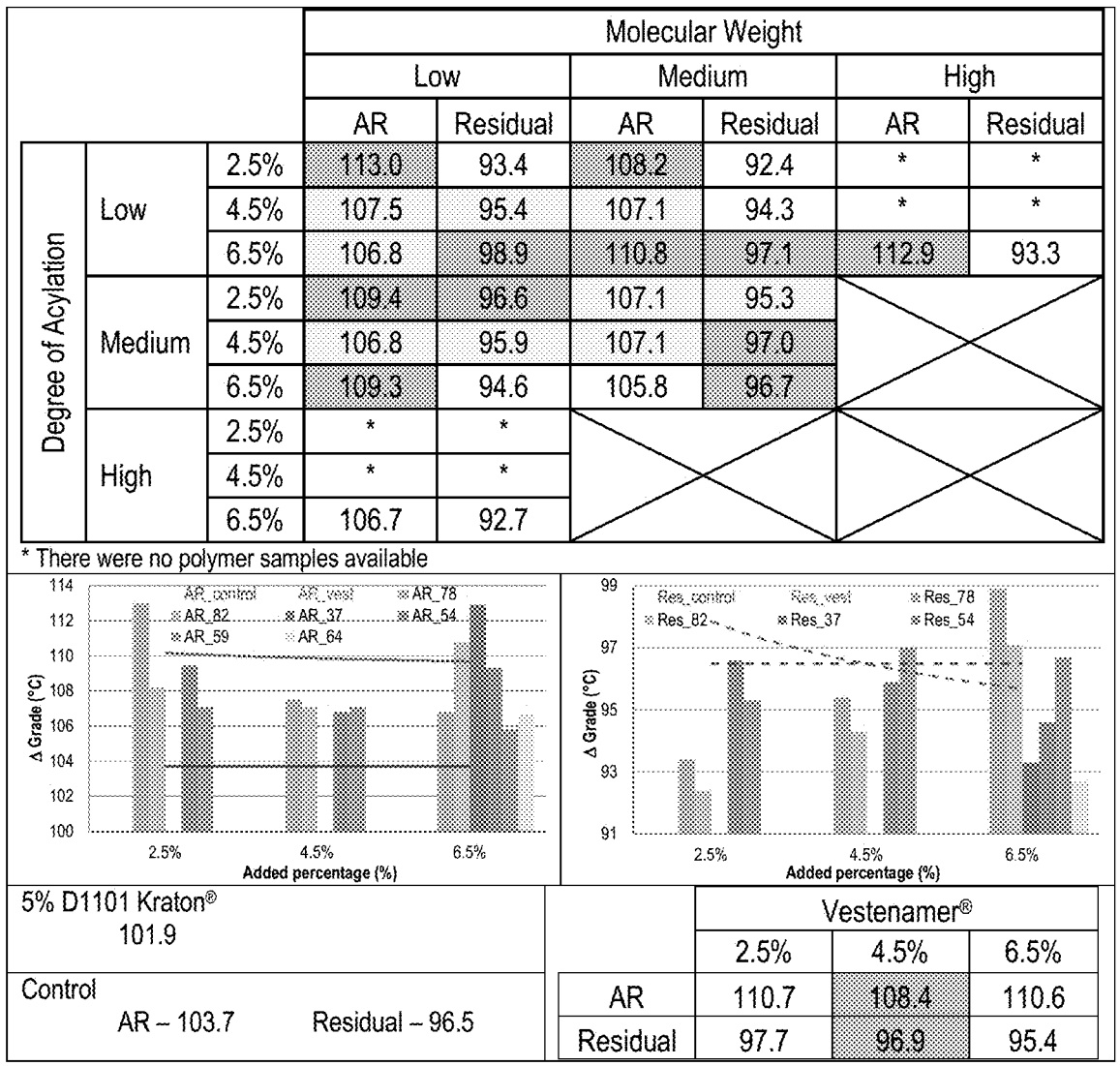
FIG. 23 shows tables and graphs summarizing the grade range for AR binders modified by P(AG), compared to the results of a non-stablized AR (control), AR binders stabilized with Vestenamer®, and an asphalt binder modified with 5% Kraton®.

The results of the grade range for the AR binders modified by P(AG) are summarized in the table, and compared to the results of a non-stabilized AR (control), AR binders stabilized with Vestenamer®, and an asphalt binder modified with 5% Kraton®, as shown in FIG. 23.

Similar to the results in the intermediate and low temperature continuous grades, the Kraton® D1101 showed the poorest performance in the grade range. The addition of the GTR by itself enlarged the grade range by 16° C. After the AR was modified with Vestenamer®, an extra 6° C. was obtained. The best performance was obtained by the AR modified by the P(AG), which reached a grade range of 113° C. (27° C. above the original PG58-28 without the GTR, and 5° C. above the AR modified with Vestenamer®).

h. Mixing and Compaction Temperatures

Figure 24:
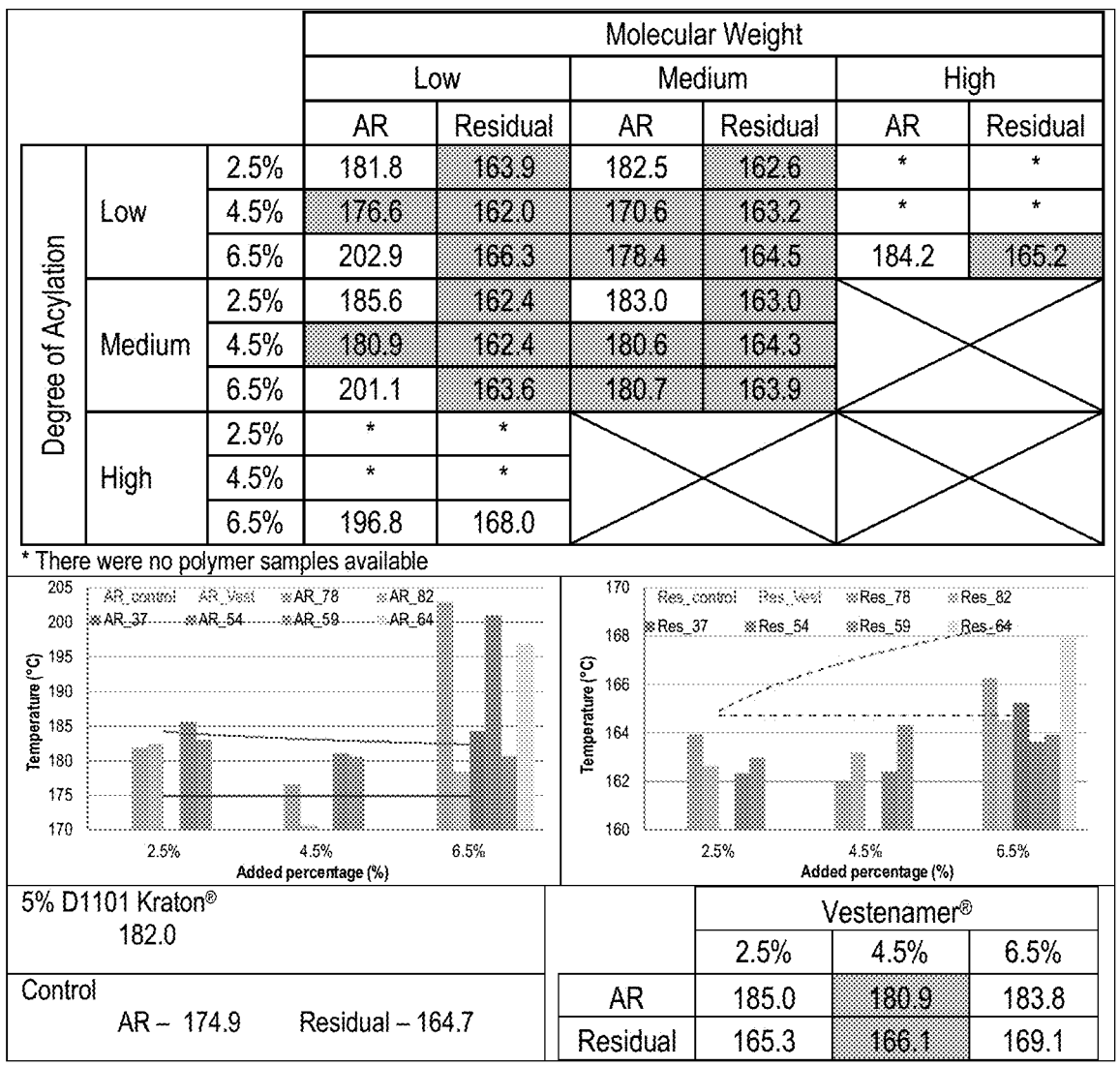
FIG. 24 shows tables and graphs summarizing the minimum mixing temperatures for AR binders modified by P(AG), compared to the results of a non-stablized AR (control), AR binders stabilized with Vestenamer®, and an asphalt binder modified with 5% Kraton®.

The mixing and compaction temperatures were determined as specified in Superpave® Mix Design. Superpave Series No. 2 (SP-02) (Asphalt Institute, Lexington, Ky. 2001). The results of the minimum mixing temperatures and the minimum compaction temperatures for the AR binders modified by P(AG) are summarized in the tables, and compared to the results of a non-stabilized AR (control), AR binders stabilized with Vestenamer®, and an asphalt binder modified with 5% Kraton®, as shown in FIG. 24, and FIG. 25, respectively.

The viscosity of a material is very susceptible to the presence of particles; the particles increase dramatically the viscosity of the composite material, and this phenomenon is reflected in the mixing temperature—a higher mixing temperature is needed to achieve the desired viscosity for the composite material containing particles. This is well illustrated in the tables in FIG. 24, and FIG. 25.

The control asphalt rubber presented the smallest increase in the mixing temperature. The addition of the Vestenamer® sample increased the mixing temperature by 6° C., but the Kraton® SBS-modified asphalt showed an even higher increase of 7° C. However, the addition of the P(AG) only increased the mixing temperature by 4° C. (e.g., using 4.5% AG82). See FIG. 24.

The performance of the P(AG) was excellent regarding the compaction temperatures. The compaction temperatures of 6° C. lower than the control AR were achieved by the AR modified with the P(AG). In fact, the overall performance of the AR modified with the P(AG) in almost all concentrations, degrees of acrylation, and molecular weights were better than the AR stabilized with the AR modified with Vestenamer® and the asphalt modified with the Kraton®. See FIG. 25.

i. Average Difference Between AR and Residual Viscosities

It is usually hard and time-consuming to determine if an asphalt binder is or is not stable during storage. Comparing the viscosities of the AR and residual binders, however, could provide an indication of this characteristic.

Figure 26:
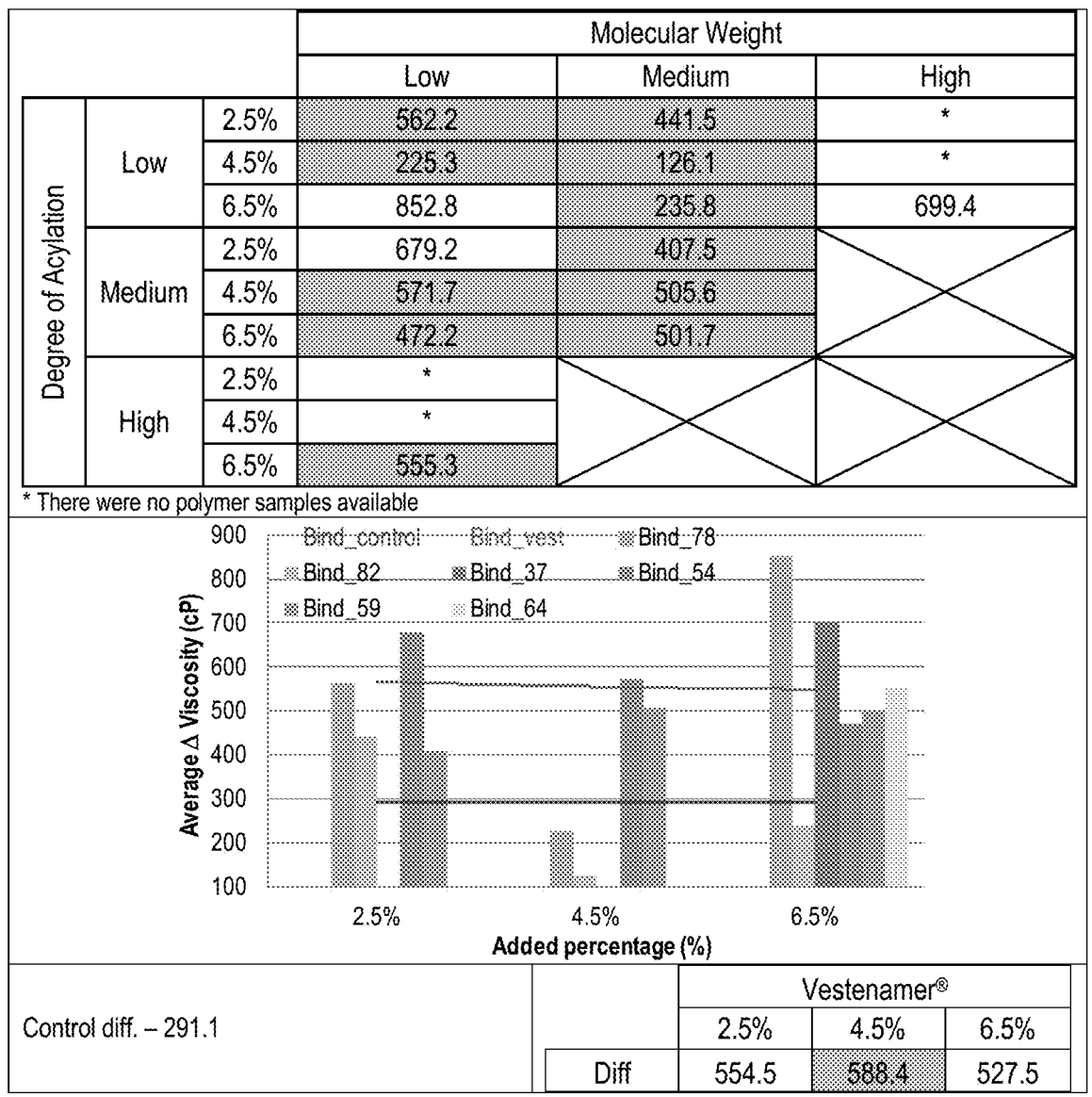
FIG. 26 shows tables and figures summarizing the average difference between AR and residual viscosities for AR binders modified by P(AG), compared to the results of a non-stablized AR (control), AR binders stabilized with Vestenamer®, and an asphalt binder modified with 5% Kraton®.
Figure 27:
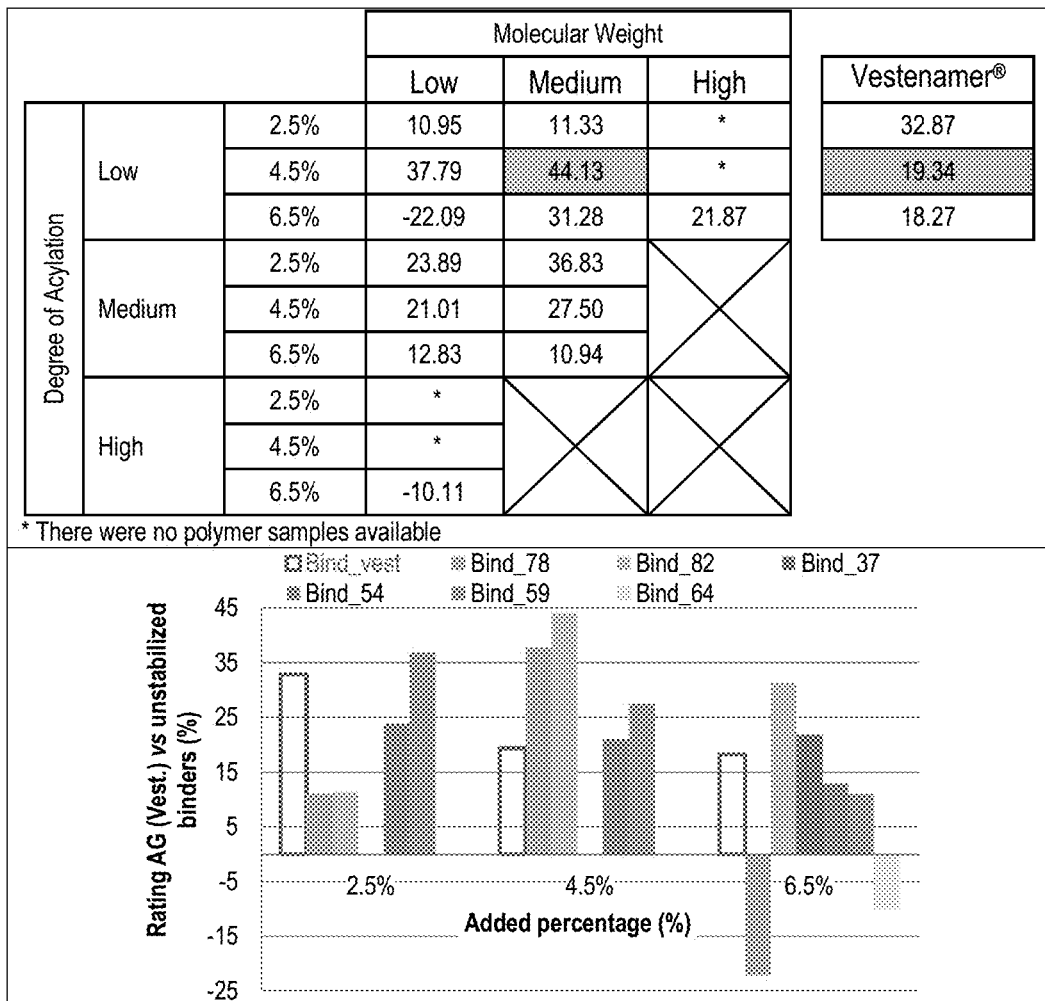
FIG. 27 shows tables and graphs summarizing the final percentage rating of the AR binders stabilized with P(AG) and Vestenamer®, analyzed against the control AR (non-stabilized).
Figure 28:
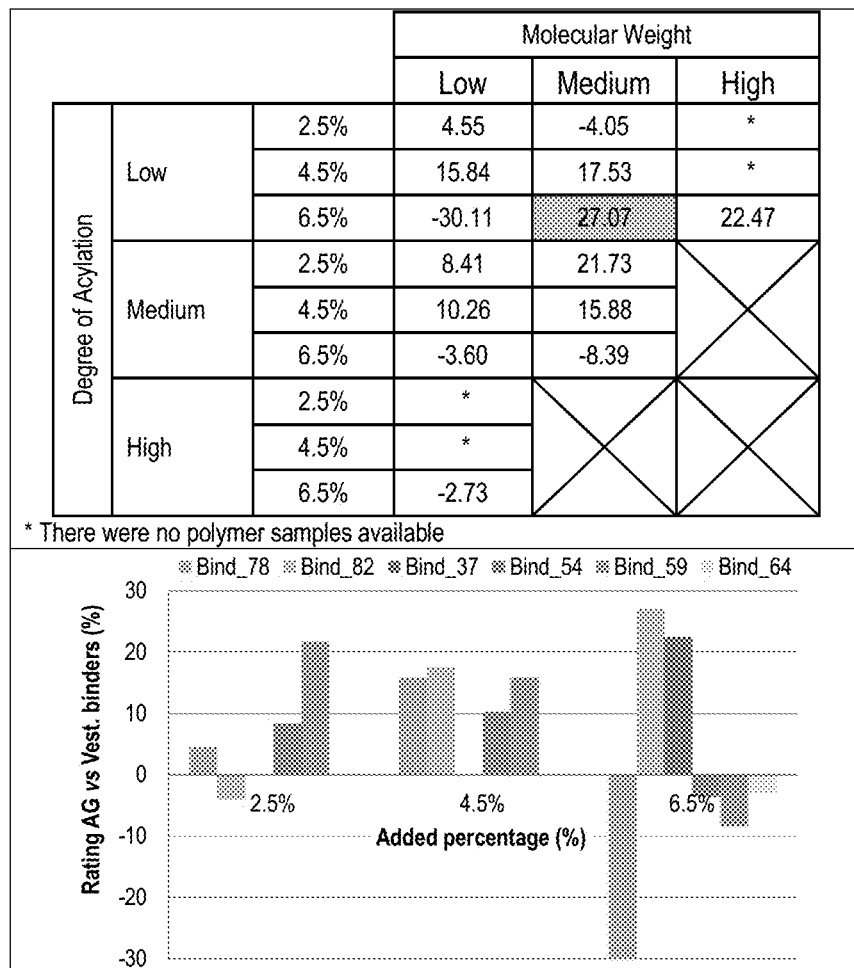
FIG. 28 shows tables and graphs summarizing the final percentage rating of the AR binders stabilized with P(AG), analyzed against the AR modified with Vestenamer®.

The average viscosity of the AR was compared with the residual, subtracting the latter from the former, and a smaller value of the difference between the two indicates a more stable material. The results of the average difference between the AR and the residual viscosities for the AR binders modified by the P(AG) are summarized in the table, and compared to the results of a non-stabilized AR (control), AR binders stabilized with Vestenamer®, and an asphalt binder modified with 5% Kraton®, as shown in FIG. 26.

The results show a remarkable similarity between the viscosities of the AR and residual binders of the materials stabilized with the P(AG).

Analysis and Discussion

Almost all the synthesized poly(acrylated glycerol) stabilizers performed well in the three tested concentrations. To optimize the production process for the P(AG) and the AR binder formulation containing the P(AG), different tested parameters were categorized, analyzed, and ranked to assign relative weights to each parameter, as shown below:

| | |
|---|---|
| Unaged high temperature PG | 1.75 |
| RTFO high temperature PG | 0.75 |
| RTFO mass loss | 0.50 |
| Intermediate temperature PG | 0.75 |
| Low temperature PG | 1.25 |
| Grade range | 1.50 |
| viscosity | 1.25 |
| Minimum mixing temperature | 1.00 |
| Minimum compaction temperature | 1.00 |
| Storage stability | 2.00 |
| (AR-Residual) viscosity difference | 1.25 |

Before applying the relative weight, each parameter was converted in a percentage, in which the highest value was 100% and the lowest possible value was −100%. In the first comparison, the values of the control AR were set to be 0%. The final percentage rating of the AR binders stabilized with the P(AG) and Vestenamer® were analyzed against the control AR (non-stabilized), as shown in the table in FIG. 27.

Almost all the AR stabilized with the P(AG) and Vestenamer® performed better than the non-stabilized control AR. The highlighted cell in the table shows the combination where the P(AG) performed best in the weighed ranking.

In the second comparison, the values of the AR modified with Vestenamer® were set to be 0%. The final percentage rating of the AR binders stabilized with the P(AG) were analyzed against the AR modified with Vestenamer®, as shown in the table in FIG. 28.

When compared to Vestemamer®, the P(AG) commonly showed better performance. The highlighted cell in the table shows the combination where P(AG) performed best in the weighed ranking.

The AR binder modified by the P(AG) that overall showed a performance 27% better than the AR binder modified by Vestenamer® was the P(AG) with a low degree of acrylation and a medium molecular weight (degree of polymerization), added at a 6.5% concentration by weight of the GTR (for an asphalt modified with 12 wt % ambient GTR).

The AR binder modified by the P(AG) with a low degree of acrylation and a medium molecular weight, added at a 4.5% concentration by weight of the GTR (for an asphalt modified with 12 wt % ambient GTR), showed an exceptional result—a performance 44% better than the control AR.

Example 5—Synthesis of Poly(Acrylated Glycerol)

Acrylation of Glycerol

Glycerol was mixed with phenothiazine or hydroquinone (inhibitor, 0.5 wt % of glycerol), Amberlyst 15 or thiamine pyrophosphate (TPP) as the catalyst in a 0.06:1 mass ratio to glycerol, acrylic acid in a 1.5:1 mass ratio to glycerol, and DMSO in a 1:1 mass ratio to glycerol. The reaction was stirred and bubbled for 20 minutes, and then heated to 90° C. The reaction was allowed to proceed for a minimum of 12 hours, and was ended by cooling to room temperature. The final acrylated glycerol was mixed with cyclohexane to remove DMSO, and was dried overnight on vacuum ovens under room temperature.

Polymerization of Acrylated Glycerol

Figure 29:
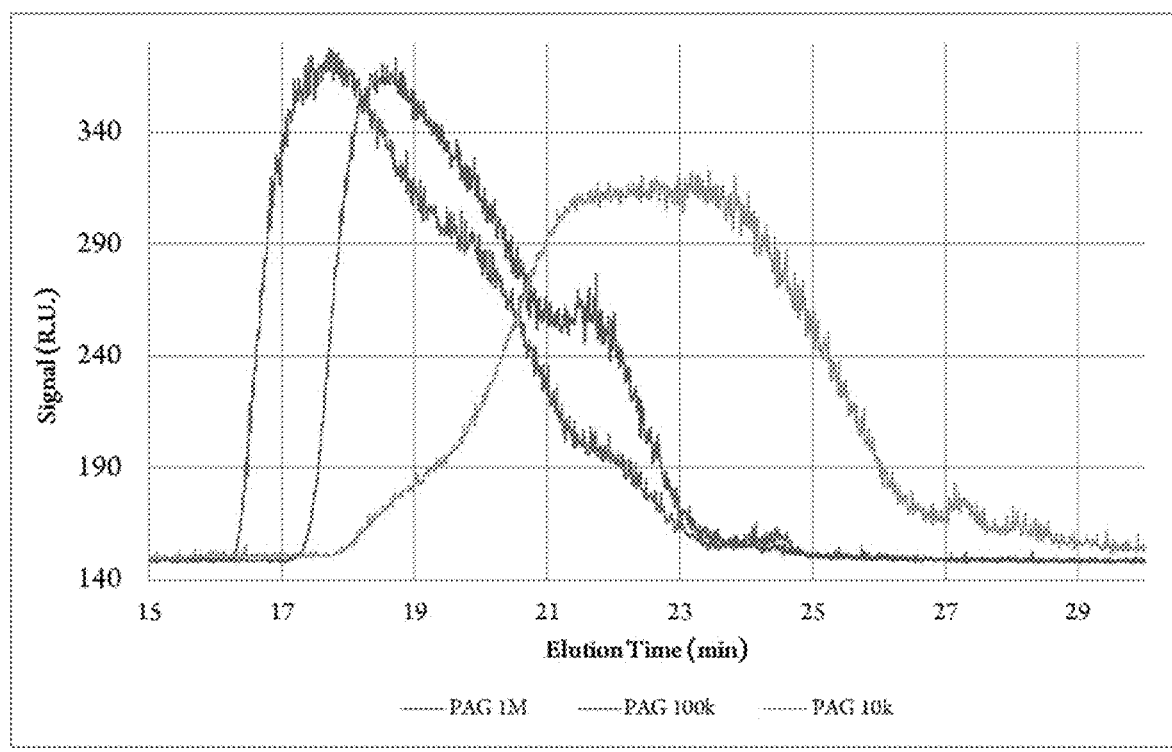
FIG. 29 is a graph showing the results of gel permeation chromatography traces of three poly(acrylated glycerol) ("PAG") polymers having molecular weights ranging from 1 million Daltons to 10 thousand Daltons.

Polymerization of acrylated glycerol was performed in accordance with the procedures as set forth in Example 1. The resulting three poly(acrylated glycerol) polymers having molecular weights ranging from 1 million Daltons to 10 thousand Daltons are shown in FIG. 30, with the gel permeation chromatography traces shown in FIG. 29.

Although preferred embodiments have been depicted and described in detail herein, it will be apparent to those skilled in the relevant art that various modifications, additions, substitutions, and the like can be made without departing from the spirit of the present invention and these are therefore considered to be within the scope of the present invention as defined in the claims which follow.

What is claimed is:

1. A thermoplastic statistical copolymer having a general formula of:

wherein:
A represents monomer A, which is an acrylated polyol monomeric unit having different degrees of acrylation of hydroxyl groups, wherein the acrylated polyol monomeric unit has an average degree of acrylation greater than 1 and less than the number of the hydroxyl groups of the polyol;
B represents monomer B, which is a radically polymerizable monomer;
C represents monomer C, which is a radically polymerizable monomer;
provided that the monomer B is different than the monomer A, and the monomer C is different than the monomer A or monomer B;
i, j, and k are average number of repeating units of monomer A, monomer B, and monomer C, respectively, such that i and j are each greater than 0 and less than 1, k is 0 to less than 1, provided that i+j+k=1; and
q represents the number average degree of polymerization and ranges from 10 to 100,000, and wherein the polymer chain of the thermoplastic statistical copolymer is based on polymerization of radically polymerizable acrylic (O=C—C=C) moieties.

2. The thermoplastic statistical copolymer of claim 1, wherein the acrylated polyol monomeric unit contains one or more conjugated sites.

3. The thermoplastic statistical copolymer of claim 1, wherein the polyol of the monomer A is selected from the group consisting of ethylene glycol, propylene glycol, dipropylene glycol, 1,2,4-butanetriol, 1,7-heptanediol, glycerol, panaxatriol, panaxytriol, balsaminol B, momordol, erythritol, enterodiol, xylitol, miglitol, sorbitol, mannitol, galactitol, isomalt, maltitol, aldohexose, aldopentose, aldotetrose, aldotriose, aldose, allose, altrose, arabinose, amylopectin, amylose, dextrose, erythrose, fructose, galactose, glucose, gulose, hexose, idose, ketohexose, ketose, lactose, lyxose, maltose, mannose, pentose, ribose, saccharose, sucrose, talose, tetrose, triose, xylose, amylopectin, and stereoisomers thereof.

4. The thermoplastic statistical copolymer of claim 1, wherein the polyol of the monomer A is glycerol.

5. The thermoplastic statistical copolymer of claim 1, wherein the polyol of the monomer A is sorbitol.

6. The thermoplastic statistical copolymer of claim 1, wherein the polyol of the monomer A is dextrose.

7. The thermoplastic statistical copolymer of claim 1, wherein one or more acrylated polyol monomeric units of the monomer A contain one or more alkoxy groups derived from esterification of the un-acrylated hydroxy groups.

8. The thermoplastic statistical copolymer of claim 1, wherein the monomer B and the monomer C, if present, are each independently vinyl, acrylic, diolefin, nitrile, dinitrile, acrylonitrile monomers, a monomer with reactive functionality, or a crosslinking monomer.

9. The thermoplastic statistical copolymer of claim 1, wherein the monomer B and the monomer C, if present, are each independently styrene, α-methyl styrene, t-butyl styrene, vinyl xylene, vinyl naphthalene, vinyl pyridine, divinyl benzene, methyl acrylate, methyl (meth)acrylate, ethyl (meth)acrylate, propyl (meth)acrylate, butyl (meth)acrylate, heptyl (meth)acrylate, hexyl (meth)acrylate, acrylonitrile, adiponitrile, methacrylonitrile, butadiene, isoprene, radically polymerizable plant oils, or mixtures thereof.

10. The thermoplastic statistical copolymer of claim 1, wherein the radically polymerizable plant oil is selected from the group consisting of soybean oil, linseed oil, corn oil, flax seed oil, and rapeseed oil.

* * * * *